(12) United States Patent
McMillion

(10) Patent No.: US 9,828,094 B2
(45) Date of Patent: Nov. 28, 2017

(54) AUTONOMOUS CLEANING SYSTEM

(71) Applicant: John Benjamin McMillion, San Diego, CA (US)

(72) Inventor: John Benjamin McMillion, San Diego, CA (US)

(73) Assignee: John B. McMillion, San Diego, CA (US)

( * ) Notice: Subject to any disclaimer, the term of this patent is extended or adjusted under 35 U.S.C. 154(b) by 0 days.

(21) Appl. No.: 14/809,276

(22) Filed: Jul. 26, 2015

(65) Prior Publication Data
US 2017/0023947 A1    Jan. 26, 2017

(51) Int. Cl.
*B64C 39/00* (2006.01)
*B64C 39/02* (2006.01)
*B64D 1/22* (2006.01)
*D06F 29/00* (2006.01)

(52) U.S. Cl.
CPC .............. *B64C 39/024* (2013.01); *B64D 1/22* (2013.01); *D06F 29/00* (2013.01)

(58) Field of Classification Search
None
See application file for complete search history.

(56) References Cited

U.S. PATENT DOCUMENTS

| | | | |
|---|---|---|---|
| 8,374,721 B2* | 2/2013 | Halloran | A47L 5/30 318/568.1 |
| 8,433,442 B2* | 4/2013 | Friedman | G05D 1/0274 700/245 |
| 8,755,936 B2* | 6/2014 | Friedman | G08C 17/00 700/248 |
| 8,843,245 B2* | 9/2014 | Choe | G05D 1/0246 700/214 |
| 9,302,393 B1* | 4/2016 | Rosen | B25J 9/1694 |
| 9,323,250 B2* | 4/2016 | Wang | G05D 1/028 |
| 9,420,741 B2* | 8/2016 | Balutis | G05D 1/0265 |
| 9,475,196 B2* | 10/2016 | Jagenstedt | B25J 13/006 |
| 2004/0220707 A1* | 11/2004 | Pallister | G05D 1/0274 701/24 |
| 2005/0076840 A1* | 4/2005 | Van Den Berg | A01J 5/017 119/14.04 |
| 2005/0287038 A1* | 12/2005 | Dubrovsky | G05B 19/409 422/63 |
| 2006/0045679 A1* | 3/2006 | Ostendorff | B25J 5/007 414/402 |
| 2012/0072023 A1* | 3/2012 | Ota | B25J 9/1664 700/259 |
| 2013/0096717 A1* | 4/2013 | Yoon | A47L 11/33 700/245 |
| 2013/0218339 A1* | 8/2013 | Maisonnier | B25J 11/0005 700/257 |
| 2013/0233359 A1* | 9/2013 | Meissner | B08B 3/02 134/134 |

(Continued)

*Primary Examiner* — Jonathan M Dager

(57) ABSTRACT

This disclosure describes a plurality of unmanned vehicles configured to complete cleaning tasks with little or no human involvement by identifying objects, operating washing/drying cleaning machine(s) as needed, and transporting objects to and from cleaning machine(s). The unmanned vehicles may also return objects to designated locations after cleaning, or simply arrange objects within rooms based on an ideal room arrangement state.

20 Claims, 30 Drawing Sheets

(56) References Cited

U.S. PATENT DOCUMENTS

| | | | | |
|---|---|---|---|---|
| 2014/0039675 A1* | 2/2014 | Ead | ............... | G06N 3/008 700/245 |
| 2014/0136302 A1* | 5/2014 | Song | ............... | B25J 9/1656 705/14.4 |
| 2014/0150820 A1* | 6/2014 | Yoo | ............... | A47L 9/009 134/6 |
| 2014/0207282 A1* | 7/2014 | Angle | ............... | H04L 12/282 700/257 |
| 2014/0222279 A1* | 8/2014 | Stout | ............... | G05D 1/0219 701/25 |
| 2014/0277741 A1* | 9/2014 | Kwon | ............... | B25J 9/1689 700/263 |
| 2015/0209961 A1* | 7/2015 | Komatsu | ............... | B25J 9/1676 700/255 |
| 2015/0223427 A1* | 8/2015 | Agayev | ............... | A01K 1/01 134/18 |
| 2015/0234385 A1* | 8/2015 | Sandin | ............... | G05D 1/0265 700/258 |
| 2015/0245587 A1* | 9/2015 | Van Den Berg | ............... | A01K 1/01 134/6 |
| 2015/0285915 A1* | 10/2015 | Chang | ............... | B25J 18/007 356/607 |
| 2015/0290795 A1* | 10/2015 | Oleynik | ............... | G05B 19/42 700/257 |
| 2016/0060887 A1* | 3/2016 | Tryber | ............... | E04H 4/1654 15/1.7 |
| 2016/0071386 A1* | 3/2016 | Mittleman | ............... | G08B 17/113 340/628 |
| 2016/0128104 A1* | 5/2016 | Logue | ............... | H04W 12/06 370/329 |
| 2016/0144505 A1* | 5/2016 | Fong | ............... | B25J 9/1602 700/250 |
| 2016/0147230 A1* | 5/2016 | Munich | ............... | G05D 1/0246 701/28 |
| 2017/0197713 A1* | 7/2017 | Borman | ............... | A47L 5/12 |
| 2017/0210470 A1* | 7/2017 | Pardell | ............... | B64C 39/024 |
| 2017/0220979 A1* | 8/2017 | Vaananen | ............... | G06Q 10/083 705/15 |

* cited by examiner

AUTONOMOUS CLEANING SYSTEM

BACKGROUND OF THE INVENTION

Many common household chores that clean or rearrange objects such as, for example; dishes, laundry, picking up toys, making the bed, etc, currently require people to complete them. These cleaning tasks are highly repetitive in nature, and most are required throughout our lives. While rudimentary cleaning machines have come along to assist with one step, that of cleaning objects, marking progress from the early days of manually scrubbing objects in rivers, the overall cleaning process for these tasks still consists of additional steps, each requiring a person's time, attention, physical presence, and human labor. In one example, clothes washing and drying machines may clean clothing objects, but are deficient in many ways, unable to complete the entire process on their own, for steps such as; searching for and identifying which clothing objects need to be cleaned, collecting and transferring clothes, linens, and other textiles from various room locations around the home to the machine(s), separating into lights and darks, opening and closing lids and doors, adding soap, inserting clothes into and removing from the machines, sometimes transferring between washing and drying machines, setting and starting cleaning cycles, and returning clothing objects to rooms around the home upon completion. Similarly, in another example, a dishwashing machine may clean dish objects, but is deficient in many ways, unable to complete the entire process on its own, including steps such as; searching for and identifying which dish objects need to be cleaned, collecting and transferring of the dish objects from various room locations around the home to the cleaning machine, opening and closing the machine's doors, pulling trays in and out, inserting dishes and utensils into and removing from the machine, adding soap, setting and starting cleaning cycles, and returning the objects to cabinets upon completion. Next, no machines have been made available to automatically rearrange objects within rooms to a preferred arrangement state when, for example; children play with their toys and leave them all over the floor, or you sleep in your bed and have to make up the bed again.

SUMMARY OF INVENTION

It is against this background that the invention disclosed provides an autonomous cleaning system that may handle the entire process of cleaning and/or rearranging objects, completely or at least largely free of human involvement, allowing people to reallocate their time, location, and labor spent cleaning to other places or priorities. The autonomous cleaning system comprises primarily of a plurality of configured, unmanned vehicles, cleaning machine(s) for cleaning objects when needed, and a mission control system. For other cleaning task types of merely arranging objects within rooms to an ideal arrangement state, such as picking up children's toys for example, cleaning machines may not be necessary, unless a clean object step is added to the cleaning task. The unmanned vehicles are primarily unmanned aerial vehicles ("UAV"), but may also include unmanned ground vehicles ("UGVs"). The mission control system plans, commands, and coordinates mission operations, and communicates with all machines connected to the autonomous cleaning system. When sent by mission control, the unmanned vehicles may be configured to autonomously or semi-autonomously scout, identify, pick up, release, navigate with, and transport objects to and from a cleaning machine or designated drop location inside the system owner's home. The unmanned vehicles may return to their housing to recharge if needed or commanded, or move to the next object for the cleaning task.

Additional support systems may be utilized such as, for example; artificial intelligence systems for object identification requests from the unmanned vehicles, additional recharging systems for the unmanned vehicles, or additional sensors placed around the home for assessing human or pet occupancy for safety protocols.

In one embodiment, the automated cleaning machines receive operational commands from mission control over the home's local network, and are equipped to respond by operating themselves, automatically opening and closing their own doors, lids, and trays, automatically dispensing soap from an integrated soap reservoir and dispenser, automatically starting and ending their cleaning cycles, notifying mission control of their status, and performing other features and functions to facilitate the cleaning process autonomously.

In another embodiment, the unmanned vehicles may physically operate the controls and features of non-automated cleaning machines such as buttons, dials, lids, trays, and doors for example, or handling cleaning supplies such as soap pods or dryer sheets for example, with robotic arms, tethers, and poking or grasping attachments.

BRIEF DESCRIPTIONS OF THE FIGURES

The detailed description is described with reference to the accompanying figures. In the figures, the left-most digit(s) of a reference number identifies the figure in which the reference number first appears. The use of the same reference numbers in different figures indicates similar or identical components or features.

Figure 1:
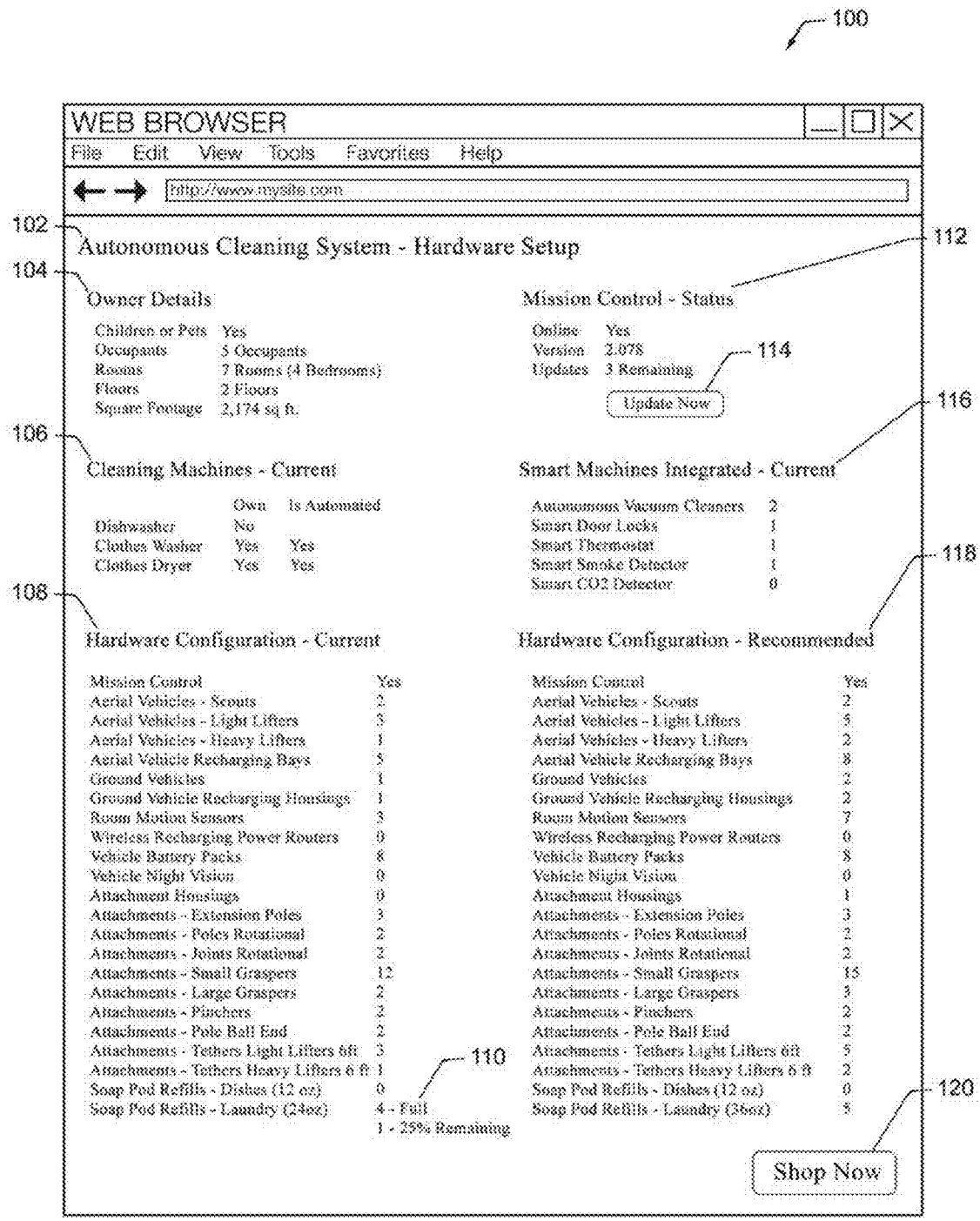
FIG. 1 depicts a graphical user interface for managing a hardware configuration for the autonomous cleaning system, in an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes an autonomous cleaning system designed to complete common types of cleaning tasks with little or no human involvement. In some implementations, the type of task is cleaning objects, such as dishes or laundry for example. As described in more detail below, this task type may utilize automated or non-automated cleaning machines, depending on the owner's equipment configuration. In other implementations, the task type is re-arranging objects within a room, such as picking up children's toys off the floor or making up the bed for example. In other implementations still, the task type is more specialized and may require tertiary attachments other than the system's primary or secondary attachments, such as dusting for example, where a UAV may grasp a feather duster to dust HVAC vents or chandeliers. The type of cleaning task determines the attachments needed and the steps involved in the overall cleaning process to accomplish the specific cleaning task autonomously. As also described further, the owner may configure the system with certain preferences and parameters that mission control will respect as it commands and coordinates the cleaning task operation. While the owner may also initiate missions manually, the system primarily operates autonomously as detailed below.

At the core of the autonomous cleaning system, mission control commands and coordinates cleaning operations for the home, sending the plurality of unmanned vehicles to autonomously or semi-autonomously scout, identify, pick up, release, navigate with, and transport objects to and from a cleaning machine or designated drop location inside a home for the assigned cleaning task. Collectively, the primary components (FIG. 4), along with secondary attachments (FIG. 6) and the software that runs the systems, all work together to transform manual, repetitive cleaning tasks performed by humans into a system that can operate entirely or largely on its own, freeing the human from performing the cleaning tasks themselves if they wish, allowing people to reallocate their time, attention, and efforts to other purposes and priorities.

FIG. 1 depicts a graphical user interface 100 for managing a hardware configuration for the autonomous cleaning system, according to an implementation. In this example, an owner is using a website to manage their "Hardware Setup" 102 which provides their current hardware configuration 108 and the recommended hardware configuration 118 based on their needs profile and current components such as, for example; any current cleaning machines 106 and other smart machines 116 to be integrated in the system.

The needs profile includes "Owner Details" 104 such as, for example; how many floors and rooms are in the home, the total square footage, and the number of occupants the autonomous cleaning system will need to support. While the system requires a minimum set of primary hardware components to function (FIG. 4), and may be advised on the website as such, the shopper ultimately uses their discretion as to how many recommended components 118 they choose to purchase for their own setup when they "Shop Now" 120.

The owner's configuration choices may be influenced by a variety of factors. For example, if the home has more than one floor 104, with stairs, the owner may benefit by adding more unmanned aerial vehicles 118. If the home is a single level 104, the owner may benefit by including more unmanned ground vehicles 118. If the home owner has pets or small children 104, they may benefit by adding more occupancy sensors 118 throughout the home for increased safety protocols, compared to the needs of a single adult occupant. If the home has considerably more square footage 104, family members 104, or bedrooms 104, the owner may benefit from additional unmanned vehicles 118, recharging housings 118, and/or communication relay stations. These benefits may include better efficiency and accuracy, greater safety, increased task completion time, and/or running multiple cleaning tasks in parallel. If the owner wishes to automate the laundry task but not dishes for example, they may select some attachment types 118 but others may not be needed. In another example, if the owner prefers night cleaning while occupants are asleep they may benefit by including night vision sensors 118 in the unmanned vehicle configuration.

The website may request the current soap reservoir levels 110 from the shopper's current cleaning machine(s) 106, and provide these current soap levels 110 during the shopping process for reordering. The owner may also select an automation rule where mission control automatically submits a repurchase order for soap refills when the cleaning machine's soap reservoir level reaches a certain threshold of, for example: 25% based on mission control's analysis of usage patterns and need projections.

The website may provide the current status for hardware components such as Mission Control 112 and any other machines in the autonomous cleaning system, and provide an "Update Now" button 114 to install any new software updates to the machine(s). The machines in the system may also be set to simply auto-update over the internet.

Figure 26:
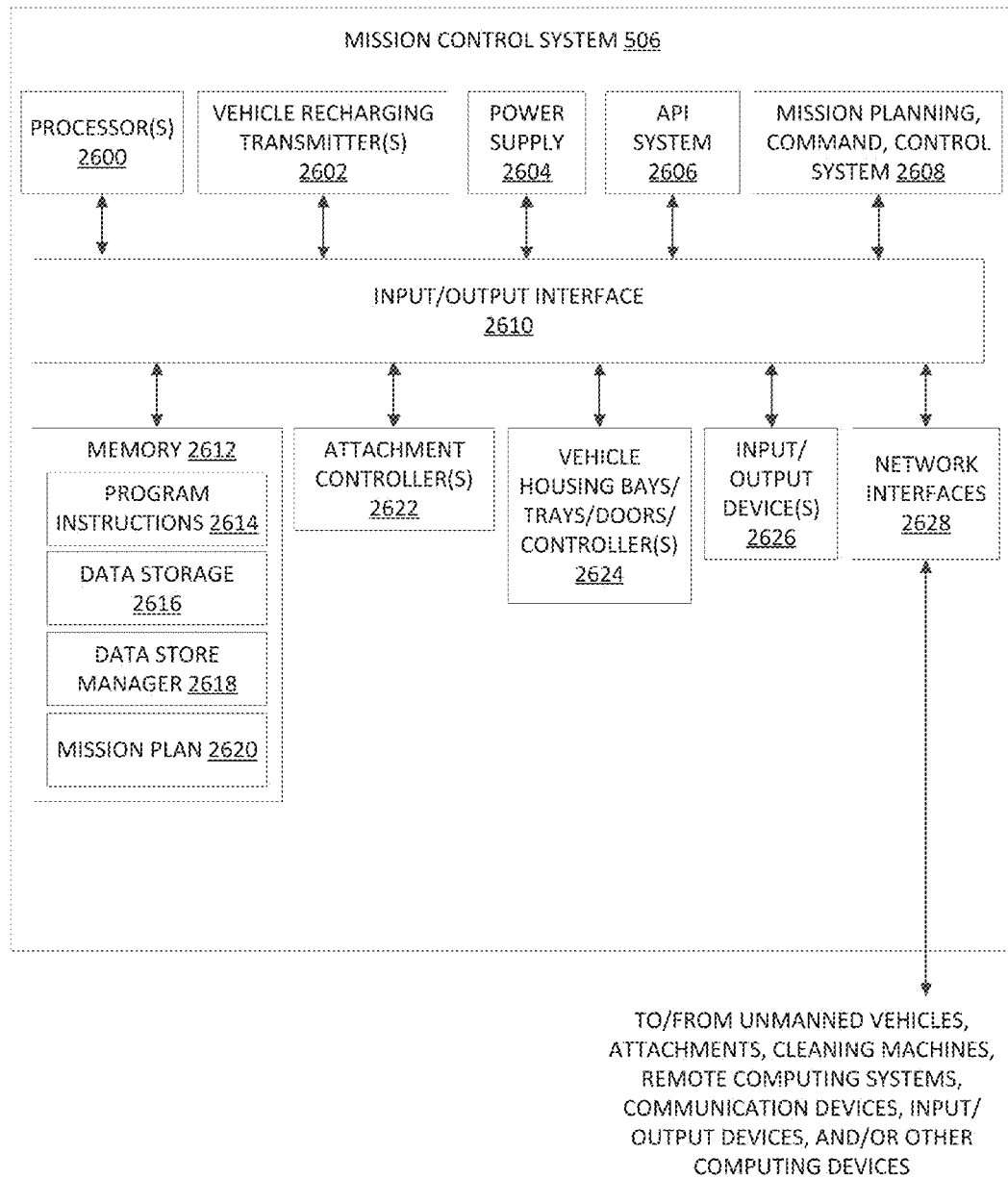
FIG. 26 is a block diagram illustrating various components of a mission control system, according to an implementation.
Figure 29:
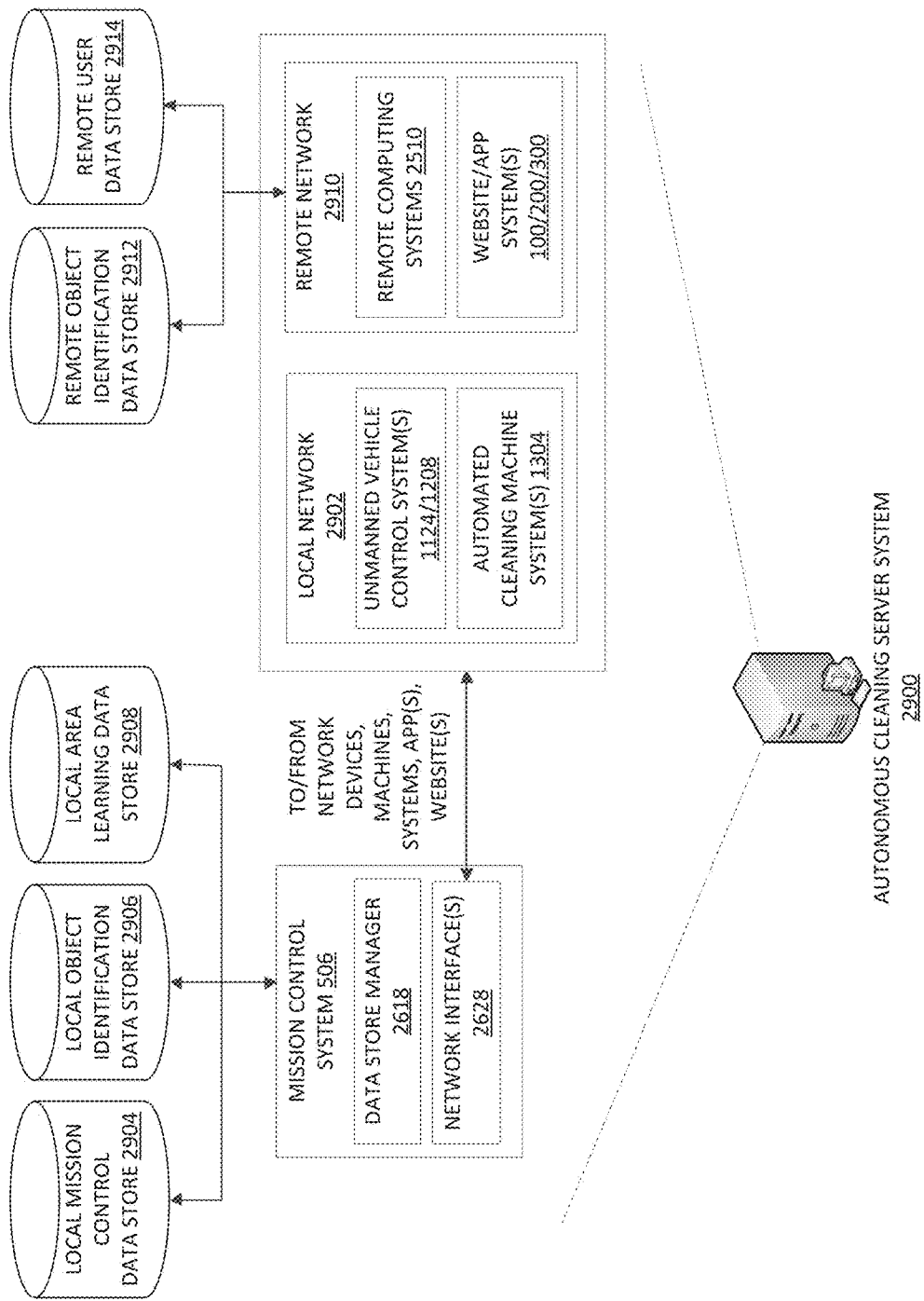
FIG. 29 is a block diagram of an illustrative implementation of an autonomous cleaning server system that may be used with various implementations.

When the owner has purchased new hardware components when shopping now 120, these hardware configuration changes may be sent from the website 100 to the owner's mission control system (FIG. 26). Hardware configuration changes may also be detected automatically when hardware components are connected/disconnected to/from the autonomous cleaning server system (FIG. 29).

Figure 2:
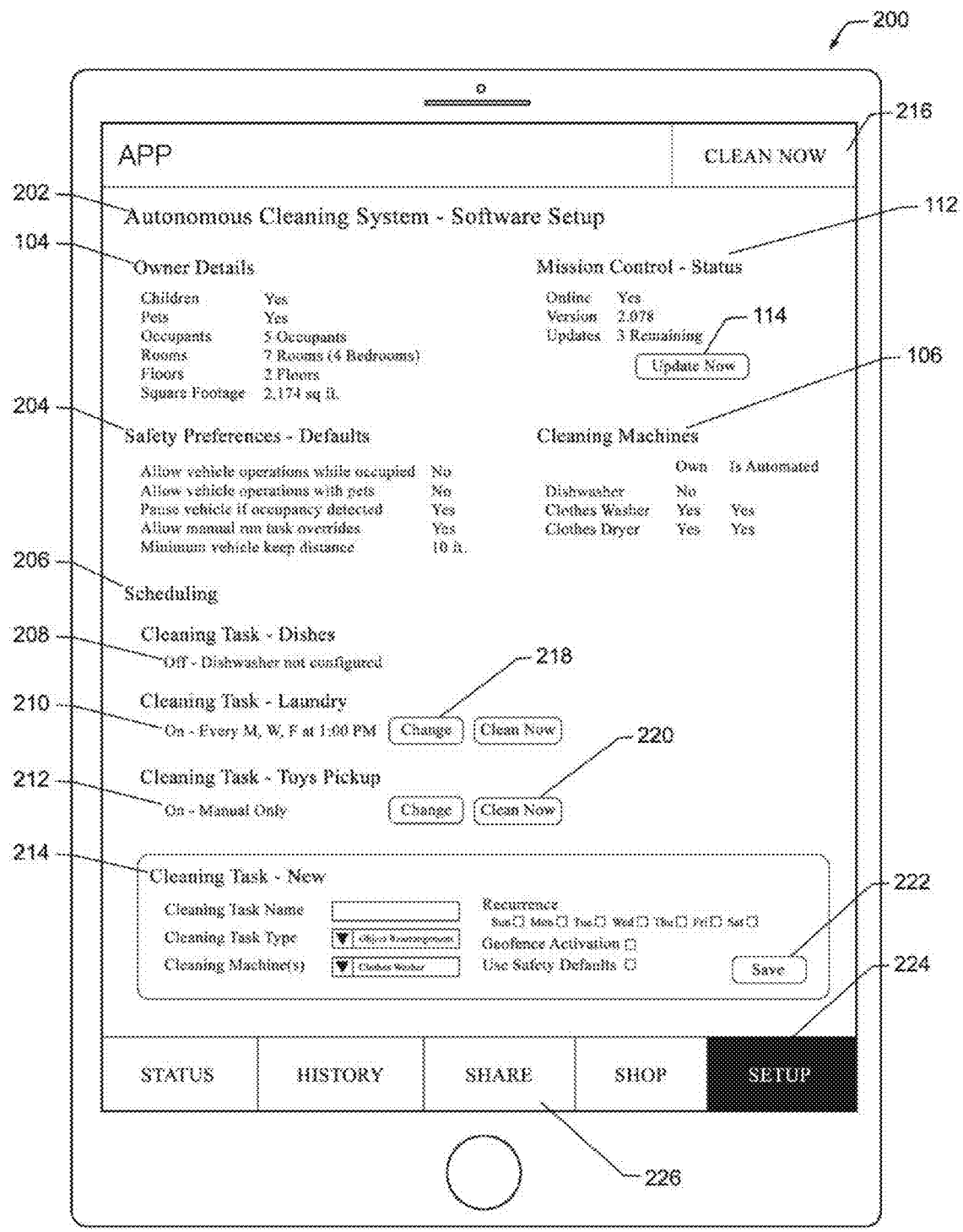
FIG. 2 depicts a graphical user interface for managing a software configuration for the autonomous cleaning system, in an implementation.

FIG. 2 depicts a graphical user interface 200 for managing a software configuration for the autonomous cleaning system, according to an implementation. In this example, an owner is using an app on a tablet form factor to customize the system defaults with their own safety 204 and scheduling 206 preferences for their "Software Setup" 202 after selecting the "SETUP" button 224 in the app. Preferences may include, for example; changing 218 whether to initiate a cleaning task automatically within designated days/times 210 or manually 212 by clicking a "Clean Now" button 220 in various locations in the app 216, whether to operate with or without human or pet occupancy for safety preferences 204, and which cleaning task(s) they would like to automate or not 208. An owner may also set up new cleaning tasks 214 with various preferences that are sent to mission control (FIG. 26) upon selecting "Save" 222. The owner may also reference their current needs profile 104 and hardware configurations such as their "Cleaning Machines" 106 white customizing their software configuration. Some software configuration settings 200 may have system dependencies such as new versions of software programs running on mission control 2614 (FIG. 26) that the owner may be prompted to update 114 before they can choose certain features or settings in the software setup 202.

More examples (not shown) for software configuration options 202 may be, for example; whether to include a clean object step in an object rearrangement cleaning task 214, such as: cleaning the linens bi-monthly during a daily bed-making task, or cleaning children's toys weekly during a nightly pick-up task. More examples stilt may include, for example; selection the load threshold of dirty objects that constitute being worthy of initiating a cleaning cycle for, such as: the use case where a single bowl, spoon, and glass may be moved to a counter staging location, or into the dishwasher, but not commencing the cleaning cycle until the dishwashing machine is at least 75% full. Some tasks may not require load thresholds, such as always picking up children's toys at the scheduled time regardless of how many toys are on the floor.

The app may run on various form factors such as, for example; tablets, phones, watches, TVs, computers, in-car screens, smart appliances, universal remote controls, etc. The app may be optimized for the selected form factor, and provide a graphical user interface for some or all of the app's features or status information. The app 200 may contain other features such as, for example; sharing an ideal object arrangement state with others in the context of a social network after clicking the "SHARE" 226 button.

Figure 3:
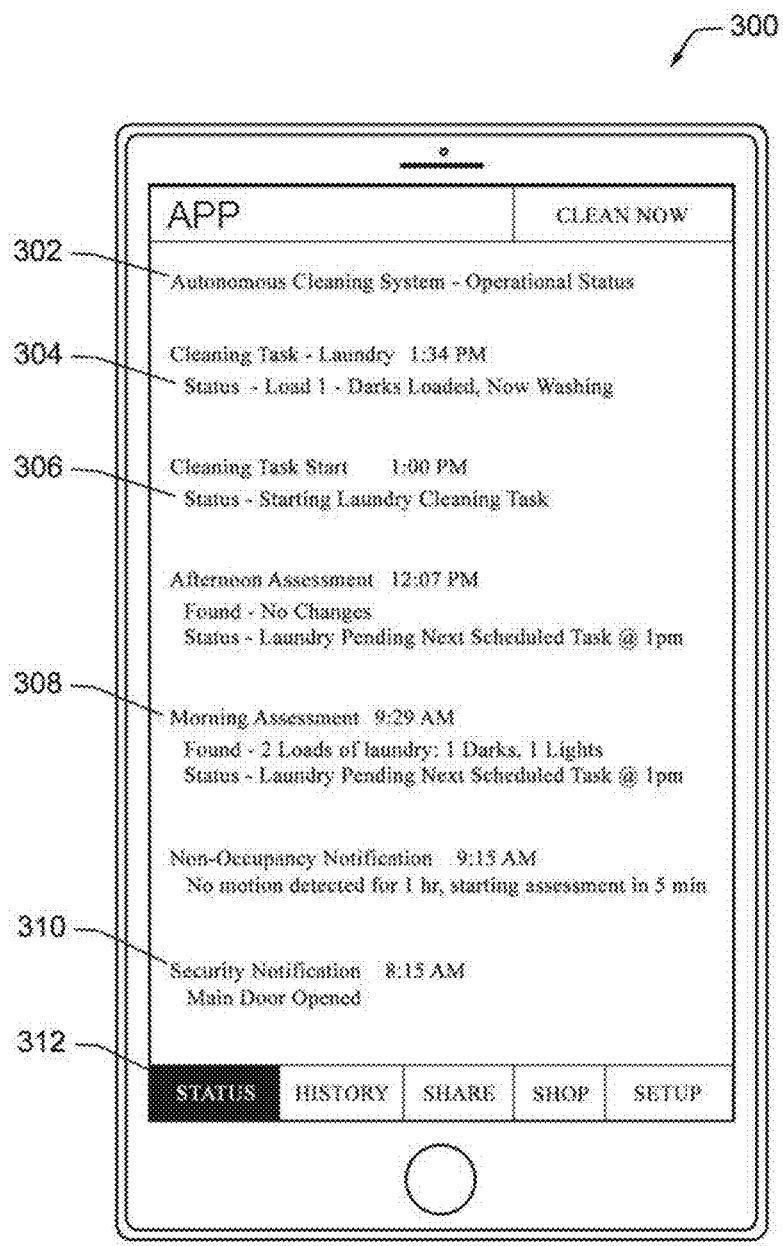
FIG. 3 depicts a graphical user interface for viewing the status of the autonomous cleaning system, in an implementation.

FIG. 3 depicts a graphical user interface 300 for viewing the status of the autonomous cleaning system, according to an implementation. In this example, an owner is using an app on a phone form factor, and has selected the "STATUS" button 312 to view the current status notifications 302 they have subscribed to. Status notifications may include, for example; an assessment notification such as "Morning Assessment—9:29 AM" 308 that lists summary details of the scouting assessment report which are to be completed according to the mission plan, a task start notification such as "Cleaning Task Start—1:00 PM" 306 that states the task has started per the scheduled date/time recurrence preferences, and a current progress notification such as "Cleaning Task—Laundry—1:34 PM" 304 that states the unmanned vehicles have loaded the washing cleaning machine with the first load of dark clothing items, and is now washing. Current progress notifications 304 may be pushed to the user for one or more stages throughout the cleaning cycle, or the user may use the app to pull up the current status or notification history, even if they have not previously subscribed to receive them. The current operational status 302 may also include estimated time of completions for each stage or task, and other customizable data elements the owner wishes to be notified for.

The owner may configure the autonomous cleaning system to command, schedule, or view status for other machines 106, 116 that interface with mission control such as autonomous vacuum cleaner(s), smart door locks, automated lighting, or other smart appliances for example. The configuration of interfaced machines may include additional notifications such as, for example; integrations with smart locks in a "Security Notification—8:15 AM, Main Door Opened" 310. The system may allow complex configurations (not shown) between integrated machines and other sensors such as, for example; pause forward movement of an unmanned aerial vehicle and turn on a light if a human enters the room, then resume forward vehicle movement and turn a light off when the human leaves the room in response to an occupancy motion sensor. Another example may be, detecting the arrival of a package containing a soap package refill, where mission control signals to unlock a smart door, send unmanned vehicle(s) to autonomously retrieve the package, open the package if necessary, and insert the soap refill into the appropriate cleaning machine autonomously. These interfaces may be provided by custom application programming interfaces (APIs) 2606 (FIG. 26) in the autonomous cleaning system's computing system(s), and/or leverage $3^{rd}$ party APIs from other automation service providers.

Figure 4:
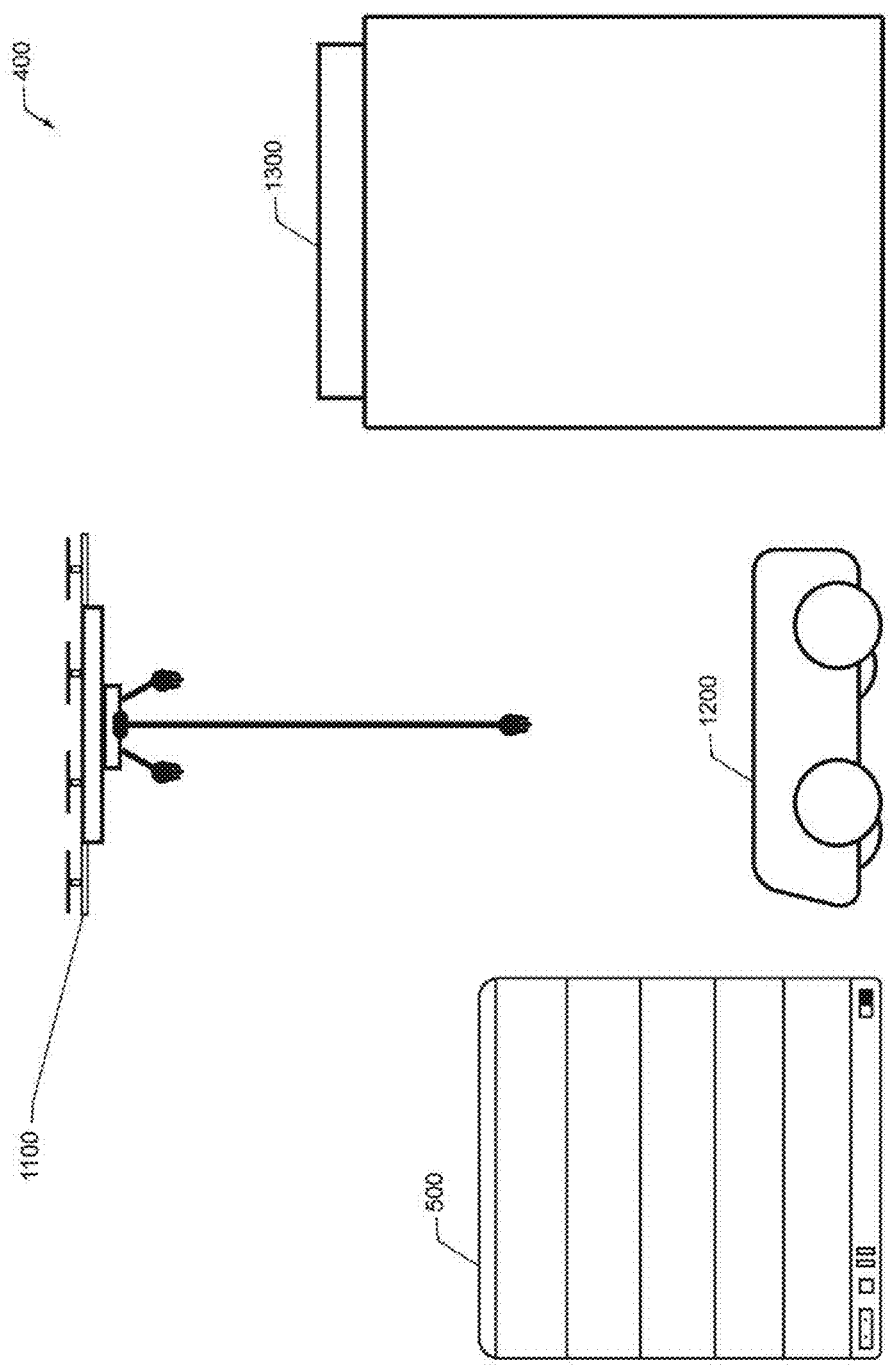
FIG. 4 depicts a block diagram overview of the primary components comprising the autonomous cleaning system; a mission control aerial vehicle housing unit, an unmanned aerial vehicle of the plurality of unmanned vehicles, an unmanned ground vehicle of the plurality of unmanned vehicles, and a cleaning machine, according to an implementation.

FIG. 4 depicts a block diagram overview of the primary components 400 comprising the autonomous cleaning system; a mission control system 500 (FIG. 5) with integrated aerial vehicle housing, an unmanned aerial vehicle 1100 (FIG. 11) of the plurality of unmanned vehicles, an unmanned ground vehicle 1200 (FIG. 12) of the plurality of unmanned vehicles, and a cleaning machine 1300 (FIG. 13) of one or more cleaning machines, according to an implementation. At the core of the autonomous cleaning system, mission control 500 (FIG. 5) commands and coordinates cleaning operations for the home, sending the plurality of unmanned vehicles 1100 (FIG. 11) and 1200 (FIG. 12) to autonomously or semi-autonomously scout, identify, pick up, release, navigate with, and transport objects to and from a cleaning machine 1300 (FIG. 13) or designated drop location 1400 (FIG. 14) inside a home for the assigned cleaning task.

Mission control 500 (FIG. 5) and unmanned aerial vehicles 1100 (FIG. 11) are required components, as the autonomous cleaning system cannot operate without them. The system may complete some cleaning tasks in whole or in part without an unmanned ground vehicle ("UGV") 1200 (FIG. 12), but a UGV supports the system in important ways such as, for example; reducing the distances and number of individual aerial trips needed by unmanned aerial vehicles 1100 (FIG. 11) by providing a localized staging area when loading objects (FIG. 18), which can then be transported in a larger group of objects in a laundry basket for example on top of a UGV, to a cleaning machine for unloading objects (FIG. 19), or carrying heavier objects that are beyond the payload capacity of the unmanned aerial vehicles. The autonomous cleaning system may also complete object rearrangement cleaning tasks without a cleaning machine 1300 (FIG. 13) if no clean object steps are included, but cleaning machine(s) 1300 (FIG. 13) are generally considered required hardware components for the autonomous cleaning system as clean object tasks are the primary use cases for the system.

Figure 5:
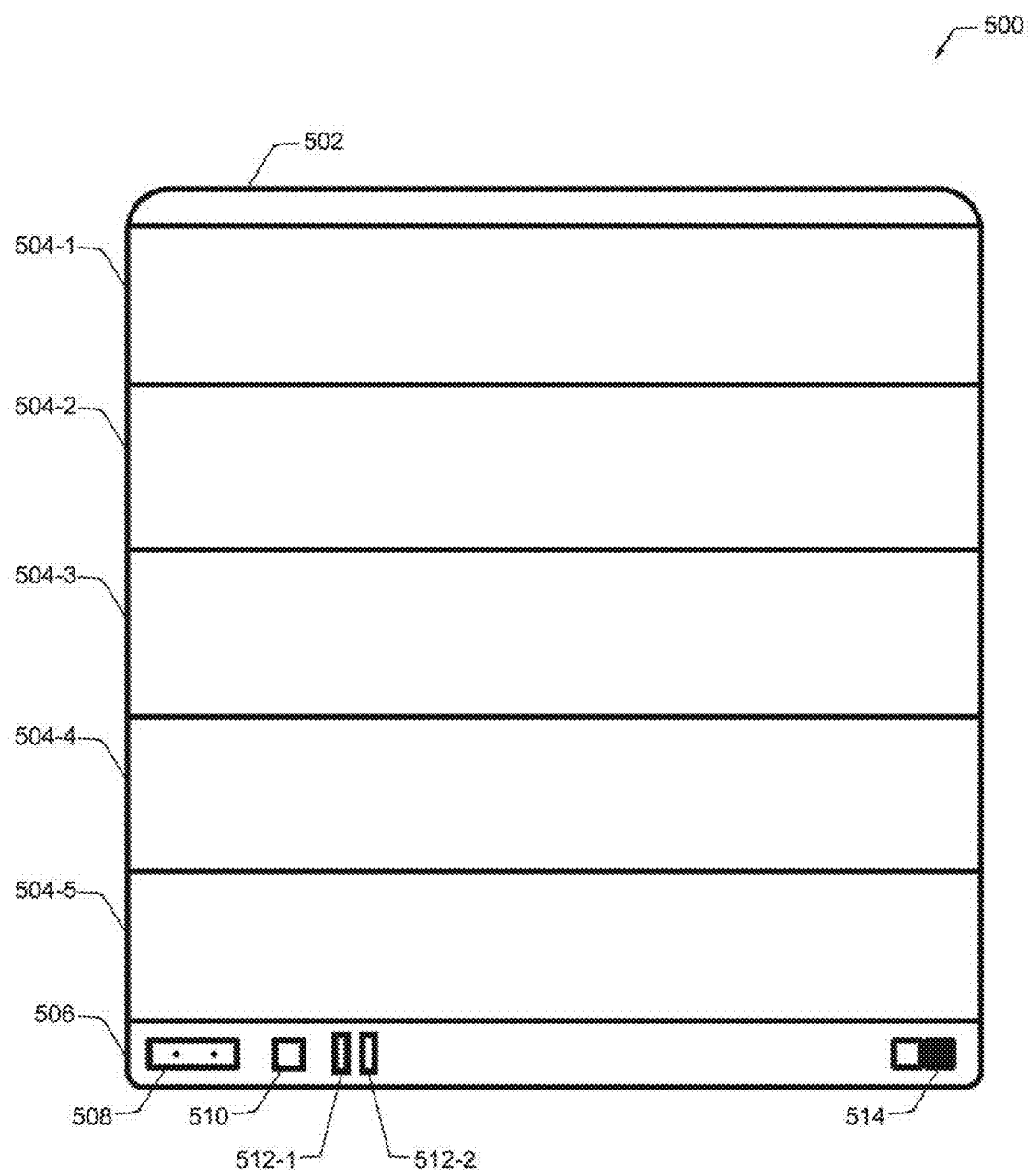
FIG. 5 depicts a block diagram of the rear side of a mission control unmanned aerial vehicle housing, according to an implementation.
Figure 9:
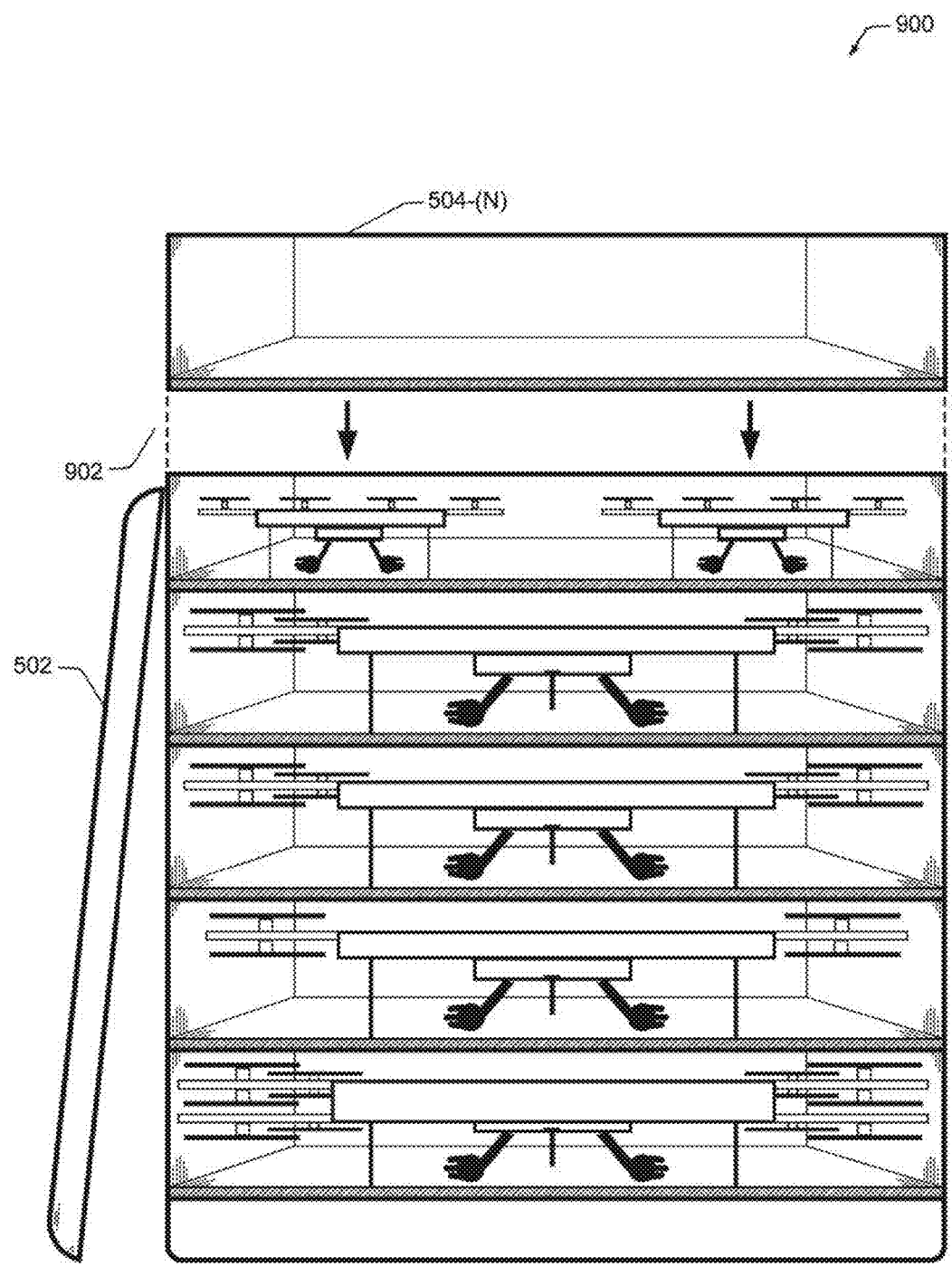
FIG. 9 depicts a block diagram of the front side of a mission control vehicle housing, with the lid removed and a new vehicle bay being stacked on the top of the housing, according to an implementation.

FIG. 5 depicts a block diagram of the rear side of a mission control unmanned aerial vehicle housing 500, according to an implementation. In this example, mission control 500 comprises of five unmanned aerial vehicle storage and recharging bays 504-1, 504-2, 504-3, 504-4, 504-5 stacked on top of each other that house unmanned aerial vehicles (FIG. 11), which are stacked on top of the mission control computing system base 506, and topped with a removable lid 502. The system is expandable, and allows for (N) number of vehicle bays (FIG. 9). In the back of the mission control base 506, are ports for power 508, networking 510, and USB 512-1, 512-2, as well as a power on/off switch 514. Inside the mission control base 506 is a computing system comprising of computing components (FIG. 26) such as, for example; data storage memory, computing processor(s), networking, and other components which are used by the mission control system 506, as described in further detail below.

The autonomous cleaning system may use (N) number of mission control computing systems in various configurations on the home's local network such as, for example; in a primary only configuration with other units being utilized primarily for their vehicle housing and recharging functions for supporting additional unmanned aerial vehicles, in a primary-slave(s) configuration where additional units are used for server failover in the event the primary server unit is offline or unavailable, or for delegating computational loads/processes, or in a primary-primary configuration where multiple mission control computing systems operate in parallel.

Figure 6:
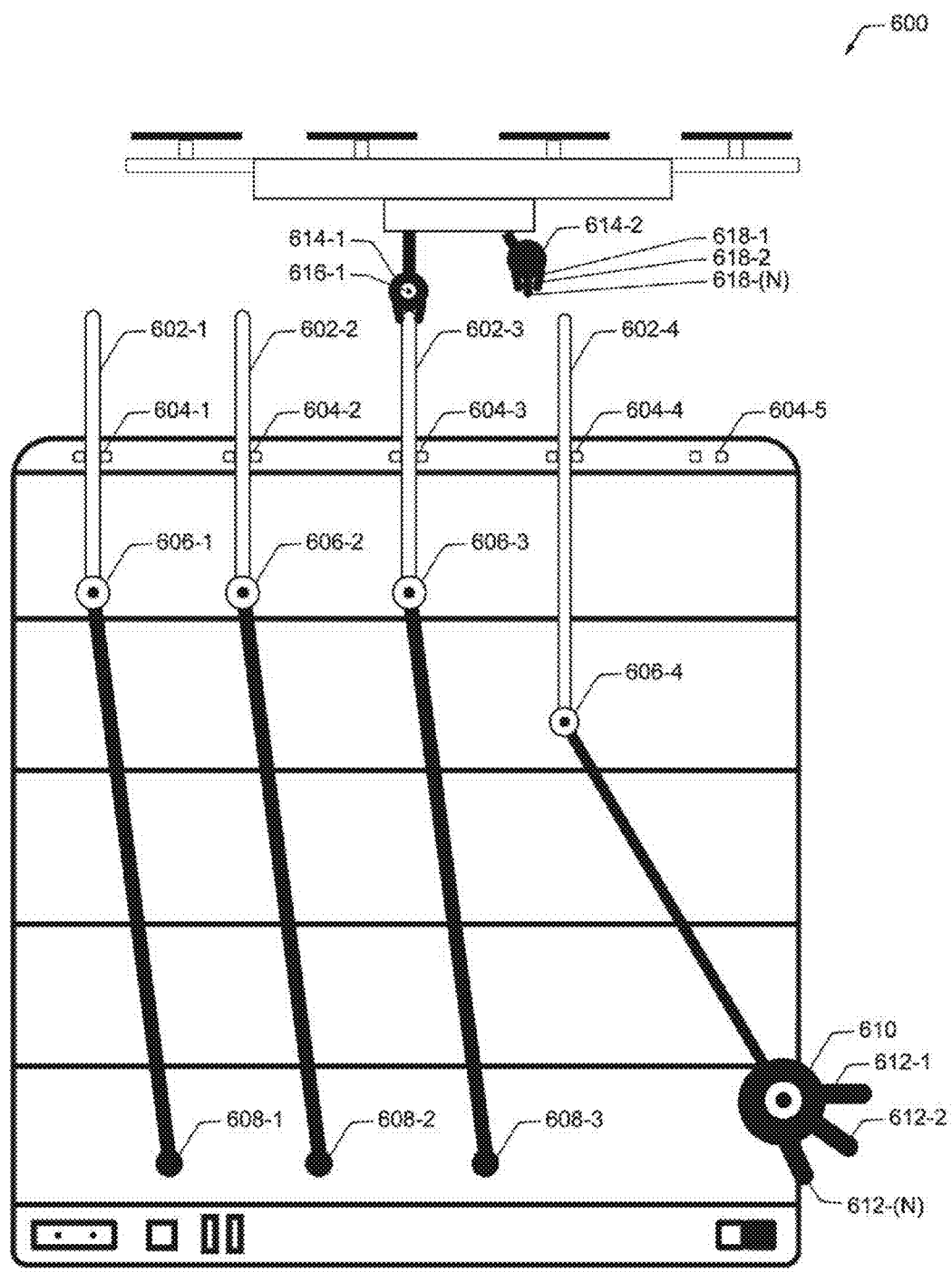
FIG. 6 depicts a block diagram of an unmanned aerial vehicle grasping one of the examples of unmanned vehicle attachments for grasping or poking objects, according to an implementation.

FIG. 6 depicts a block diagram of primary 614-1, 614-2 and secondary 602-1, 602-2, 602-3, 602-4 attachments 600 used by unmanned aerial vehicles to physically control objects and surfaces. In this example, an unmanned aerial vehicle (FIG. 11) extends a primary 614 grasper attachment, connected to the unmanned aerial vehicle, grasping one of the examples of secondary attachments 602-3 for poking objects, according to an implementation. The secondary attachments 602-1, 602-2, 602-3, 602-4 may be attached to the rear side of a mission control vehicle housing 500 at connection points 604-1, 604-2, 604-3, 604-4 respectively, with one available connection point 604-5.

These connection points 604 may be fixed and allow the secondary attachment 602 to snap into or out of place by force, or may slide open/closed mechanically when a signal is received by the mission control housing 500 from the unmanned aerial vehicle (FIG. 11) having secured a grasping connection on the secondary attachment's 602-3 handle with the unmanned aerial vehicle's primary grasper 614-1. The attachments may be connected to the exterior sides of mission control housing(s) as viewed in 600, or they may be attached to other machines, such as, for example; cleaning machines, smart appliances, or specialized attachment storage housings.

The primary graspers 614 and secondary attachments 602 may have rotation joints 616-1, (616-2 not shown), and 606-1, 606-2, 606-3, 606-4 respectively to provide degrees of freedom for pitching, yawing, and rolling while controlling objects or surfaces. Operation of the attachment's movements such as a rotation joint 616 are controlled by the unmanned vehicle's object control system 1118 (FIG. 11), and then sent through to the attachment, either at the point of connection between the unmanned vehicle's grasper at the attachment handle, or by wireless signals such as low energy Bluetooth.

In this example, the round ball ends 608-1, 608-2, 608-3 for the secondary attachments provide a contact surface when poking/pressing against objects such as buttons (FIG. 21) or the top edge of a plate (FIG. 15) for example. And the grasper end 610 for the secondary attachment 602-4 provides an ability to grasp objects and surfaces at a distance such as drawers, lids, or door handles (FIG. 21) for example when the unmanned aerial vehicle's object control system 1118 (FIG. 11) sends a signal to the attachment 602-4 for the grasper end 610 to move the grasper's fingers together 612-1, 612-2, 612-(N) in a grasping formation such as, for example; a raking grasp, palmar grasp, or pincer grasp. Similarly, the primary grasper's 614 fingers 618-1, 618-2, 618-(N) may move together in a grasping formation for grasping secondary attachments 602. The force and type of grasp are determined by the mission control computing system 506 as appropriate for the current operating step in the cleaning task and for the object or surface as identified by the image(s) sent from the unmanned vehicle's (FIG. 11), (FIG. 12) camera(s).

Figure 7:
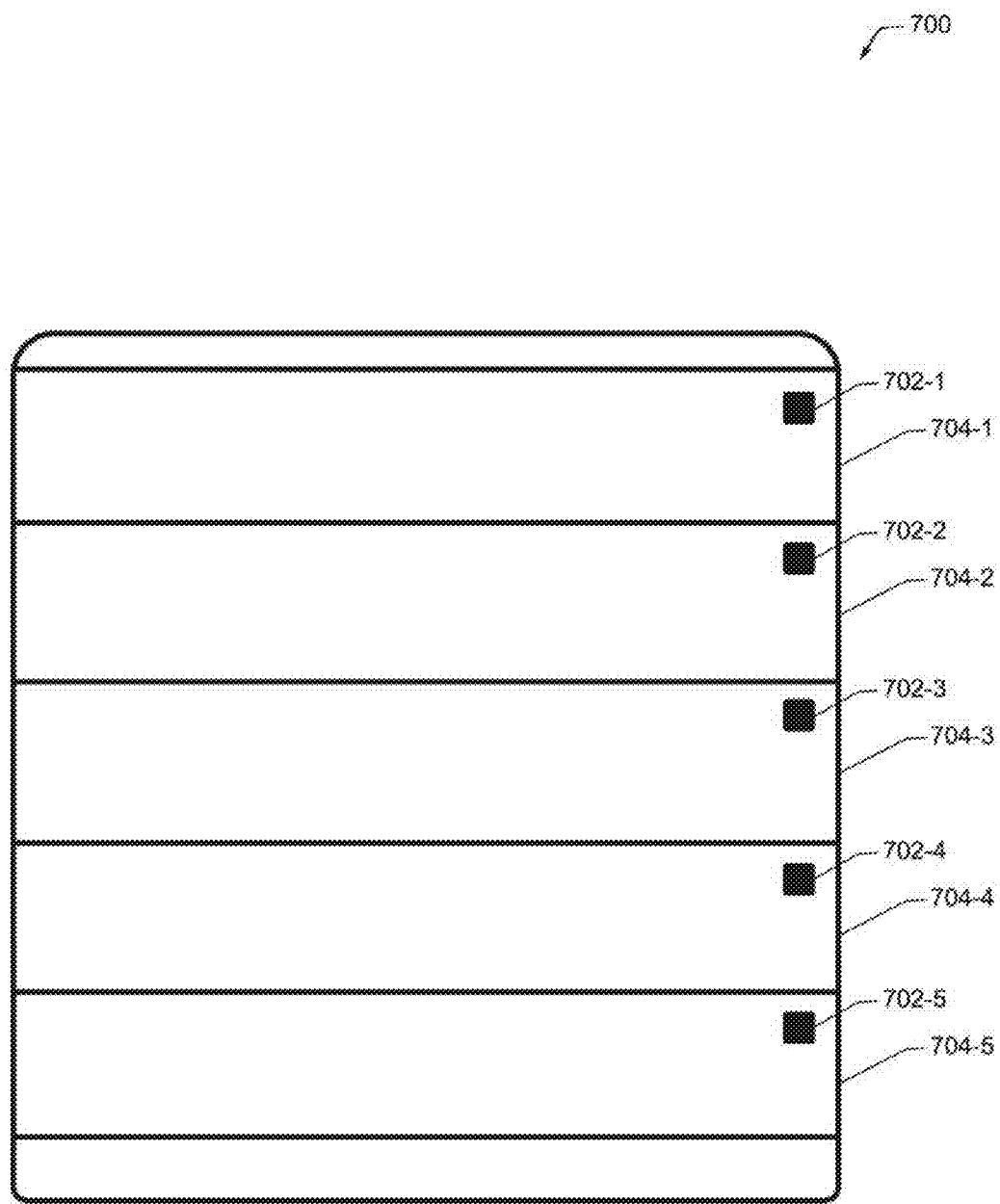
FIG. 7 depicts a block diagram of the front side of a mission control vehicle housing, with five vehicle bay doors in a closed position, according to an implementation.

FIG. 7 depicts a block diagram of the front side 700 a mission control unmanned aerial vehicle housing 500, with five vehicle bay doors up in a closed position, with each bay door 704-1, 704-2, 704-3, 704-4, 704-5 having a respective eject button 702-1, 702-2, 702-3, 702-4, 702-5 to open the door down and eject an inner tray (FIG. 10), according to an implementation. The physical eject buttons 702 in this example, are for use by people if needed but the same digital signals that are sent when pressing the buttons, are primarily sent by the mission control computing system 506 to the bay door/tray controllers 2622 (FIG. 26) to manage aerial vehicle traffic of unmanned aerial vehicles 1000 (FIG. 10) that enter and exit, the vehicle housing. While the mission control system 506 primarily sends the commands for opening/closing of bay doors/trays during normal operations of executing the mission plan, the unmanned aerial vehicles may also send the signal over the wireless network if needed.

Figure 8:
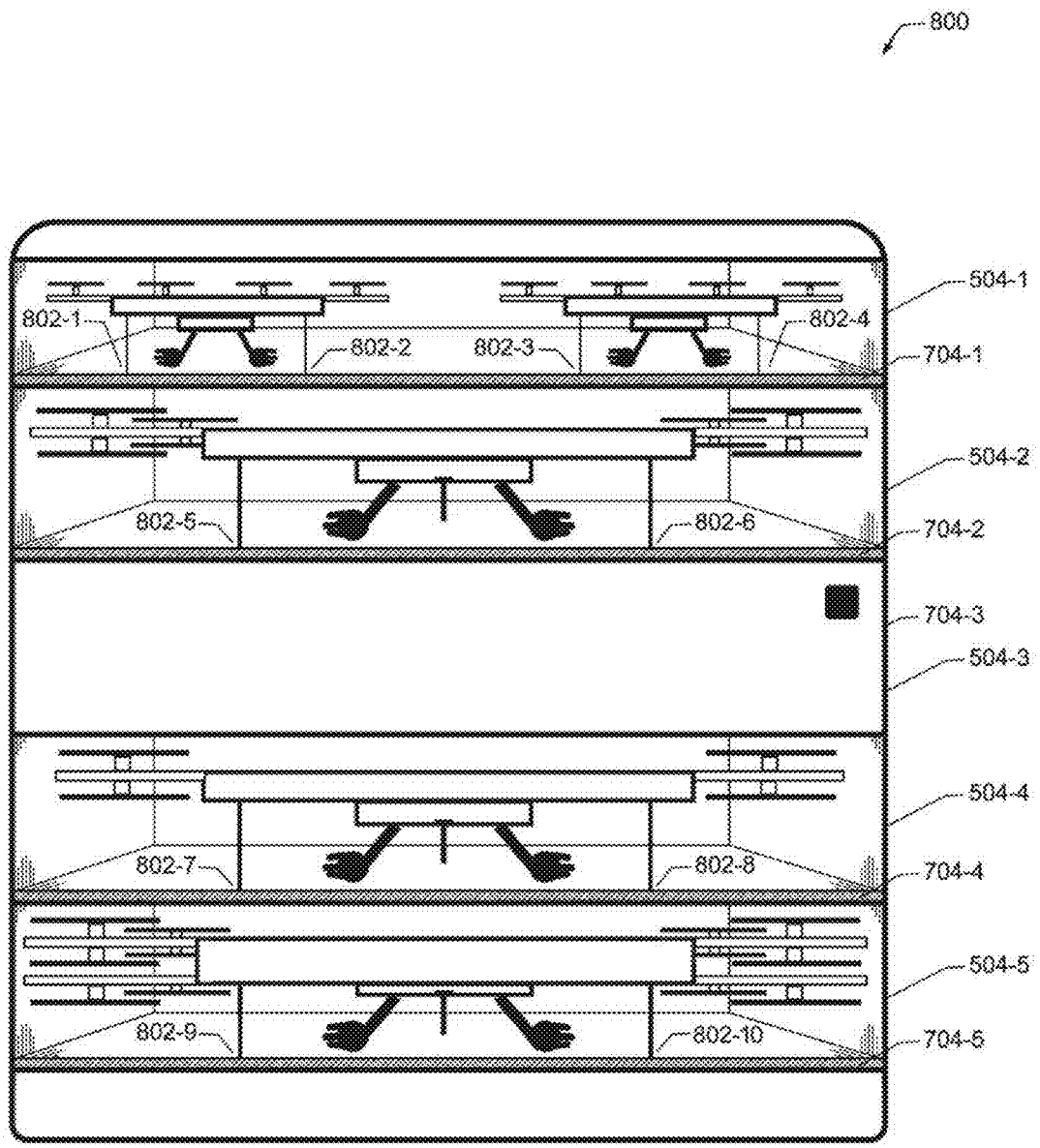
FIG. 8 depicts a block diagram of the front side of a mission control vehicle housing, with four of the five vehicle bay doors in an open position, revealing five unmanned aerial vehicles of various configurations, according to an implementation.

FIG. 8 depicts a block diagram of the front side of an unmanned aerial vehicle housing, with one bay door in a closed position and four bay doors in an open position 800, revealing five unmanned aerial vehicles (FIG. 11) of various configurations in storage and recharging positions, according to an implementation. In this example, the bay doors 704-1, 704-2, 704-4, 704-5 are down in the open position for vehicle bays 504-1, 504-2, 504-4, 504-5 respectively, and the bay door 704-3 is up in the closed position for bay 504-3.

While unmanned vehicles may receive power wirelessly for recharging their batteries (FIG. 11) (FIG. 12), in this example the unmanned aerial vehicles receive power to recharge through induction or by direct contact from the bottom of the unmanned aerial vehicle's landing feet 802-1, 802-2, 802-3, 802-4, 802-5, 802-6, 802-7, 802-8, 802-9, 802-10 while resting upon the top surface of the inner trays 1002-1, 1002-2, 1002-3, 1002-4, 1002-5 (FIG. 10) inside the vehicle bays 504-1, 504-2, 504-4, 504-5 respectively.

FIG. 9 depicts a block diagram of the front side of an unmanned aerial vehicle housing, with the lid removed and a new vehicle bay being stacked on the top of the housing 900, according to an implementation. In this example, the mission control vehicle housing lid 502 has been removed, and rested against the side of the unit so additional vehicle bay(s) 504-(N) can be stacked 902 on top of the bay below it. This provides the owner the ability to add more vehicle bays and therefore to allow room for adding additional unmanned aerial vehicles to the system. For larger homes and configurations, the website 100 or app 200 may advise how many vehicle bays are safe to stack vertically per mission control unit (not shown) and to expand the system with additional mission control units. The website 100 or app 200 may also calculate and advise (not shown) the most efficient configuration for the placement location(s) and total number of mission control units/vehicle bays per placement in the home. Mission control 500 may also track the task completion times with relationships to the home's features (obstacles), the hardware inventory and configurations, and placements of the hardware in the home to calculate and advise (not shown) the most efficient setups through the website 100 or app 200, through lists or charting for example.

Figure 10:
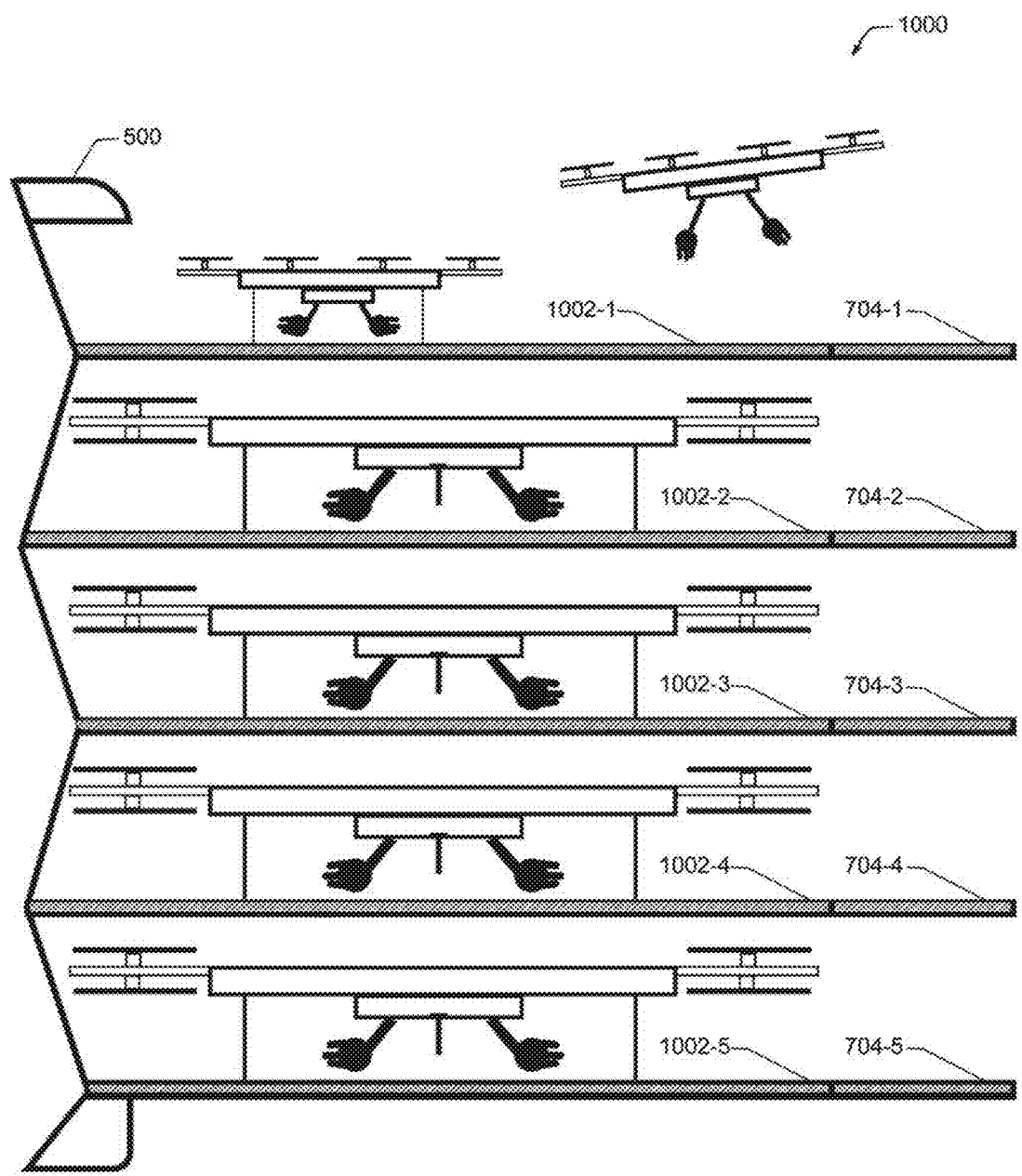
FIG. 10 depicts a block diagram of a side-cutout view of a mission control vehicle housing, with five unmanned vehicle bay doors in the open position and inner trays extended out of the housing to allow for lift offs, according to an implementation.

FIG. 10 depicts a block diagram of a side-cutout view 1000 of a mission control vehicle housing 500 with all bay doors open and inner trays extended to allow for aerial lift offs, according to an implementation. In this example, five unmanned vehicle bay doors 704-1, 704-2, 704-3, 704-4, 704-5 are down in the open position and the vehicle bay's inner trays 1002-1, 1002-2, 1002-3, 1002-4, 1002-5 are fully extended out of the aerial vehicle housing to allow for aerial lift offs, with one smaller scout aerial vehicle lifting off and taking flight. Mission control commands the landings and lift-offs of the unmanned aerial vehicles, where in this example, if all vehicles are of sufficient power levels, lift off order is from top to bottom, with the aerial vehicles in the top bay lifting off one at a time, then the extended tray 1002-1 retracts back inside the housing, and its bay door 704-1 closes back to the up position, which makes room for the next aerial vehicle below it to lift off, and so on until all vehicles have lifted off, and all trays are retracted and bay doors closed. The reverse may be true for landings, but mission control prioritizes by power levels as to the landing order of unmanned aerial vehicles, and may anticipate openings before the unmanned aerial vehicle arrives by continually monitoring the power levels of the unmanned vehicles.

Figure 11:
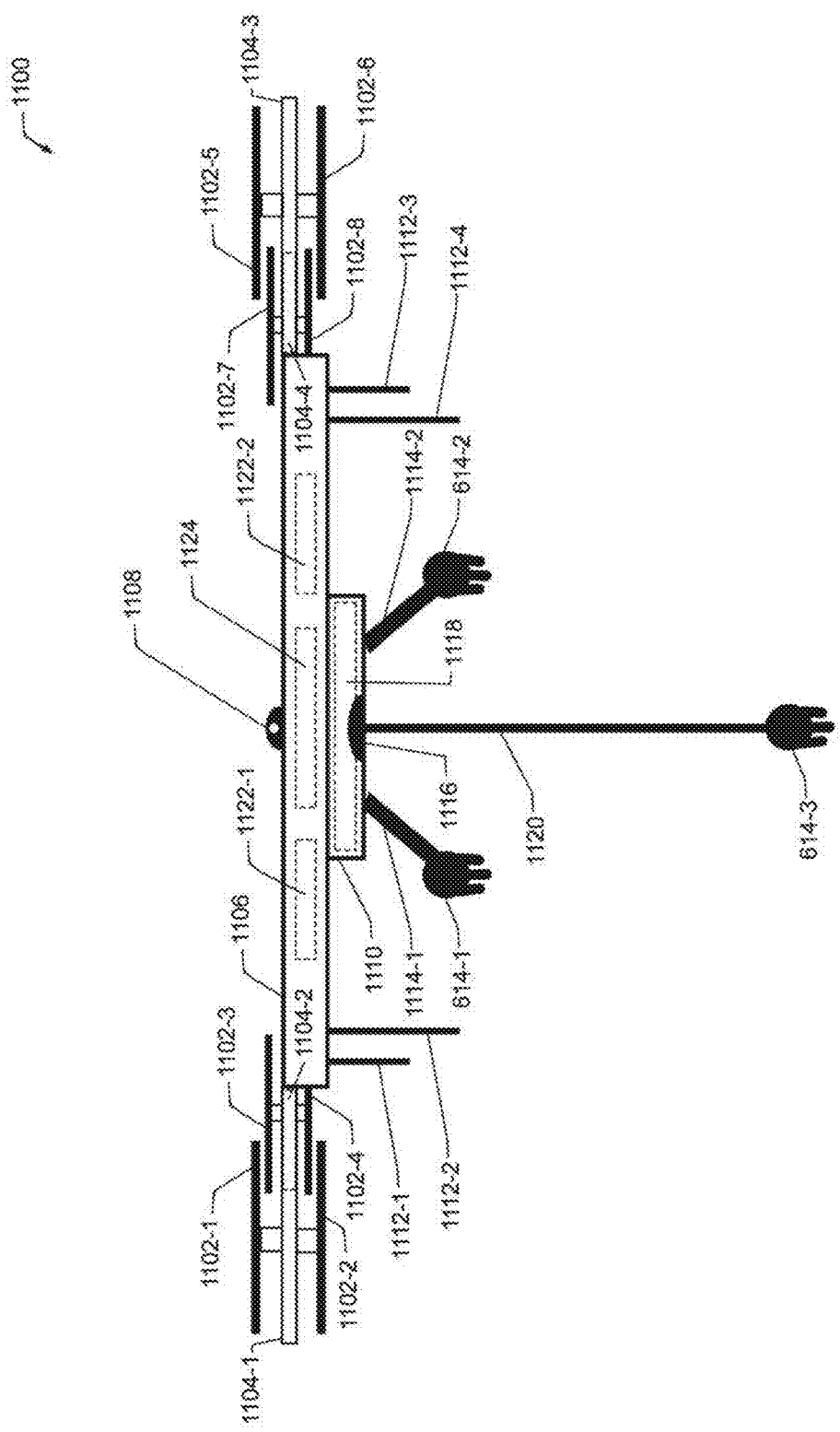
FIG. 11 depicts a block diagram of a front view of an unmanned aerial vehicle, according to an implementation.

FIG. 11 depicts a block diagram of a front view of an unmanned aerial vehicle 1100 of a plurality of unmanned aerial vehicles, according to an implementation. As illustrated in 1100 on the left side of the vehicle, propeller 1102-1 is connected on top of support arm 1104-1, and propeller 1102-2 is connected to the bottom of the same support arm 1104-1. Propeller 1102-3 is connected on top of hidden support arm 1104-2, and propeller 1102-4 is connected to the bottom of the same support arm 1104-2, where support arm 1104-2 is behind support arm 1104-1. Likewise, the configuration is similar for the right side of the vehicle, where propeller 1102-5 is connected on top of support arm 1104-3, and propeller 1102-6 is connected to the bottom of the same support arm 1104-3. And finally, propeller 1102-7 is connected on top of hidden support arm 1104-4, and propeller 1102-8 is connected to the bottom of the same support arm 1104-4, where support arm 1104-4 is behind support arm 1104-3. All four support arms 1104 are connected to the frame's housing body 1106. In this example, four legs 1112-1, 1112-2, 1112-3, 1112-4 are also connected to the bottom of the housing body 1106.

This example of an unmanned aerial vehicle 1100 is a larger and more powerful octocopter with eight propellers 1102 but on a smaller quad-frame where two propellers are connected to each of the four support arms 1104, one above and one below, and with the four support arms 1104 connected to the quad-frame housing body 1106, which may be used for lifting heavier payloads and controlling objects or surfaces with secondary attachments 602 grasped by one or more of its primary graspers 614, depending on the mission plan as determined by mission control 506. While the system supports unmanned aerial vehicles of various sizes and frame/propeller configurations, such as smaller quadcopters for scouting assessments as illustrated in vehicle bay 504-1 in FIG. 8 for example, the advantage of using an octocopter's eight propellers on a smaller four-arm quad-frame with two propellers per support arm 1100, is getting the power of eight propellers with the smaller dimensions of a smaller frame body, thereby reducing the footprint of the mission control vehicle housing 500 and the space required in the air when working together or in proximity to obstacles.

In other implementations, there may be more or fewer propellers, support arms, or propellers per support arm, depending on the configurations chosen by the system owner. The support arms 1104 and housing body 1106 may be of any suitable material (e.g. carbon fiber, plastic, graphite, aluminum) provided the structures can reliably support their payloads while minimizing the weight of the vehicle. In this system, the lighter structure of the vehicle is, the more it can carry, both in internal components and in payloads it transports. Similarly, the propellers 1102 may be any form of propeller (e.g. carbon fiber, plastic, graphite, aluminum) and of a size sufficient to lift the unmanned aerial vehicle 1100, any attachments 600, and any object(s) it carries so that the vehicle 1100 can reliably lift the payload and curry it to the cleaning machine or designated drop location. Likewise, the propeller motors may be of any form of motor capable of generating enough speed for the propellers to lift the unmanned aerial vehicle 1100, any attachments 600, and any object(s) it carries per the mission plan. For example, the propeller motors may each be a SunnySky V2216-12 KV800 II brushless motor.

The unmanned vehicle control system 1124 controls the operations of the unmanned aerial vehicle 1100, including the operation of camera(s) 1108, the extension/retraction of the vehicle's legs 1112, the propeller motors, and other components (FIG. 27) housed inside the housing body 1106. The unmanned vehicle control system 1124 comprises many sensors and components such as, for example; gyros, accelerometers, flight control boards, electronic speed controllers, etc. found in multi-rotor aerial vehicles. In some implementations, this vehicle control system 1124 may also have additional specialized sensors such as, for example; a night vision sensor if selected in the hardware configuration 118. The unmanned vehicle control system 1124 also commands the object control system 1118 housed in the object control housing 1110 attached to the main housing body 11106, which controls the primary attachment arms 1114-1, 1114-2, which may be connected to primary attachment graspers 614-1, 614-2, as well as controlling the tether extension/retraction winch 1116, the object tether 1120, and any tether attachment 614-3.

The unmanned vehicle control system 1124 may operate automatically as needed, but is primarily commanded by mission control 506 per the mission plan for each operation it performs. For example, mission control 506 may command the unmanned aerial vehicle 1100 to move forward to the location of a cleaning machine (FIG. 13), but the unmanned vehicle control system 1124 determines the speeds to send to the propeller motors which turn the propellers at certain speeds, changing the pitch of the aerial vehicle, which then moves the vehicle forward. As those of ordinary skill in the art will understand, a multi-rotor aerial vehicle may generally move forward by increasing the speed (rotations per minute RPMs) of the rear motors and/or decreasing the speed of the front motors. This is referred to as changing the pitch of an aerial vehicle. To move a multi-rotor aerial vehicle up or down, the motors run at the same speed, and speed is increased equally to all motors to ascend higher in altitude, or decreased to descend. Therefore, while mission control 506 may command the vehicle as to what destination to travel to per the mission plan, the vehicle's control system 1124 actually executes it.

The unmanned vehicle control system 1124 and object control system 1118 may be connected to and powered by rechargeable batteries 1122-1, 1122-2, which may be charged wirelessly through a wireless recharging receiver 2708 (FIG. 27) inside the housing body 1106 connected to the rechargeable batteries 1122, or charged by induction or direct contact when docked in a vehicle bay 504 as described above in 800. While some implementations may use other sources of power, the most common type of power source for unmanned vehicles of this size are rechargeable Lithium Polymer (lipo) batteries. Depending on the size of the vehicle, and presence of wireless recharging systems to continually recharge while in flight, the quantity and capacity of the lipo batteries will be as large as possible given the volume available inside the housing body 1106 and the payload weights the vehicle needs to carry. An example battery capacity for an implementation may be a 10,000 mAh lipo battery for a larger octocopter (8 propellers), or a 5200 mAh lipo battery for a smaller quadcopter (4 propellers). The mission control system 506 monitors the power levels in the batteries 1122, and will command the vehicle to return to a housing to recharge as needed. Mission control 506 also monitors the health of the battery cells, and may notify the system owner if a battery needs to be replaced when its lifetime has been exhausted.

Figure 12:
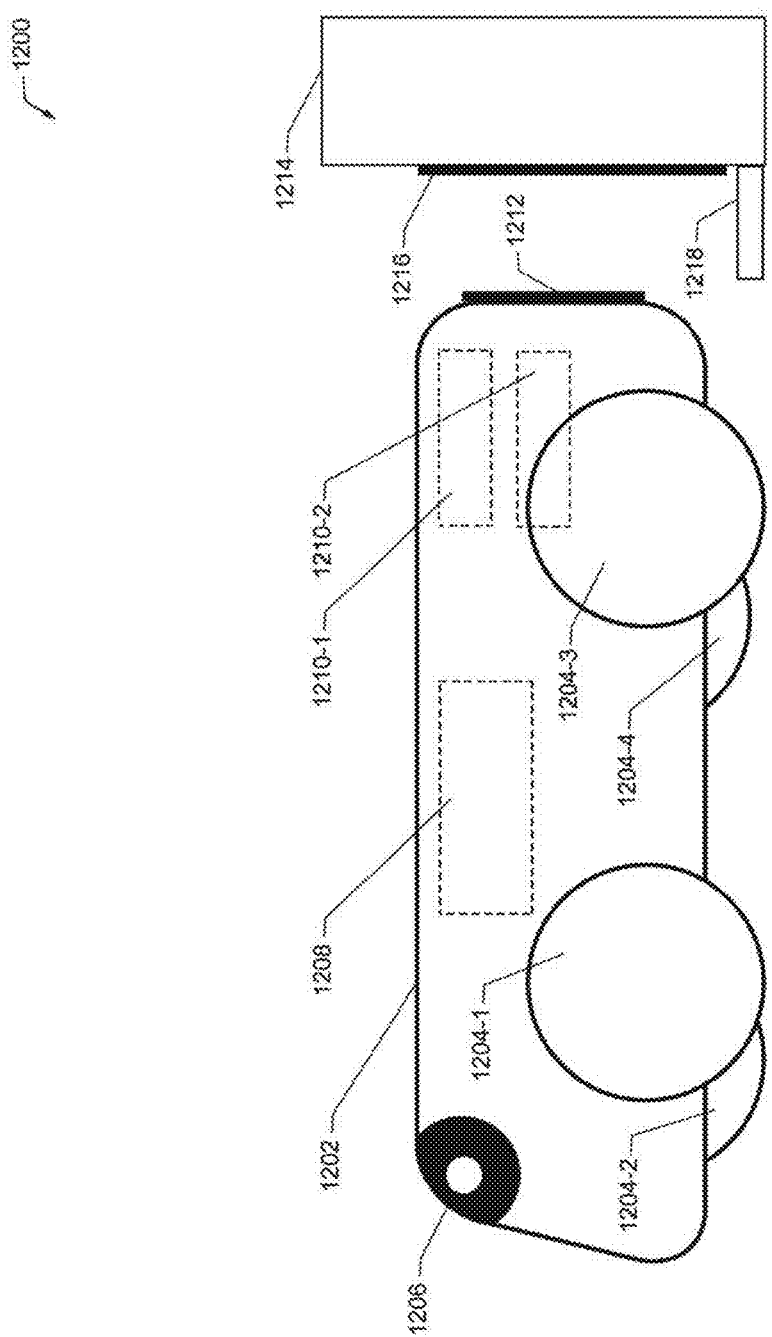
FIG. 12 depicts a block diagram of a side view of an unmanned ground vehicle and recharging housing, according to an implementation.

FIG. 12 depicts a block diagram of a side view 1200 of an unmanned ground vehicle and recharging housing, according to an implementation. As illustrated in this example, the unmanned ground vehicle may be driven by four wheels 1204-1, 1204-2, 1204-3, 1204-4, attached to axles that are coupled to the vehicle's housing body 1202. Inside the vehicle may be one or more camera(s) 1206, and an unmanned vehicle control system 1208 which may be powered by rechargeable lipo batteries 1210-1, 1210-2 similar to the unmanned aerial vehicle's batteries 1122. The vehicle may recharge wirelessly with an internal recharging receiver 2708 (FIG. 27), or by backing up to the recharging housing station and making direct or inductive contact with the vehicle's recharging receiver end 1212 and the recharging station's recharging transmission plate 1216, connected to the station's housing body 1214, supported by a platform base 1218. The station's housing body 1214 may also contain a power plug and network plug (not shown), similar to mission control's vehicle housing 500.

The wheels 1204 and housing body 1202 may be of any suitable material (e.g. carbon fiber, plastic, graphite, aluminum) provided the structures can reliably support their payloads white minimizing the weight of the vehicle to maximize the battery life. The unmanned ground vehicle is also driven by motors similar to those for aerial vehicles 1100, but instead of being connected to propellers, the motors for 1200 are connected to axles, that drive the wheels, as is typical with cars. The wheels should have a rough or gripping surface to increase traction. In other implementations, the wheels may be more like tank treads.

What makes the unmanned ground vehicle an important primary component (FIG. 4) in the system as described above in 500, is its ability to support in the execution of cleaning tasks per the mission plan in concert with the unmanned aerial vehicles 1100 and cleaning machines 1300, in response to mission control 506 sending command signals over the home's local network to the wireless receiver inside the unmanned ground vehicle's control system 1208, where it travels and transports objects as needed to support the cleaning task. An unmanned ground vehicle 1200 may or may not be utilized in every cleaning task type, but its inclusion may substantially improve the speed and efficiency of the overall task completion for the system.

Figure 13:
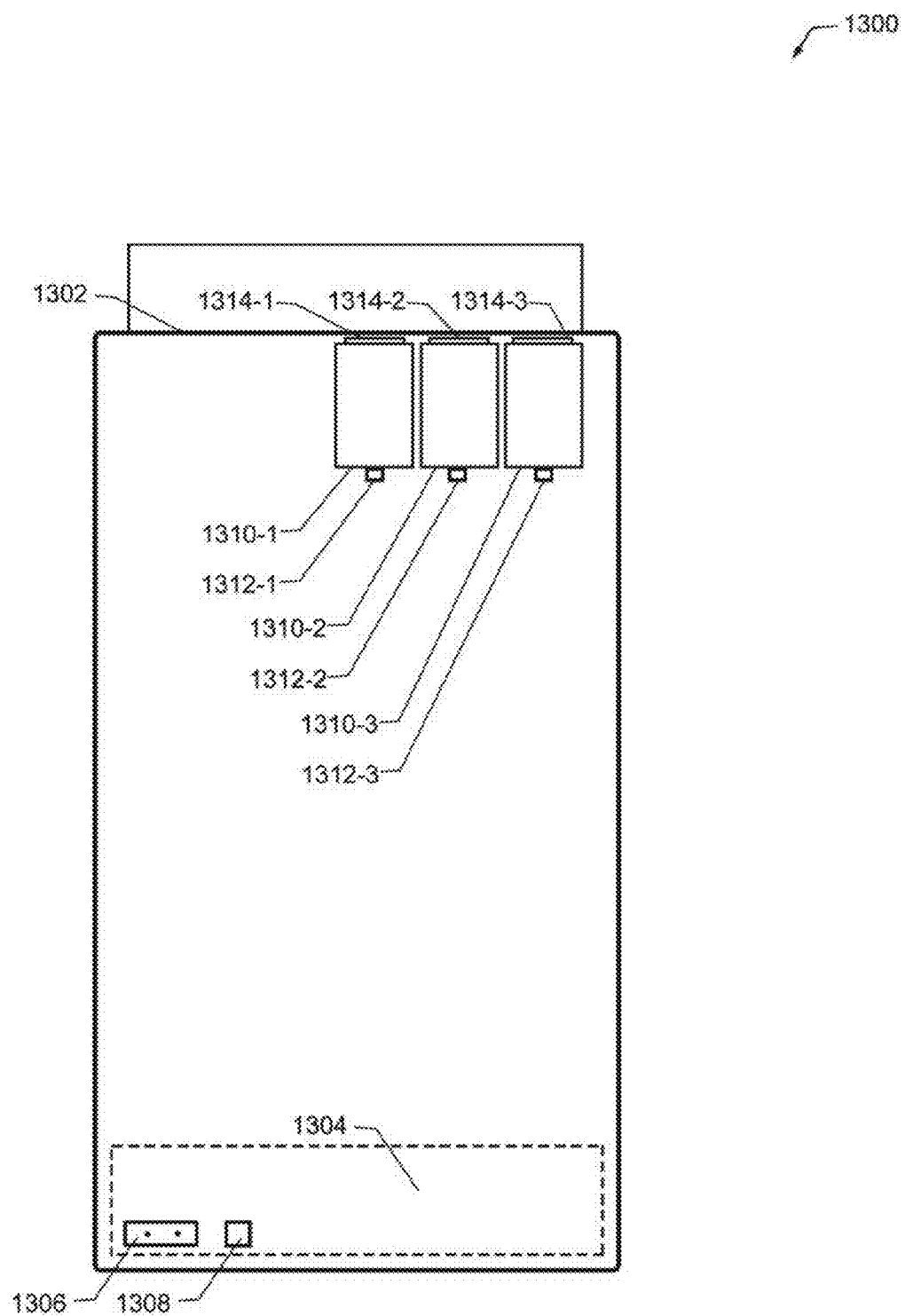
FIG. 13 depicts a block diagram of a cleaning machine, according to an implementation.

FIG. 13 depicts a block diagram of a cleaning machine 1300, according to an implementation. For the purposes of the autonomous cleaning system, the cleaning machine(s) 1300 may be automated or non-automated depending on the owner's equipment preferences and comprise various configurations, so long as the cleaning machine available for the desired cleaning task is appropriate for the associated object(s) it is designed to clean such as, for example; dish washing and drying, clothes washing and drying, clothes washing only, clothes drying only, etc.

An automated cleaning machine is similar to a non-automated cleaning machine, but may have additional automation features for supporting the autonomous cleaning system. First, the same digital signals and cycle settings that are normally sent to a cleaning machine by a human physically pressing a button or turning a dial on a non-automated cleaning machine, are instead sent by another machine. In one configuration, these operational command signals are sent from mission control 506 through its network interface 2628 (FIG. 26) to the automated cleaning machine's network interface 2826 (FIG. 28), which is then sent to the cleaning machine's operational control unit 2802 (FIG. 28) of the automated cleaning machine system 1304 that responds by the cleaning machine 1300 performing the command operation such as, for example, starting the water. As with commands to the unmanned vehicles described above in 1100, the mission control system 506 primarily commands the automated cleaning machine system 1304 as to which operation to perform and when to perform it such as, for example; starting water or dispensing soap, as well as the parameters of the operation such as, for example; the cleaning cycle settings, but the automated cleaning machine system 1304 then decides how to execute the command given the operational parameters such as, for example; how long to dispense water given the cycle settings and volume available in the cleaning machine object cavity.

Figure 20:
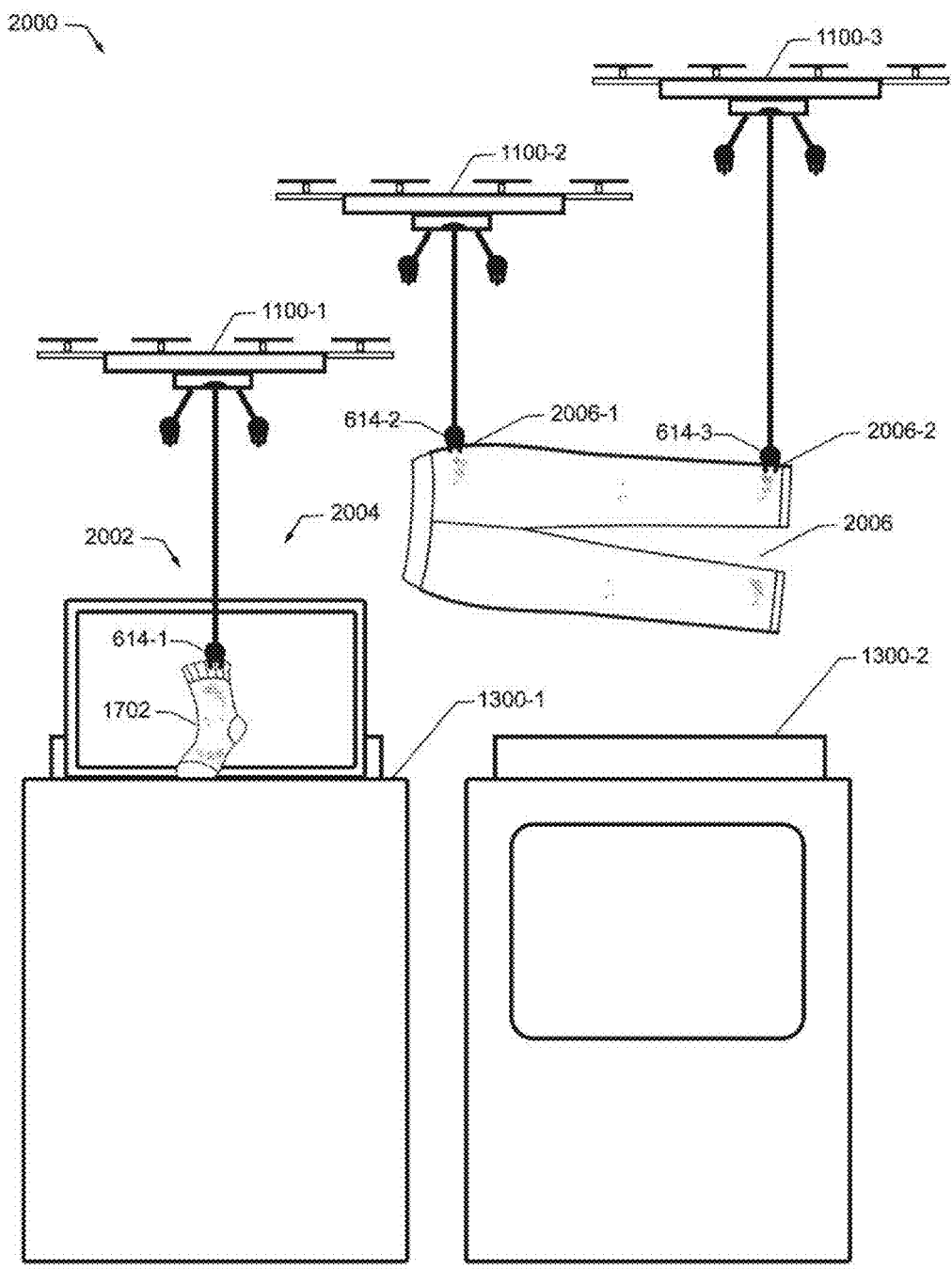
FIG. 20 depicts a block diagram of a front view of cleaning machines and unmanned aerial vehicles performing a clean object task of laundry together, according to an implementation.

Next, to further support operations primarily by unmanned vehicles rather than humans, an automated cleaning machine may be enhanced mechanically to provide the cleaning machine 1300 an operational ability to open/close its own lids, doors, drawers, and/or trays, by similarly receiving command signals from mission control 506, where the automated cleaning machine system 1304 executes the command such as, for example; automatically opening the top lid to an upright position, so an unmanned aerial vehicle may release a clothing item into the top cavity opening of the cleaning machine (FIG. 20). In another example, raising an internal floor inside the cleaning machine to an inclined plane position (FIG. 22) and then automat catty opening the front door down to a flat plane position (FIG. 23) or down lower still to an inclined plane position (FIG. 24) where the contents may then be accessible by unmanned vehicles. In one implementation, the operational control unit 2802 (FIG. 28) may send signals to motors/actuators (not shown) that extend conventional mechanical control mechanisms such as, for example; racks and pairs of pinions for linear actuation in sliding a tray out with corresponding rack gears attached to the inside of the cleaning machine. In another implementation, the operational control unit 2802 (FIG. 28) may send signals to motors/actuators that extend/collapse extensible strut(s) with one end of the strut pivotally coupled to a lid or door, and the other end of the strut pivotally coupled to a lever that is connected to the inside of the cleaning machine. As those of ordinary skill in the art will understand, the examples of conventional mechanical control mechanisms used to control the opening/closing of lids, doors, and trays are merely representative embodiments for typical applications to variously employ the cleaning machine with mechanical automation in response to digital signals sent from the mission control system 506 to the automated cleaning machine system 1304 that controls the operational control unit 2802 (FIG. 28), which signals the motors/actuators and mechanical control mechanisms to perform the requested operations of opening, closing, raising, towering, etc.

Finally, if the automated cleaning machine 1300 washes objects such as laundry, it may have integrated soap reservoirs and dispensers to support the autonomous cleaning system. In this example, the housing body 1302 is enhanced for automation with three integrated soap reservoirs 1310-1, 1310-2, 1310-3, having a top handle 1314-1, 1314-2, 1314-3 respectively, and each coupled to an automated soap dispenser 1312-1, 1312-2, 1312-3 respectively that are controlled by an operational control unit 2802 (FIG. 28) as commanded by the automated cleaning machine system 1304. The rear of the housing body 1302 also has ports for power 1306 and network 1308. Mission control 506 commands the automated cleaning machine system 1304, which controls the operational control unit 2802 (FIG. 28) that executes the operational request to dispense soap. Mission control 506 also monitors soap reservoir levels for the cleaning machine. When a soap reservoir 1310 is empty, and mission control 506 is ready to execute a system maintenance task such as, for example, changing out a soap reservoir, mission control 506 commands the automated cleaning machine system 1304 to eject the integrated soap reservoir 1310 up and partially out of the top of a top-loading cleaning machine, or partially out the front of a front-loading cleaning machine, where an unmanned aerial vehicle 1100 then grasps the reservoir by a handle 1314, and another unmanned aerial vehicle 1100 may then insert the replacement into place. The ejection mechanism (not shown) may be of any suitable form provided it can eject the soap reservoir cartridge 1310 out of the slot with enough clearance for the unmanned aerial vehicle 1100 to grasp the soap reservoir cartridge's handle 1314. The owner may also set up an automation repurchase rule as described above in 100 where mission control 506 monitors soap reservoir 1310 levels, and automatically reorders replacements 1310 through the website 100 or app 200 when the levels have reached a certain threshold, or simply Shop Now 120 at their convenience.

Figure 24:
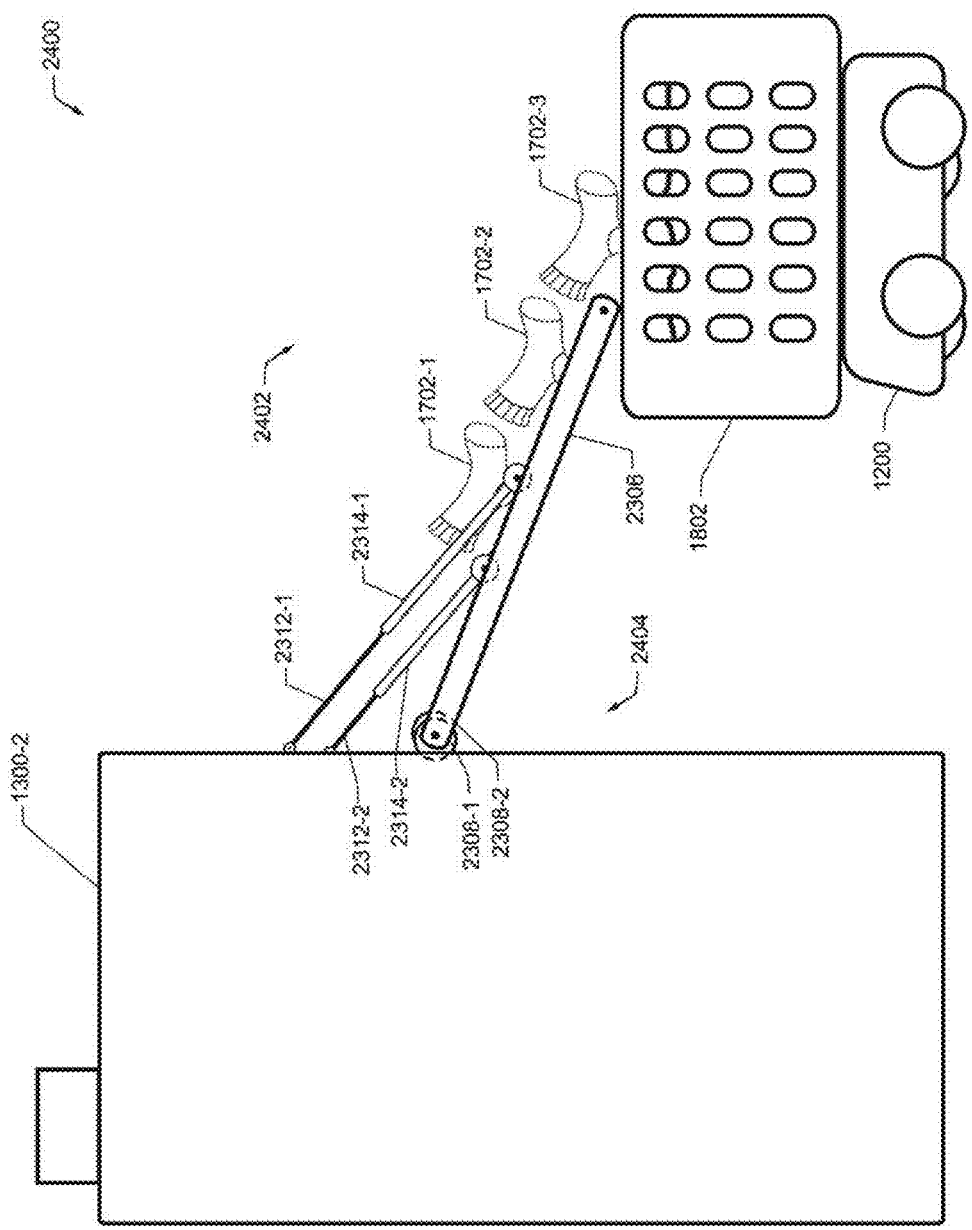
FIG. 24 depicts a block diagram of a side view of an automated cleaning machine that has opened and lowered its door down to an inclined plane position for an unmanned ground vehicle positioned to receive the laundry below it, according to an implementation.

Other embodiments of automated cleaning machines may employ additional features to further support operation by unmanned vehicles primarily. These features may include, for example; the surfaces of an interior raised floor (FIG. 22) and a front loading door (FIG. 24) that lowers down to an inclined plane may integrate a conveyance mechanism such as, for example; an integrally molded conveyor belt to assist in the movement of objects out of the cleaning machine, conveying down into a laundry basket positioned below the lowered door (FIG. 24).

Figure 21:
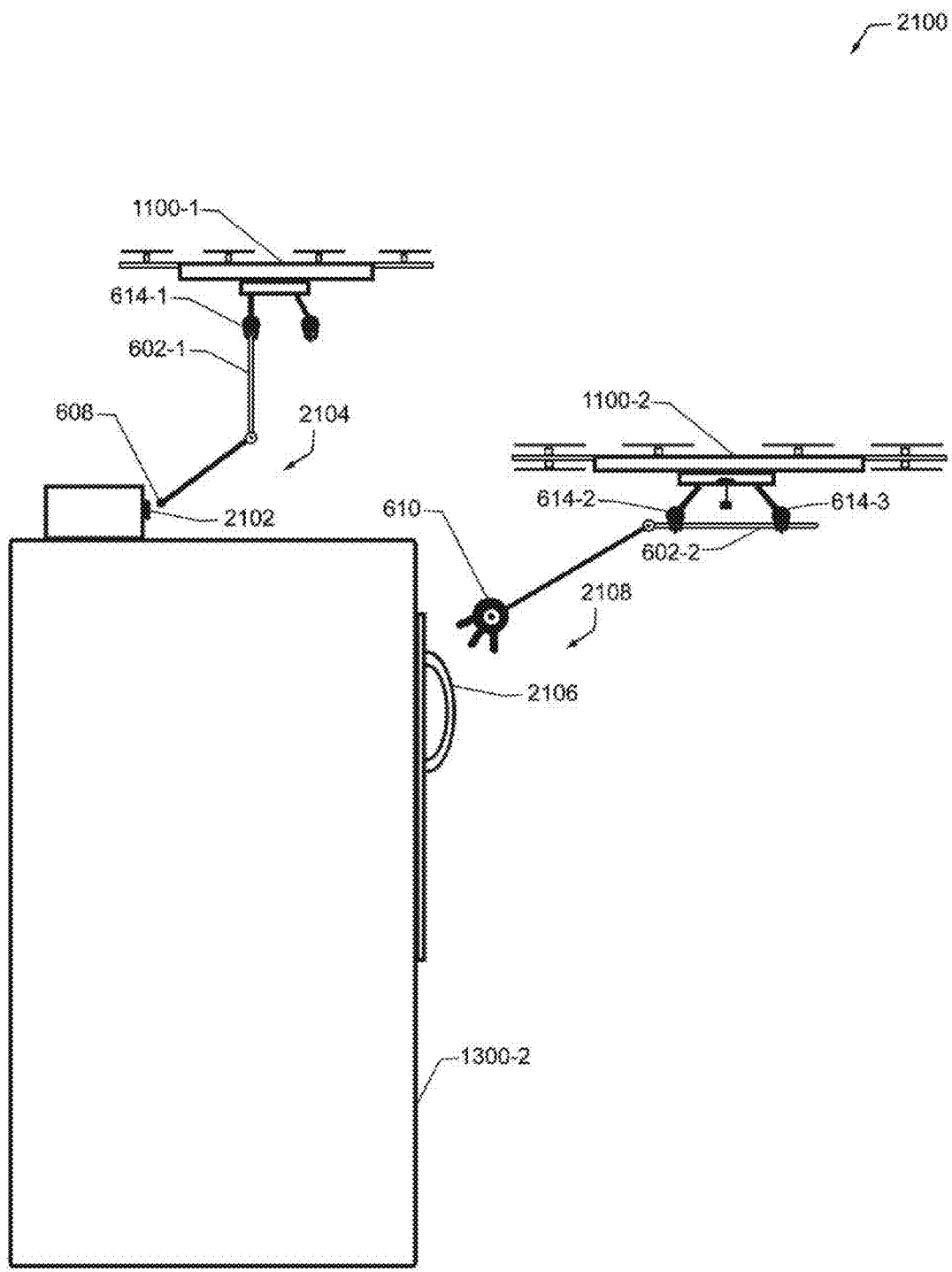
FIG. 21 depicts a block diagram of unmanned aerial vehicles using attachments to perform a clean object task of laundry with a non-automated cleaning machine, according to an implementation.

If the cleaning machine 1300 is non-automated, the autonomous cleaning system may employ the unmanned vehicles to use attachments 600 to physically operate the buttons, dials, doors, lids, etc. and retrieve the objects from the cleaning machines 1300 as described further below (FIG. 21).

Figure 14:
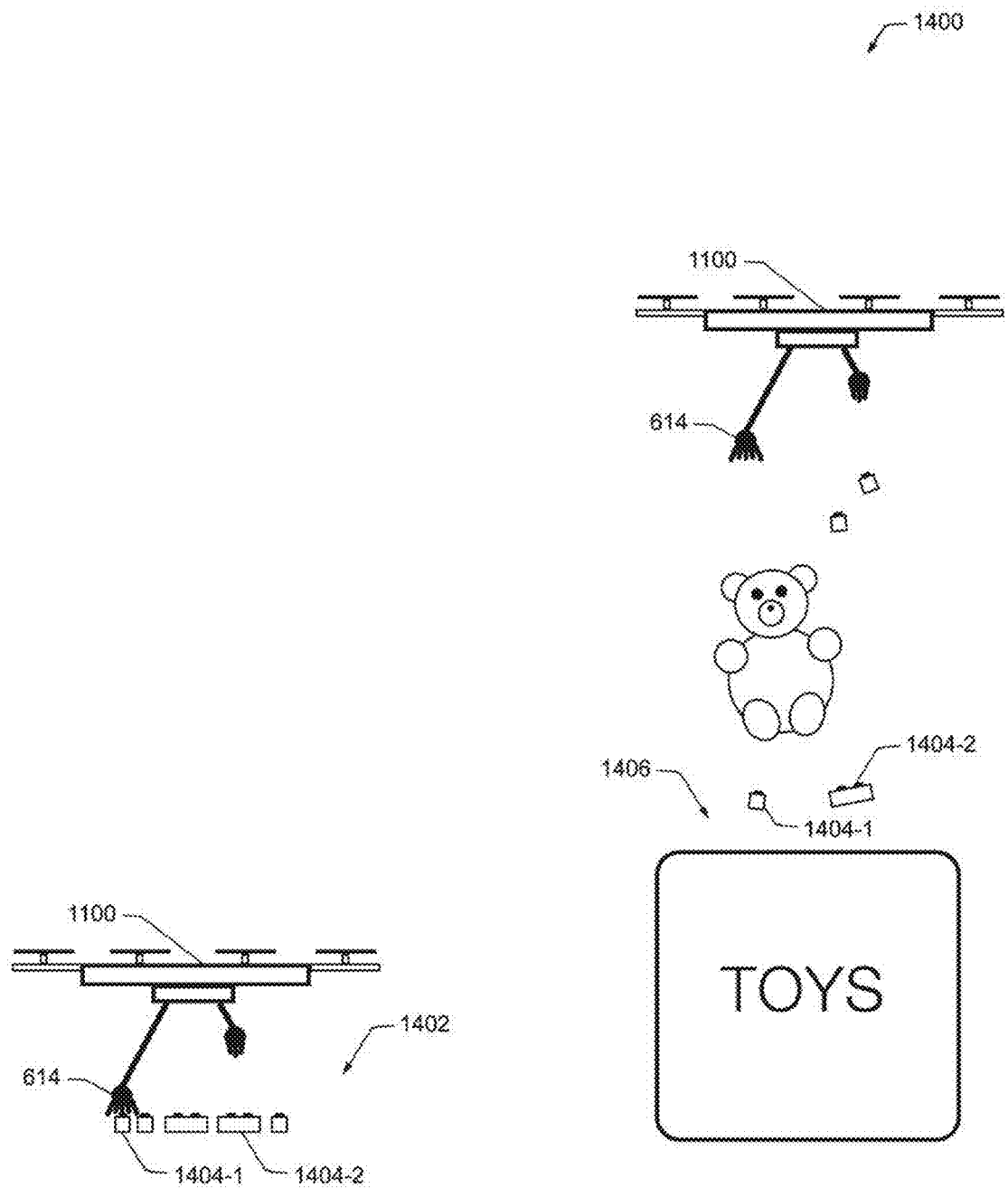
FIG. 14 depicts a block diagram of an unmanned aerial vehicle performing an object rearrangement task of cleaning up toys, according to an implementation.

FIG. 14 depicts a block diagram of an unmanned aerial vehicle 1100 performing an object rearrangement cleaning task 1400, picking up toys 1404-1, 1404-2 from an undesired location 1402 (e.g. the floor) with attached graspers 614, and releasing toys 1404 into a desired drop location 1406 (e.g. a toy box), according to an implementation. In this example, the owner has selected to manually start 212 the object rearrangement task 1400, rather than schedule it.

An object rearrangement task 1400 may be configured (not shown) in software setup 224 with several operational parameters such as, for example; which room the task applies, which type of objects apply, the desired destination location for a group of objects, or a desired object arrangement state of (N) destination locations. When the system determines the mission plan and executes the cleaning task, the system references all operational parameters by querying data stores (FIG. 29). To increase accuracy of the reference data, the owner may also use the app 200 on their mobile device to take photos (not shown) of the room, the applicable objects, and the desired destination surfaces or enclosures for the objects such as, for example; a specific toy bin 1406 for a specific group or type of toys 1404, or a specific shelf in a cabinet for a specific group of towels for example, or an ideal room arrangement of objects, that the owner wishes to apply to the cleaning task being configured, wherein the app 200 records the specific reference images and positioning data while the photos are captured on the mobile device, which the app 200 then sends and stores in the system's local data stores 2904, 2906, 2908 (FIG. 29).

Drop destinations may also be determined automatically by the autonomous cleaning system based on scouting assessments that identify common drop destinations for the cleaning task of the object type such as, for example; kitchen cabinets, kitchen and laundry room countertops, tops of beds, tops of dressers, or other storage containers, based on imagery analysis of areas within the home, and comparing them to data stores (FIG. 29) of known locations that are similar to the matching imagery. The analysis may be provided by mission control 506 or by employing remote computing resources 2510 (FIG. 25) for processing the imagery of the objects and the surrounding home environment through artificial intelligence systems such as, for example; neural networks, machine learning, machine vision, computer vision, etc. which may return identification of the objects, areas, and surfaces of the home environment used in the analysis to determine the drop destinations.

While some object rearrangement tasks may transport a group of objects such as toys 1404 to a single destination such as a designated toy box 1406, other object rearrangements may be more complex, transporting each object to its own designated location based on an ideal room arrangement state. Similarly, ideal room arrangement states may be configured manually by the owner using the app 200 on a mobile device (not shown) to capture imagery of their ideal room arrangement states for reference in the system's local data stores (FIG. 29), or automatically by the system assessing references of common patterns, groupings, and arrangements considered to be ideal arrangement states from remote data stores (FIG. 29). The system may also be supported by additional inputs such as, for example; change deltas from time-lapse imagery captured by the regular scouting assessments over time within the home, or by other owners contributing their ideal arrangements to the remote data store 2912 (FIG. 29) that benefit the accuracy of the system for all users.

Figure 15:
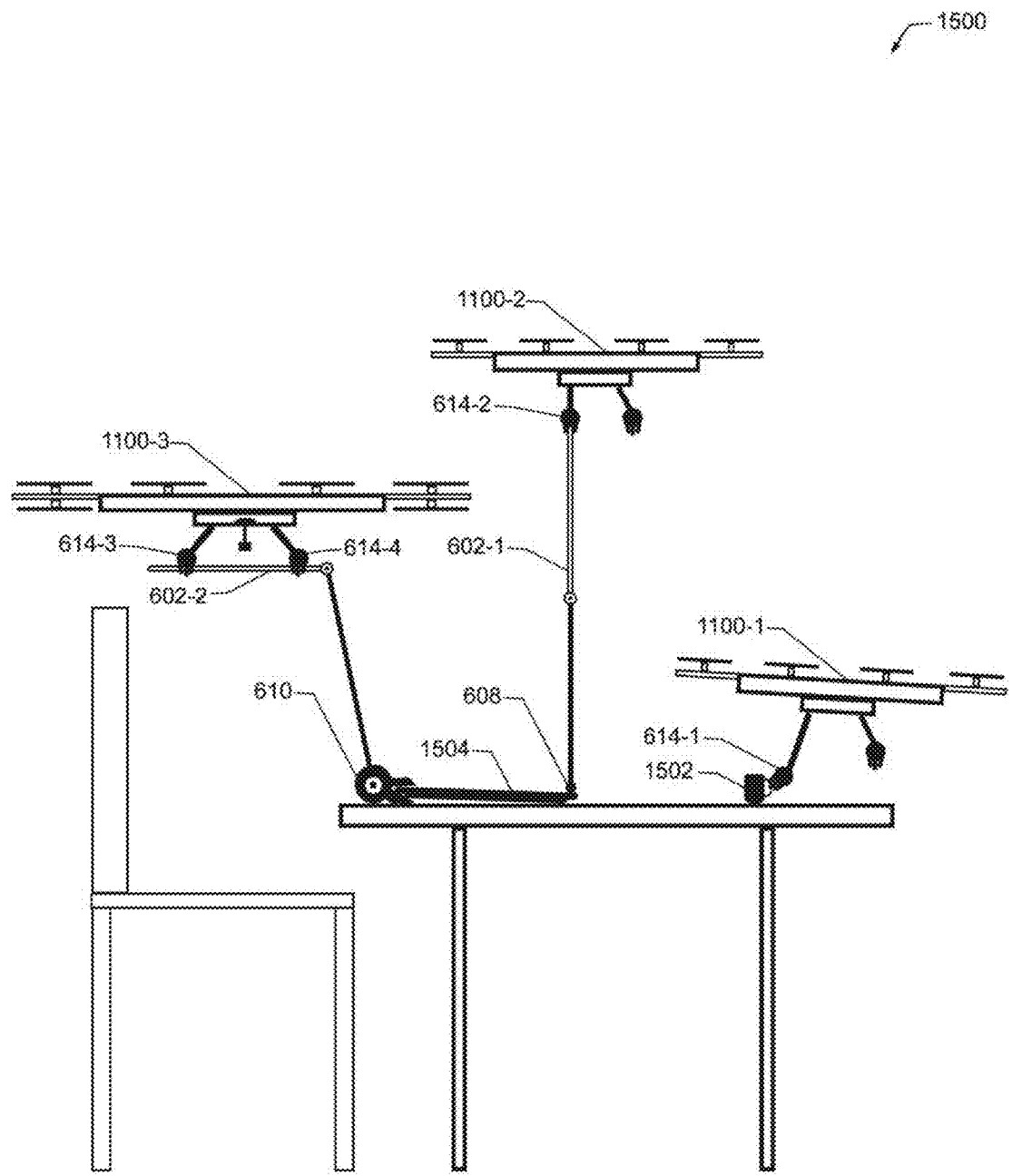
FIG. 15 depicts a block diagram of unmanned aerial vehicles using attachments cooperatively to perform a clean object task of dishes, according to an implementation.

FIG. 15 depicts a block diagram of unmanned aerial vehicles performing a clean object task of dishes 1500 together, where one unmanned aerial vehicle 1100-1 extends a primary grasper 614-1 and grasps a cup handle 1502 on a table, and where two other unmanned aerial vehicles 1100-2, 1100-3 work cooperatively to pick up a plate 1504, with one unmanned aerial vehicle 1100-2 grasping a poking pole attachment 602-1 with a primary grasper 614-2, while pushing the pole attachment 602-1 and the pole attachment's ball end 608 down vertically with force onto the top surface of the right edge of the plate 1504, thereby causing the left side of the plate 1504 to rise up and provide sufficient clearance for the other unmanned vehicle 1100-3 to reach the pole attachment grasper 610 underneath the left edge of the plate 1504 and grasp it with another unmanned vehicle pole attachment 602-2 being held by the unmanned vehicle 1100-3 with its two primary graspers 614-3, 614-4, according to an implementation.

Figure 16:
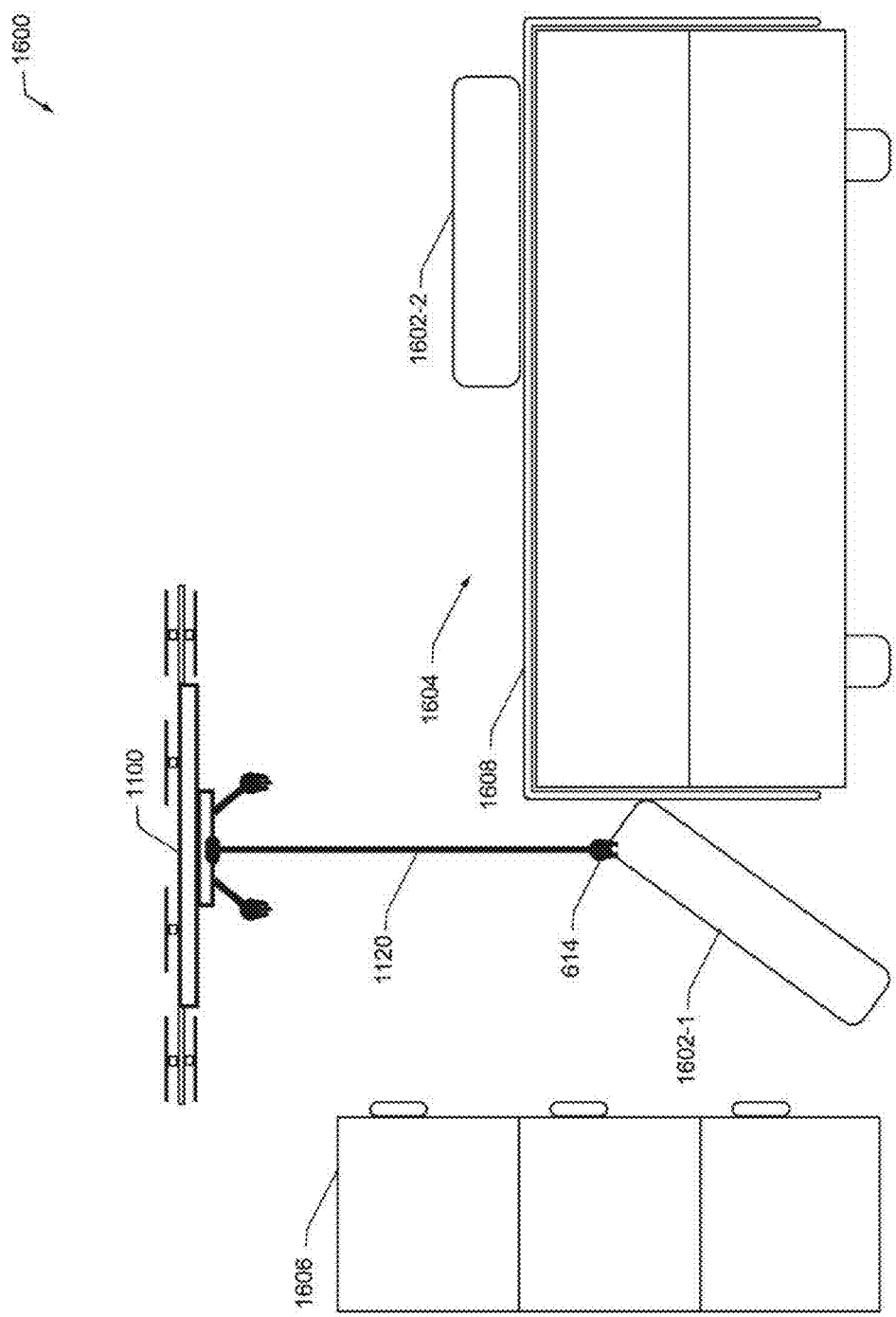
FIG. 16 depicts a block diagram of an unmanned aerial vehicle performing an object rearrangement task of making up a bed, according to an implementation.

FIG. 16 depicts a block diagram of an unmanned aerial vehicle 1100 performing an object rearrangement task of making up a bed 1600, extending a tether 1120 from the unmanned vehicle 1100 with tethered grasper 614 at the end of the tether 1120, grasping a pillow 1602-1 between a dresser 1606 and a bed 1608, according to an implementation. In this example, the unmanned aerial vehicle 1100 then rearranges the pillow object 1602-1 from its current location to place it in the desired destination location 1604 on the bed 1608 next to the other pillow 1602-2.

Figure 17:
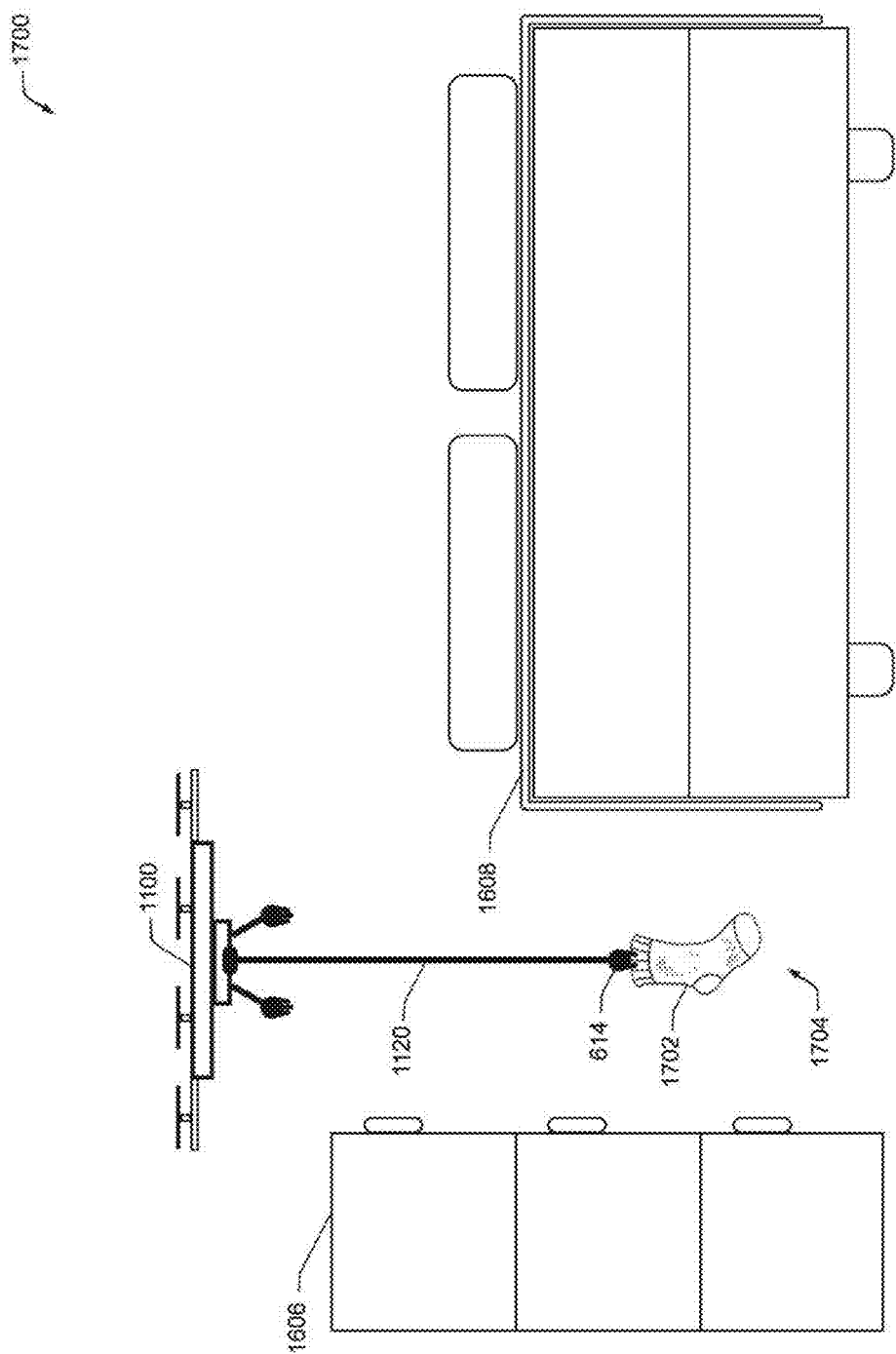
FIG. 17 depicts a block diagram of an unmanned aerial vehicle performing a clean object task of laundry in a tight space using a tether, according to an implementation.

FIG. 17 depicts a block diagram of an unmanned aerial vehicle 1100 performing a clean object task of laundry 1700, extending a tethered grasper 614 at the end of the tether 1120, grasping a sock 1702 and lifting it out 1704 of a tight space between a dresser 1606 and a bed 1608, according to an implementation.

Figure 18:
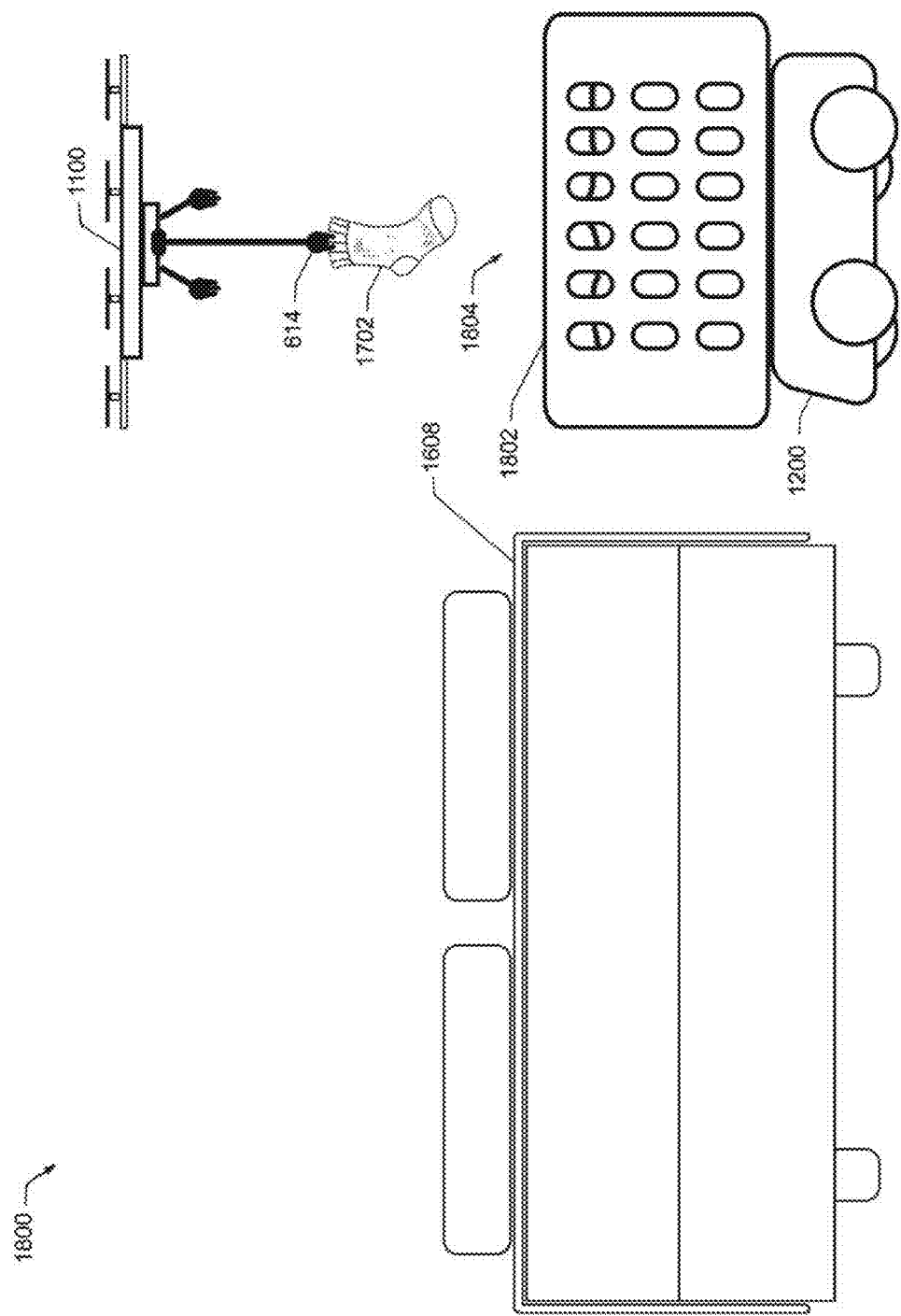
FIG. 18 depicts a block diagram of an unmanned aerial vehicle performing a clean object task of laundry, loading into a staging area of a clothes basket, being carried on an unmanned ground vehicle, according to an implementation.

FIG. 18 depicts a block diagram of unmanned vehicles 1100, 1200 performing a clean object task of laundry together, by first loading into a staging area 1800, according to an implementation. In this example, the unmanned aerial vehicle 1100 is about to release the sock 1702 it has picked up from its tethered grasper 614 down into the staging area's drop point location 1804 of a clothes basket 1802 that was carried by an unmanned ground vehicle 1200 next to the bed 1608.

Figure 19:
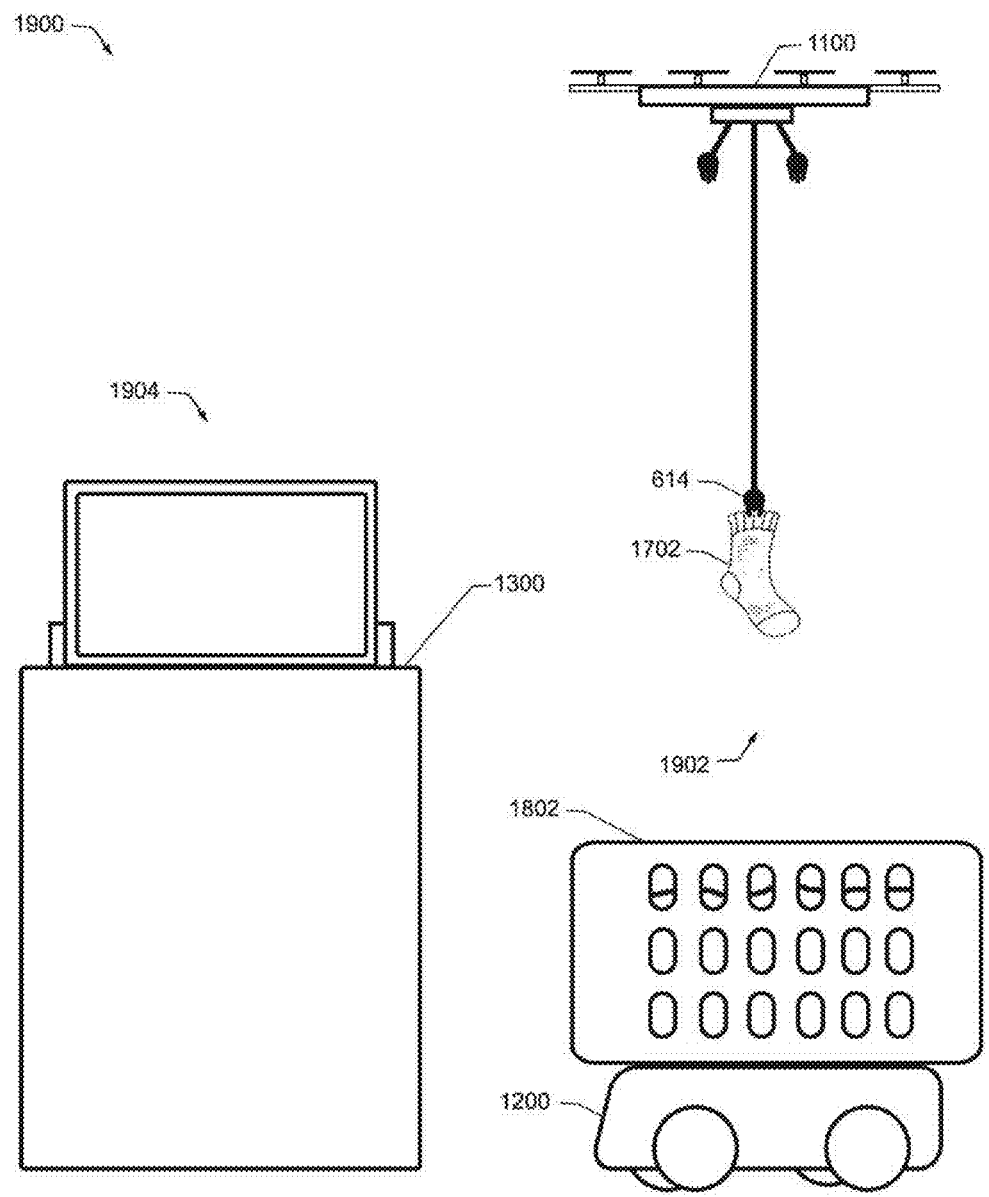
FIG. 19 depicts a block diagram of an unmanned aerial vehicle performing a clean object task of laundry, unloading from a staging area of a clothes basket, being carried on an unmanned ground vehicle, according to an implementation.

FIG. 19 depicts a block diagram of a front view of a washing cleaning machine 1300 and unmanned vehicles 1100, 1200 performing a clean object task of laundry together, by subsequently unloading objects 1900 that were previously loaded in a staging area 1800, according to an implementation. In this example, an unmanned aerial vehicle 1100 has grasped a sock 1702 with a tethered grasper 614 and lifted it out 1902 of a clothes basket 1802 that the unmanned ground vehicle 1200 has transported within proximity of a washing cleaning machine 1300, and is about to transport and then release down into 1904 the cleaning machine 1300.

FIG. 20 depicts a block diagram of a multiple aerial vehicles 1100 queuing up 2000 to release clothing objects into a cleaning machine 1300, according to an implementation. In this example, the left unmanned aerial vehicle 1100-1 has grasped a sock 1702 with a tethered grasper 614-1 and is about to release the sock 1702 down into 2002 the top opening a washing cleaning machine 1300-1. Next in queue waiting above the drying cleaning machine 1300-2, two other unmanned aerial vehicles 1100-2, 1100-3 are carrying a pair of pants 2006 cooperatively with the middle unmanned aerial vehicle 1100-2 having grasped the top waist 2006-1 of the pants 2006 with its tethered grasper 614-2, and the right unmanned aerial vehicle 1100-3 having grasped a bottom leg 2006-2 of the same pair of pants 2006, are next in line to release the pants down into 2004 the top opening the washing cleaning machine 1300-1.

FIG. 21 depicts a block diagram of unmanned aerial vehicles 1100 using attachments to perform a clean object task of laundry with a non-automated cleaning machine 2100, according to an implementation. In this example, the left unmanned aerial vehicle 1100-1 is grasping and extending a poking pole attachment 602-1 with around ball end 608 with its primary grasper 614-1 to push 2104 the round ball end 608 into the button 2102 on the drying cleaning machine 1300-2, and the right unmanned aerial vehicle 1100-2 is grasping and extending down a grasper pole attachment 602-2 using both of its primary graspers 614-2, 614-3 to reach down and grasp 2108 the door handle 2106 with the pole attachment grasper end 610 of the same drying cleaning machine 1300-2.

Figure 22:
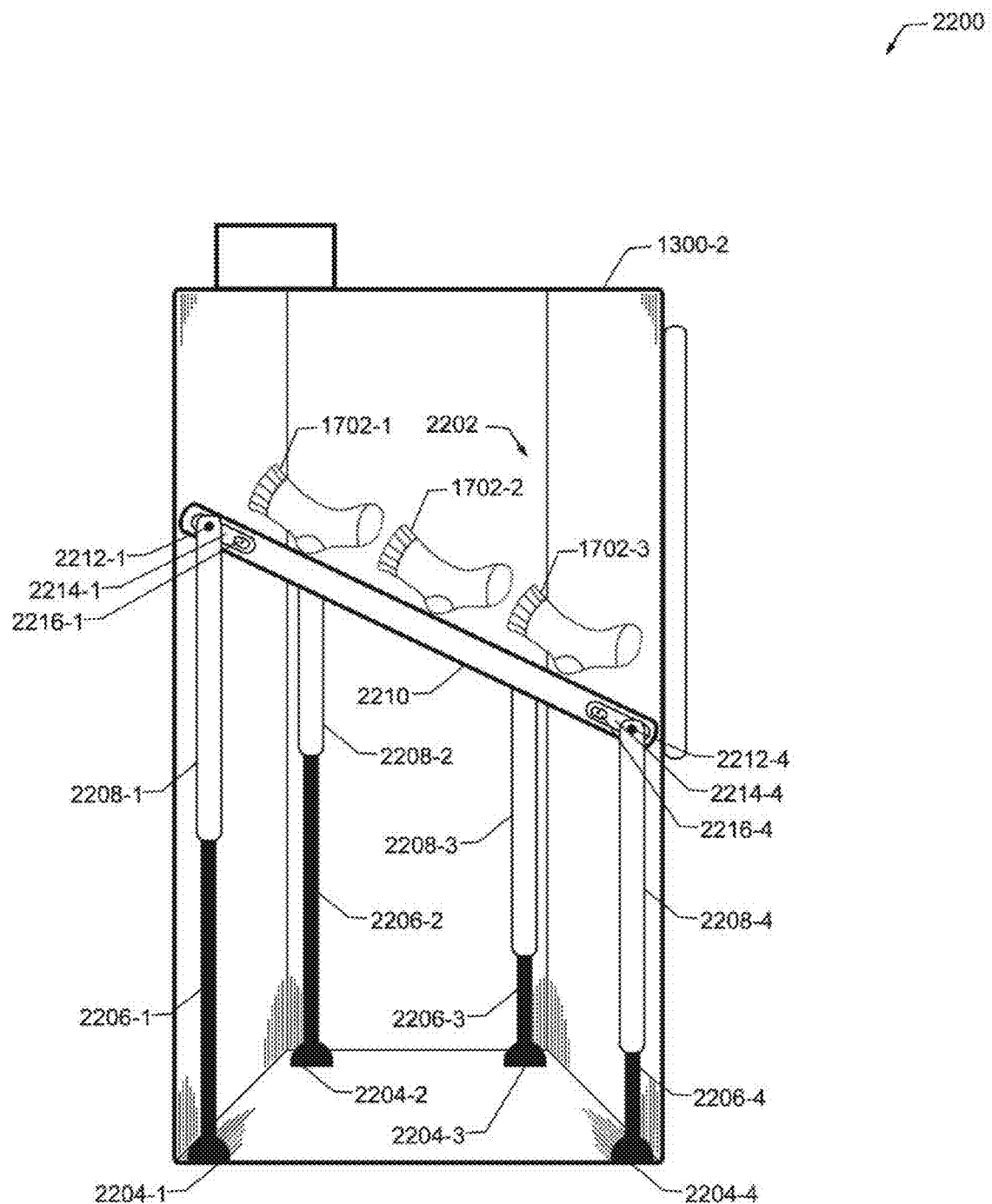
FIG. 22 depicts a block diagram of an internal side view of an automated cleaning machine, where the inner floor of the drying cleaning machine has lifted to an inclined plane, according to an implementation.

FIG. 22 depicts a block diagram of the internal side view of an automated drying cleaning machine 1300-2, where the inner floor 2210 of the drying cleaning machine 1300-2 has lifted to an inclined plane 2200, according to an implementation. In this example, the inclined plane 2200 may allow the clothing objects, represented by socks 1702-1, 1702-2, 1702-3, to travel out 2202 of the drying cleaning machine 1300-2 for easier pick up by unmanned vehicles (FIG. 23) (FIG. 24). In one configuration, the inner floor 2210 may be lifted to an inclined plane 2200 by the machine's rear extensible struts 2208-1, 2208-2 rising above the machine's front extensible struts 2208-3, 2208-4. The extensible struts 2208-1, 2208-2, 2208-3, 2208-4 may be supported by support legs 2206-1, 2206-2, 2206-3, 2206-4 respectively, which may be secured to an inner floor of a drying cleaning machine 1300-2 by floor footings 22041, 2204-2, 2204-3, 2204-4 respectively. The extensible struts 2208 may be pivotally coupled to the inner floor 2210 at pivot joints 2214, where for example; the extensible strut 2208-1 may be pivotally coupled to the pivot joint 2214-1 at connection point 2212-1 with the pivot joint 2214-1 connected to the inner floor 2210 at connection point 2216-1, or the extensible strut 2208-4 may be pivotally coupled to the pivot joint 2214-4 at connection point 2212-4 with the pivot joint 2214-4 connected to the inner floor 2210 at connection point 2216-4. Extensible struts 2208-2 and 2208-3 may be connected in a similar manner (not shown). In this example, when the cleaning machine's rear extensible struts 2208-1, 2208-2 are raised, by a powered drive device (not shown), above the cleaning machine's front extensible struts 2208-3, 2208-4, pivotally coupled to the inner floor 2210, creating an inclined plane 2200, the clothing objects 1702 may then travel out of the cleaning machine 1300-2 extracted by gravity.

Figure 23:
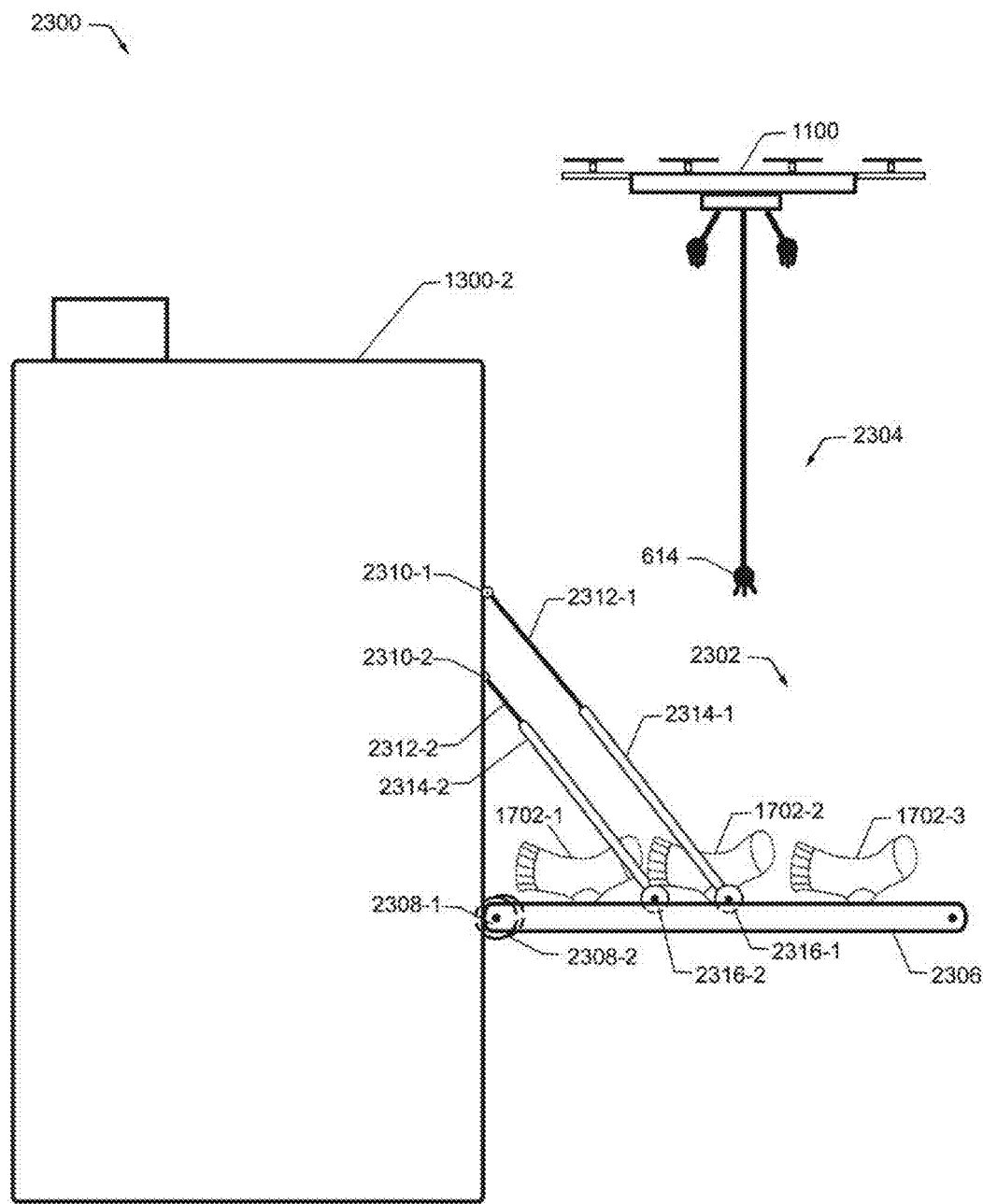
FIG. 23 depicts a block diagram of a side view of an automated cleaning machine that has opened and lowered its door down to a flat position for pickups by an unmanned aerial vehicle, according to an implementation.

FIG. 23 depicts a block diagram of a side view of an automated drying cleaning machine 1300-2 that has opened and lowered 2302 its door 2306 down to a flat level position for aerial pickups 2300, according to an implementation. In one configuration, extensible strut 2314-1 may be pivotally coupled to the door 2306 at pivot joint 2316-1, and connected to a support rod 2312-1 that may also be pivotally coupled near the front of the cleaning machine 1300-2 at pivot joint 2310-1. Similarly, extensible strut 2314-2 may be pivotally coupled to the door 2306 at pivot joint 2316-2, and connected to support rod 2310-2 that also may be pivotally coupled near the front of the cleaning machine 1300-2 at pivot joint 2310-2. And finally the cleaning machine's front door 2306 may be pivotally coupled near the front of the cleaning machine at pivot joints 2308-1, 2308-2. In this example, when extensible struts are extended by a powered drive device (not shown), the door 2306 may be opened and lowered to a flat and level position, where an aerial unmanned vehicle 1100 may be positioned over the clothing objects 1702-1, 1702-2, 1702-3, ready to move down 2304 and grasp the clothing objects 1702 with its tethered grasper 614.

FIG. 24 depicts a block diagram of a side view of an automated drying cleaning machine 1300-2 that has opened and lowered 2402 its door 2306 down to an inclined plane position 2400, according to an implementation. In one configuration, extensible struts 2314-1, 2314-2 have been extended along their support rods 2312-1, 2312-2 respectively at an inclination rotating 2404 the door 2306 down 2402 over the door's rotation joints 2308-1, 2308-2 such that the door 2306 has lowered to an inclined plane 2400, allowing the clothing objects 1702-1, 1702-2, 1702-3 to be extracted by gravity and travel into a clothes basket 1802 being carried by an unmanned ground vehicle 1200 positioned below the end of the door 2306.

Figure 25:
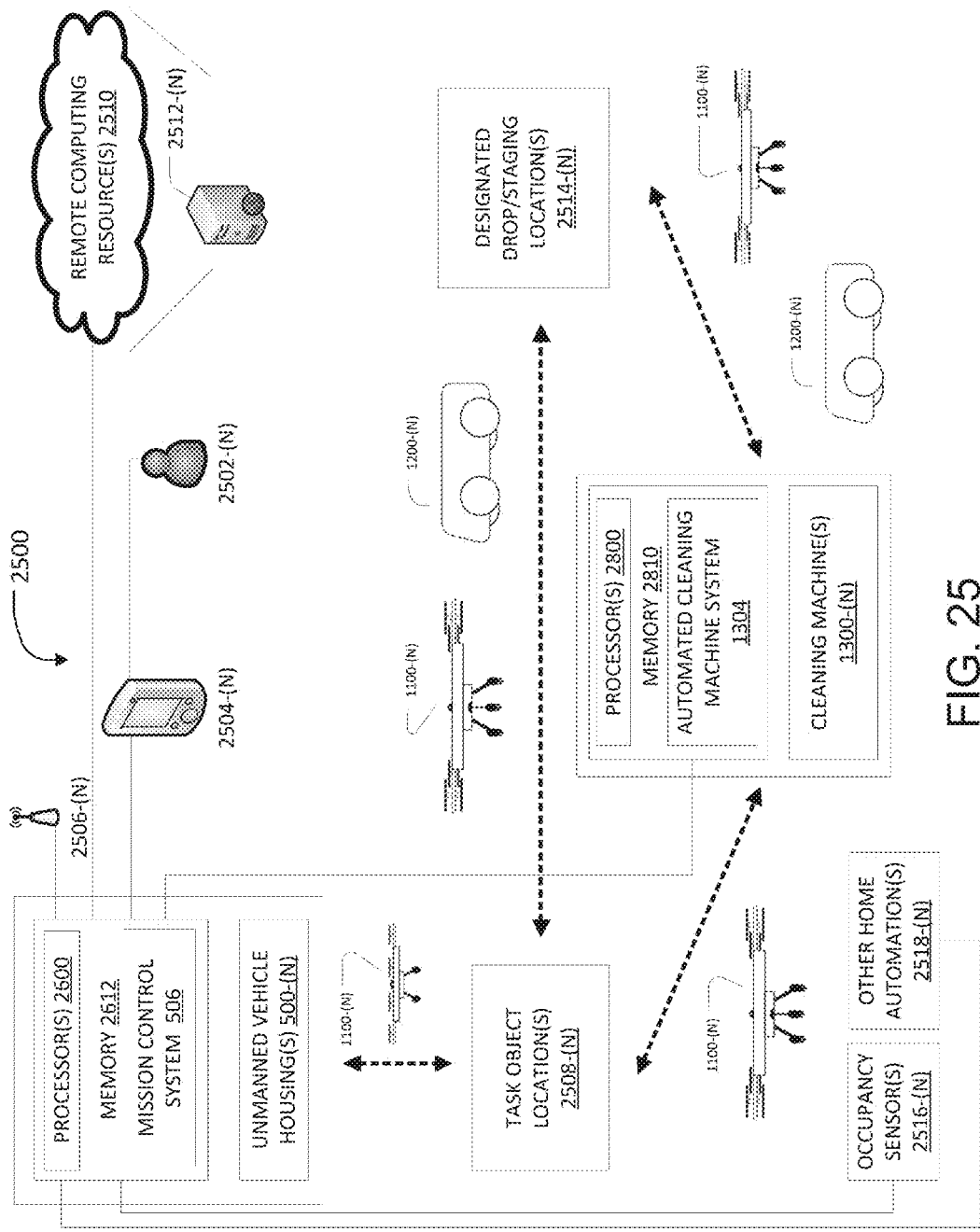
FIG. 25 depicts a diagram of a home environment where unmanned vehicles perform cleaning tasks, according to an implementation.

FIG. 25 depicts a diagram of a home environment 2500 where a plurality of unmanned vehicles 1100-(N), 1200-(N) may travel between unmanned vehicle housing(s) 500-(N), cleaning machine(s) 1300-(N), task object locations 2508-(N), and designated drop/staging locations 2514-(N) to perform cleaning task(s), and where (N) represents one to many of each illustrated representation, according to an implementation. As illustrated, dashed lines may represent paths of aerial and/or ground travel of unmanned vehicles 1100-(N), 1200-(N) between origin and destination points within the home environment 2500, and solid connecting lines may represent some paths of network communication between machines in the server system 2900 (FIG. 29). The unmanned vehicle housings 500-(N) with mission control systems 506, the unmanned vehicles 1100-(N), 1200-(N), any automated cleaning machines 1300-(N), any occupancy sensors 2516-(N), and any other home automations 2518-(N) may be connected to each other and to the home's local network 2506-(N). The mission control systems 506 may also be connected to the internet, as well as one-to-many servers 2512-(N) comprising the plurality of remote computing resources 2510.

In one example, the owner(s) 2502-(N) may configure a cleaning task through the website 100 or app 200 on their mobile device 2504-(N). The configuration change, or other task event triggers such as scheduled days/times for example, may then cause one or more processors 2600 (FIG. 26) to execute the program instructions 2614 (FIG. 26) of the mission control system 506 which is stored on the memory 2612 (FIG. 26) coupled to the mission control system base 506 of the unmanned vehicle housing(s) 500-(N) and send the unmanned vehicles 1100-(N), 1200-(N) to begin or resume the cleaning task. The unmanned aerial vehicles 1100-(N) may then travel to the task object locations 2508-(N) to pick up the objects and transport them to the cleaning machine(s) 1300-(N) or other designated drop/staging location(s) 2514-(N). If the cleaning machine is automated, containing an automated cleaning machine system 1304 stored on the memory 2810 (FIG. 28), then one or more processor(s) 2800 (FIG. 28) may execute the program instructions 2812 (FIG. 28) to execute the steps in the mission plan as commanded by the mission control system 506 such as, for example, opening its top lid to receive the objects being transported to it by the unmanned aerial vehicles 1100-(N). To increase the efficiency of the execution of the cleaning task by reducing the number of longer aerial trips, the unmanned ground vehicles 1200-(N) may carry a clothes basket to a staging location 2514-(N) such as a bedroom for example, to allow for localized loading around the proximity of staging locations 2514-(N) before transporting clothes basket(s) to the cleaning machine(s) 1300-(N) for unloading. The mission control system 506 may delegate computing requests such as, for example; object identification requests to one of the many servers 2512-(N) comprising the remote computing resources 2510. The mission control system 506 may also receive motion sensor data from occupancy sensors 2516-(N) if configured to perform the cleaning task when the home is not occupied, as well as integrate with other home automations 2518-(N) such as smart locks, smart appliances, etc.

FIG. 26 is a block diagram illustrating various components of a mission control system 506 of the mission control vehicle housing(s) 500-(N), according to an implementation. In various examples, the block diagram may be illustrative of one or more aspects of the mission control system 506 that may be used to implement the various systems and methods discussed. In the illustrated implementation, the mission control system 506 in the base of the mission control vehicle housing(s) 500-(N), may include one or more processors 2600, coupled to a non-transitory computer readable storage medium 2612 via an input/output (I/O) interface 2610. The mission control system 506 may also include a power supply 2604 to power hardware components, vehicle recharging transmitter(s) 2602 for recharging unmanned vehicles 1100-(N), 1200-(N), an Application Programming Interface (API) System 2606 for integrating with other systems, a mission planning, command, and control system 2608 for executing cleaning tasks for the autonomous cleaning system. The non-transitory computer readable storage medium 2612 may be configured to store executable program instructions 2614 and other data points accessible by the processor(s) 2600 such as, for example; a data store manager 2618 that manages data stores 2616 and other local/remote system data stores (FIG. 29), cleaning task configurations from the website 100 or app 200, and/or mission plans 2620 created by the executable program instructions 2614. The mission control system 506 may also send operational commands to the pole attachment controller(s) 2622 for unmanned vehicles retrieving or returning pole attachments, the housing controller(s) 2624 for opening, extending, or closing the unmanned vehicle housing bays/trays/doors, any input/output devices 2626, and the wired and wireless network interfaces 2628 that communicate with other machines or systems over the network such as, for example; other vehicle housings 500-(N), unmanned vehicles 1100-(N), 1200-(N), cleaning machine(s) 1300-(N), the website 100 or app 200, other integrated systems through the API system 2606, and/or remote computing resources 2510.

Figure 27:
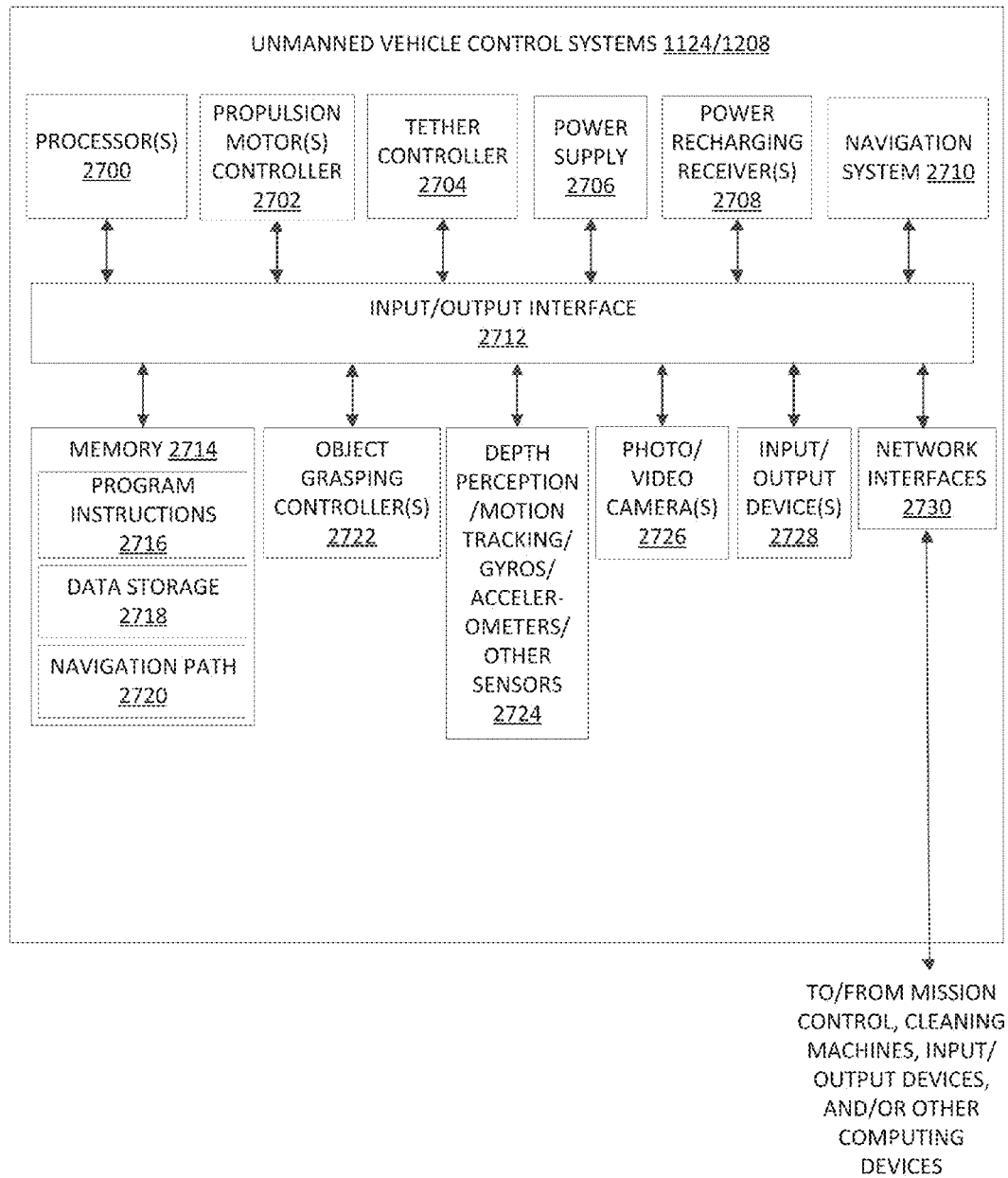
FIG. 27 is a block diagram illustrating various components of an unmanned vehicle control system, according to an implementation.

FIG. 27 is a block diagram illustrating various components of the unmanned vehicle control systems; 1124 for unmanned aerial vehicles, 1208 for unmanned ground vehicles, according to an implementation. In various examples, the block diagram may be illustrative of one or more aspects of the unmanned vehicle control systems 1124, 1208 that may be used to implement the various systems and methods discussed. In the illustrated implementation, the unmanned vehicle control systems 1124, 1208 in the unmanned vehicles 1100, 1200 respectively, may include one or more processors 2700, coupled to a non-transitory computer readable storage medium 2714 via an input/output (I/O) interface 2712. The unmanned vehicle control systems 1124, 1208 may also include a power supply 2708 to power hardware components, propulsion motor controller(s) 2702 such as electronic speed controllers (ESCs) to control the propulsion motors, a tether controller 2704 for controlling the extension/retraction winch 1116 for extending/retracting the tether 1120, object grasping controllers 2722 to control the vehicles primary graspers and any secondary attachments, and power recharging receivers 2708 to receive power transmitted from the vehicle housing recharging transmitters 2602. The non-transitory computer readable storage medium 2714 may be configured to store executable program instructions 2716 and other data stores 2718 accessible by the processor(s) 2700 such as, for example; the navigation system 2710, imagery taken by the photo/video cameras 2726, environment and object point clouds, and geolocations and other identifying data points. The navigation system 2710 may be used to build a navigation path 2720 to navigate the unmanned vehicles around obstacles and to their destinations, and may use sensors and components such as, for example; photo/video cameras 2726, gyros, accelerometers, and depth perception and motion tracking sensors 2724 to calculate the vehicle's pose data and track its position within 3D space while navigating, as well as map objects and the surrounding environment with point clouds while navigating around obstacles and towards each destination along the navigation path 2720. The system may then store these point clouds and other data points onboard the unmanned vehicle in 2718, or in the local system's area learning data store 2908 (FIG. 29). The unmanned vehicle control systems 1124, 1208 may communicate with input/output devices 2728, and with other machines in the system through its network interface 2730 such as, for example; with other unmanned vehicles 1100-(N), 1200-(N), mission control systems 506-(N) through their network interfaces 2628, and other cleaning machines 1300-(N) through their network interfaces 2826 (FIG. 28).

Figure 28:
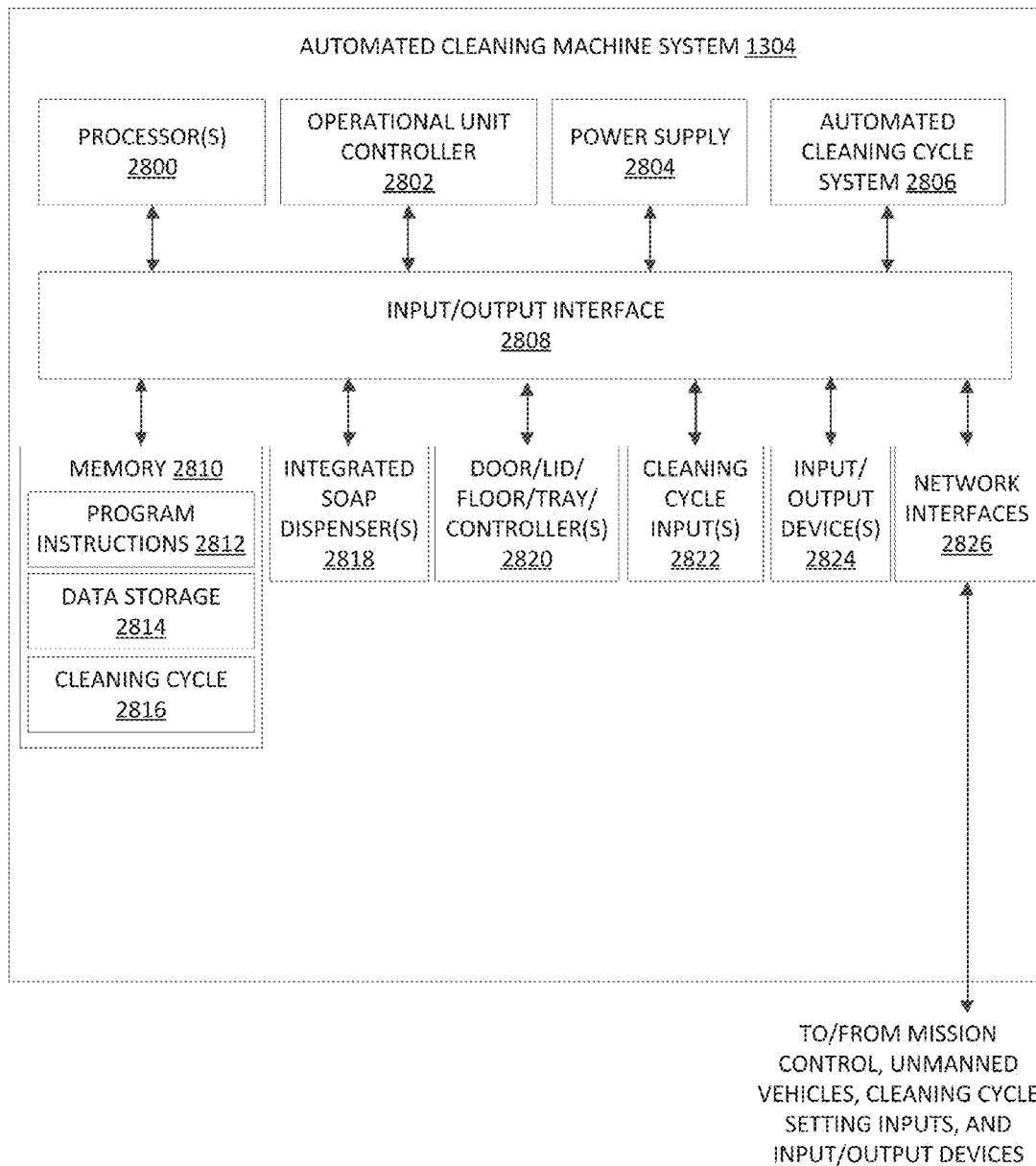
FIG. 28 is a block diagram illustrating various components of an automated cleaning machine system, according to an implementation.

FIG. 28 is a block diagram illustrating various components of an automated cleaning machine system 1304, according to an implementation. In various examples, the block diagram may be illustrative of one or more aspects of the automated cleaning machine system 1304 that may be used to implement the various systems and methods discussed. In the illustrated implementation, the automated cleaning machine system 1304 in cleaning machines 1300 may include one or more processors 2800, coupled to a non-transitory computer readable storage medium 2810 via an input/output (I/O) interface 2808. The automated cleaning machine system 1304 may also include a power supply 2804 to power hardware components, the central operational unit controller 2802 that receives all operational command inputs and relays the commands to other components and sub-systems in the cleaning machine such as, for example; the integrated soap dispenser(s) 2818 that manages soap distribution from integrated soap reservoirs 1310 through soap dispensers 1312, and door/lid/floor/tray controller(s) 2820 that control the extension/retraction of extensible struts and other conventional control mechanisms to open/close/raise/lower doors/lids/floors/trays. If configured for optional manual use, the automated cleaning machine system 1304 may also receive cleaning cycle inputs 2822 through button presses and dial turns for cycle settings by a human operator, even though the automated cleaning machine 1300 operates primarily by these cycle setting commands being received by the mission control system 506 through operational unit controller 2802. The non-transitory computer readable storage medium 2810 may be configured to store executable program instructions 2812 and other data stores 2814 accessible by the processor(s) 2800 such as, for example; the automated cleaning cycle system 2806 that determines the cleaning cycle 2816 based on the cleaning cycle inputs 2822 and operational commands from the operational unit controller 2802. The automated cleaning machine system 1304 may communicate with input/output devices 2824 and with other machines in the system through its network interface 2826; primarily with mission control systems 506-(N).

FIG. 29 is a block diagram of an illustrative implementation of an autonomous cleaning server system 2900 that may be used with various implementations. The core of the autonomous cleaning server system 2900 is the mission control system 506 that executes mission control's program instructions 2614 and communicates with its data stores and other systems to complete the cleaning task over its network interfaces 2628. The data store manager 2618 for the mission control system 506 manages several data stores including, for example; the local mission control data store 2904 that contains data such as cleaning task schedules, the local object identification data store 2906 that contains reference data of objects identified in the home for example, and a local area learning data store with data such as point clouds of the home environment for example, that mission control may query from and update as needed to support the autonomous cleaning system 2900 with locally available data that is generally accessible faster than remote data stores. The mission control system 506 may communicate with the home's local network 2902 and remote networks 2910 to get and set the data it requires through mission control's network interfaces 2628. The systems operating on the local network 2902 may include the unmanned vehicle control systems 1124, 1208, and any automated cleaning machine systems 1304. The systems operating on remote networks 2910 may include remote computing systems 2510 such as, for example; those used for delegation of object identifications that may query a remote object identification data store 2912, and the website 100 or app 200/300 systems that may query from a remote user data store 2914 such as, for example; when the owner shops for hardware purchases on a website 100 and the website 100 displays the current hardware configuration 108 when determining a recommended configuration 118. All of these sub-systems work together in concert support the autonomous cleaning server system 2900 to execute cleaning tasks per the mission plan 2620 as described further below in the operational flow example (FIG. 30).

Figure 30:
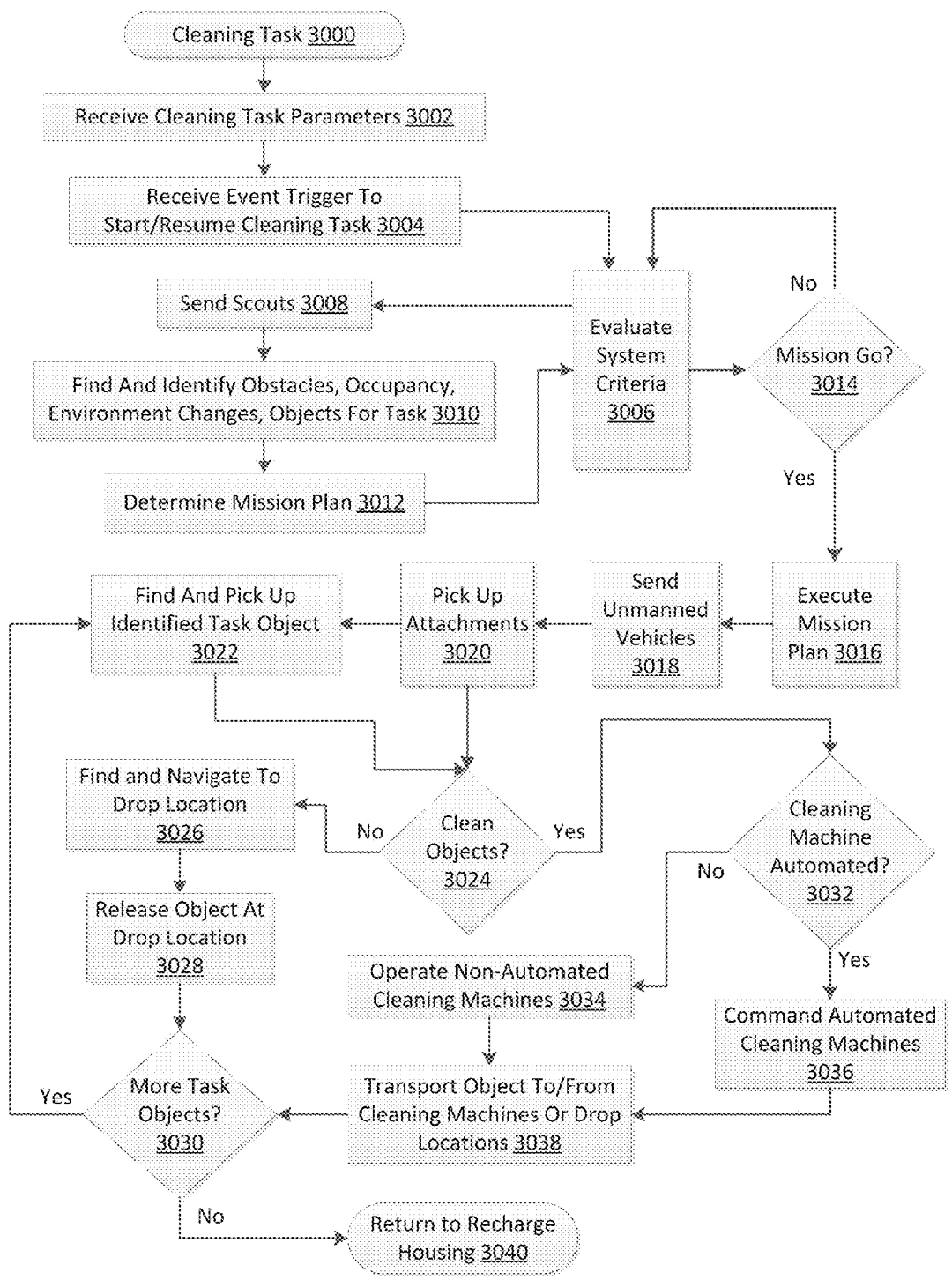
FIG. 30 is a flow diagram illustrating an example process for a cleaning task, according to an implementation.

FIG. 30 is a flow diagram illustrating an example process for a cleaning task 3000, according to an implementation. In this example, the cleaning task process 3000 is illustrated as a collection of blocks in a logical flow that may be used by the autonomous cleaning system to perform the cleaning task. To begin, the owner first purchases the desired hardware configuration through the website 100 or app 200 as described above. Similar to setting up a computer system, the owner then sets up the hardware components in their home, and connects the hardware components to the home's local power and network sources. Next, the owner may then turn the power on for the hardware components and download any needed software updates. After the system is online and ready for operation, the owner may then customize the configuration of the software through the app 200, which sends custom cleaning task parameters 3002 such as, for example; safety preferences 204 and cleaning task schedules 206 that are sent to and received by the mission control system 506 stored in memory 2612. These cleaning task parameters 3002 may also be backed up in the cloud to remote computing systems 2510. Once the system is online and configured, the cleaning task 3000 may begin.

The first task execution step of a cleaning task 3000 configured with system default parameters and custom cleaning task parameters 3002, is to receive an event trigger 3004 to start or resume a cleaning task 3000. The mission control system's 506 processors 2600 execute the program instructions 2614 stored in memory 2612 to evaluate and listen for these event triggers 3004 to begin or resume execution of a cleaning task which may include, for example; the current day/time has reached a cleaning task's scheduled day/time, the owner's phone(s) have exited a geofence perimeter around the home, or the owner has manually pressed a "Clean Now" button 216. When a cleaning task event trigger 3004 is received, the mission control system 506 then evaluates the status of other system criteria 3006 by the program instructions 2614 to determine if the cleaning task 3000 may proceed. System criteria 3006 may include, for example; whether the unmanned vehicles 1100, 1200 have sufficient power in their rechargeable batteries 1122, 1210 respectively to perform the next step(s) in the cleaning task 3000, whether cleaning machines 1300 are needed for the task 3000 and whether they are available to receive objects for cleaning, whether there is enough soap available for the load in soap reservoirs 1310, and/or whether safety protocols 204 are currently met. Each criterion of 3006 is evaluated with a pass/fail status. Some criteria 3006 may be overridden with a pass status such as, for example; safety preferences 204 of operating with occupancy, or scheduling 206 if the owner chooses to override the scheduling 206 by manual choosing to "Clean Now" 216. The owner may be prompted to confirm overriding some safety preferences 204 when starting a task manually. Some criteria 3006 may not be given automatic pass status such as unmanned vehicles 1100, 1200 having sufficient power in their rechargeable batteries 1122, 1210 respectively needed to perform the task, and the mission control system 506 may notify the owner in the app 200 of the status 300 for any criteria not yet passing, and may continue to re-evaluate until all criteria passes. Once all criteria 3006 passes, the system may then proceed to the next step in the cleaning task 3000.

Once all criteria 3006 passes, the next step in the cleaning task 3000 is for mission control 500 to send out scouts 3008 of the plurality of unmanned vehicles 1100, 1200 to perform a scouting assessment 3010 around the home to find and identify mission planning state data such as, for example; current occupancy and obstacles, recent changes in the home environment such as a cleaning machine that may have been moved to another location, and objects that are candidates for cleaning task(s) 3000. Scouting assessments 3010 may be performed for up-to-date mission planning for a specific cleaning task 3000, or throughout the day as needed for the system, and may be provided to the owner in the app such as the "Morning Assessment" 308. The scouts 3008 may report their assessment findings 3010 to the mission control system 506 over the home's local wireless network, communicating between the mission control system's network interfaces 2628 and the unmanned vehicle system's network interfaces 2730. If occupancy is detected in the home environment 2500 through mission control's program instruction 2614 analysis of sensor data from data inputs such as, for example; home occupancy motion sensors 2516 installed in rooms around the home environment 2500, or infrared cameras of the plurality of the unmanned vehicle's photo/video cameras 2726, the scouts 3008 may abort if safety preferences 204 require, and return to their vehicle housings 500, 1214 to recharge. As new objects, obstacles, occupancy, or environment changes are found 3010, the scouts 3008 may identify with their program instructions 2716 or request identification from the mission control system 506, which makes note of request source locations and whether any object is appropriate for any cleaning task(s) 3000. The mission control system 506 may process identification requests through its own program instructions 2614 by referencing the imagery with its local data stores 2904, 2906, 2908, or delegate the request to remote computing resources 2510 that may process the data through artificial intelligence systems such as, for example; neural networks, machine learning, machine vision, computer vision, etc. and then return the identification request results to the mission control system program instructions 2614 for determining the mission plan 3012. Scouts 3008 may also assist in the cleaning task 3000 beyond initial scouting assessments 3010, by providing ongoing mission support with additional points of view for obstacle avoidance, spatial awareness, object lift planning, and multi-vehicle interactions for example.

As the mission control system 506 receives the scouting assessment 3010, its program instructions 2614 may build a mission plan 3012. The mission plan 3012 may include, for example; which cleaning task type to perform, the next steps required to perform a task 3000, which cleaning machine(s) 1300 if any will participate, which unmanned vehicles 1100, 1200 will participate, which attachments 602 for the unmanned vehicles 1100, 1200 if any will be needed, the latest system and custom task parameters 3002 and safety preferences 204 to respect during operation, how many loads to divide the cleaning task 3000 into, which identified objects are appropriate for and will be included in this load of this task 3000, which unmanned vehicle of the plurality of unmanned vehicles 1100, 1200 is responsible for which identified object(s) or area of identified objects and their order or retrieval, and the estimated time of completion. The mission plan 3012 may be sent to the unmanned vehicles 1100, 1200, and/or the unmanned vehicles 1100, 1200 may request the latest mission plan 3012 at any time during mission operation. Once the mission plan 3012 has been determined, the mission control system 506 re-evaluates the current system criteria 3006, to determine if the mission may proceed 3014. If any system criteria 3006 fails to pass 3014, the system may continue reevaluating until all system criteria 3006 passes. If all system criteria 3006 pass 3014, the cleaning task 3000 may move to the next step of executing 3016 the mission plan 3012.

Executing 3016 the mission plan 3012 may begin by sending out 3018 the unmanned vehicles 1100, 1200 for the cleaning task 3000 from their recharging housing(s). For unmanned ground vehicles 1200, they may simply drive out. For unmanned aerial vehicles 1100, a bay door 704 may open, and the tray 1002 upon which each aerial vehicle 1100 sits, may slide out of the vehicle housing 500 if needed to provide the unmanned aerial vehicle 1100 sufficient clearance to fly out. After the unmanned vehicles 1100, 1200 have exited their vehicle recharging housing, they may then proceed to the next destination in the mission plan 3012. Depending on the cleaning task type and objects identified, the next destination may be picking up any attachments 3020 in the attachments pickup area.

In one configuration, the pickup area for the secondary attachments 602 may be located attached 604 to the back of the vehicle housing(s) 500, and/or in/on additional attachment housing(s). As illustrated in 600, an unmanned aerial vehicle may position itself within reach, and then extend a primary grasper 614-1 to grasp a secondary attachment 602-3 by various means of connection such as, for example; moving the primary grasper's 614 fingers 618 together in a grasping formation. In other configurations, the primary grasper 614 may connect to an attachment 602 by other means (not shown) such as, for example; turning an external screw into an internal screw thread, or through an electromagnetic connection by sending an electromagnetic signal to engage a magnetic connection between one end of a magnetic extension connected to the unmanned vehicle, and a corresponding magnetic end of the attachment it is picking up. Depending on the cleaning task 3000, the unmanned vehicles 1100, 1200 may use primary, secondary, and/or tertiary attachments. Primary attachments such as a primary grasper 614 for example, are used to perform base control actions for a task directly, or to grasp secondary attachments to perform base control actions such as, for example; pushing, pulling, grasping, releasing, turning, or lifting. Secondary attachments such as pole attachments 602 or unmanned aerial vehicle tethers 1120 for example, may be used to perform task actions from a distance. Tertiary attachments such as a feather duster for example, may perform specialized task actions such as dusting. Some attachments may attach to other attachments to create a chain of attachments as needed. As those of ordinary skill in the art will understand the configuration of attachments may be variously employed to physically accomplish an action as needed for a given task.

After the plurality of unmanned vehicles 1100, 1200 have left their recharging housing(s) 500, 1214 respectively, and picked up 3020 any attachments as determined in the mission plan 3012, the next destination for some unmanned vehicles may be to find and pick up the next identified task object 3022, previously identified from the scouting assessment 3010 for the cleaning task 3000. The mission plan 3012 provided by the mission control system 506 may assign task objects identified in the scouting assessment 3010 to each available unmanned vehicle based on property estimates of the identified object such as, for example; size, shape, weight, density, and center of gravity. For other unmanned vehicles, the next destination may be to operate a cleaning machine 3034 such as lifting a lid or pulling a tray out for example, before other unmanned vehicles may transport and release objects into it 3038, as described further below. The next destination for other unmanned vehicles still, may be to move an obstacle out of the way (not shown), previously identified in the scouting assessment 3010. The mission plan 3012 may define each unmanned vehicle's next destination based on the payload capacity and other operational features of the unmanned vehicle needed for each action or object, and the mission control system 506 may continue to update the mission plan 3012 as needed for the cleaning task 3000.

When an unmanned vehicle has a destination location, such as an object or cleaning machine for example, as determined by the mission plan 3012 and located by scouting assessments 3010, the navigation system 2710 of the unmanned vehicle control systems 1124/1208 may build the navigation path 2720 to reach it by first calculating the distance, direction, and altitude between the unmanned vehicle's current location and the destination location. The navigation system 2710 may then adjust the navigation path 2720 around any obstacles and through the surrounding home environment as assessed by scouting assessments 3010, as well as by real-time environment and position data captured from the unmanned vehicle itself as it travels, utilizing what is known in the art as simultaneous localization and mapping (SLAM). The mission planning system 2608 of the mission control system 506 may also execute its program instructions 2614 to build or adjust the vehicle's navigation path 2720 as needed. The resulting navigation path 2720 may then include a series of what are referred to as waypoints. As those of ordinary skill in the art will understand, a waypoint is a coordinate that identifies a reference point in physical space. While navigation waypoints are commonly expressed in (latitude, longitude) coordinates for terrestrial travel, which may also include altitude for aerial travel, Earth-based coordinates from geodetic datums such as the World Geodetic System 1984 (WGS84) used for GPS systems for example, may not be ideal for indoor navigation within a home. In one configuration, navigation waypoints may instead use a custom Cartesian coordinate system, with origin (0,0,0) being centered at the mission control housing 500, and axes for (latitude, longitude, altitude) projecting outward from this point of origin with each reference line interval measured in feet.

In one example, an unmanned aerial vehicle 1100 may navigate through the series of waypoints along the navigation path 2720 to the first object's location which may include, for example; waypoint #1 and waypoint #2. In this example, the starting position of the unmanned vehicle may be coordinates (7,9,2) and waypoint #1 may be the coordinates (12,9,6) which may be 5 ft. ahead in latitude and 4 ft. higher in altitude. The unmanned aerial vehicle control system 1124 may then determine the speeds to send to the propeller motors to change the vehicle pitch to move forward. As the unmanned aerial vehicle travels forward to the waypoint #1 coordinates, the navigation system 2710 may track the current distance between the last starting location and the current location, until the current distance travelled forward is 5 ft. having reached waypoint #1's latitude (12,9,2). Similarly, the navigation system 2710 may track the altitude, until the vehicle has risen 4 ft. having reached waypoint #1's altitude (12,9,6). When the vehicle reaches waypoint #1 (12,9,6) in latitude (12 ft.), longitude (9 ft.), and altitude (6 ft.) from the mission control 500 point of origin, the current waypoint #1 (12,9,6) may become the last starting position used to track against for the next distances travelled on the way to waypoint #2 (12,10,6). In this example, the unmanned vehicle control system 1124 may again determine the speeds to send to the propeller motors to change the vehicle's yaw to turn right into a bedroom and pitch to move forward 1 ft. until the vehicle has travelled right 1 ft. in longitude arriving at waypoint #2 (12,10,6), which may be above the first object's resting location, as identified during the scouting assessment 3010.

While this example illustrates the use of waypoints for navigation in a home environment 2500, in practice the navigation path 2720 may further adapt to the obstacles, occupancy, and features of the home environment. For example, if the destination altitude of waypoint #2 is determined to be 6 ft. as to position an unmanned aerial vehicle 1100 above a bed as illustrated in 1600, 1700, for sufficient clearance of the vehicle's propellers 1102 within the illustrated environment, a desired navigation path 2720 for the unmanned aerial vehicle 1100 may not be through the waypoints continually at the initial altitude of 2 ft., only rising to the desired altitude of 6 ft. at the end of the navigation path 2720, as this trajectory may cause the unmanned aerial vehicle 1100 to collide with the bed 1608 while travelling at an altitude of only 2 ft. Instead, in this example, a desired navigation path 2720 may be to travel both forward in latitude and higher in altitude together at an inclined plane trajectory of 45 degrees for example, or simply to rise to the desired altitude first before travelling forward in latitude, before reaching an obstacle such as the bed 1608. Therefore, in addition to the navigation waypoint coordinates, the navigation path 2720 may also include the appropriate course correction maneuvers, speeds, and trajectories between the waypoints, to travel safely around obstacles and through the surrounding home environment on the way to the destination.

Next, while the navigation path 2720 may be initially determined for the unmanned vehicles 1100, 1200 to navigate around fixed obstacles such as a bed or a chair for example, and through fixed features within the surrounding home environment such as a wall or ceiling for example, in practice the unmanned vehicles may adapt further in real time to moving obstacles such as humans or pets for example. These adaptations for the unmanned vehicles may include, for example; freezing in place until a moving obstacle such as a person has passed by, or going around the person while keeping a minimum distance by temporarily deviating outside of the navigation path 2720 and then returning back to the navigation path 2720 when possible, or rerouting that leg of the navigation path 2720 to an alternate route through the home if a different path is possible. The adaptations available may vary based on the owner's safety preferences 204 and the current hardware configuration 108 available such as room motion sensors 2516, or photo/video cameras 2726 or other sensors 2724 on the unmanned vehicles that may detect occupancy or motion. The unmanned vehicle control systems 1124/1208 may utilize obstacle avoidance programs in the unmanned vehicle's program instructions 2716 when encountering an obstacle within close proximity of the vehicle. The mission control system 506 may also anticipate a probable interaction ahead of time based on room motion sensors 2516 in the vicinity of the unmanned vehicles 1100, 1200 and current navigation path 2720, which the mission control system 506 may then notify the unmanned vehicle control systems 1124/1208 an interaction is imminent and trigger an adaptation command.

If however, an obstacle isn't avoided and there is contact with an unmanned vehicle 1100, 1200, the unmanned vehicle control system 1124/1208 may detect the collision event and track the distance travelled with its program instructions 2716 as provided by input data from its gyros, accelerometers, and other sensors 2724, so as to course correct back to the navigation path 2720 when the unmanned vehicle control system 1124/1208 is able to recover from the collision event. While many safety (preferences 204 are provided to the owner to avoid collisions between people and machines such as, for example; operating while occupants are not home, or keeping minimum distances if occupied, or navigation paths that intelligently route around occupants, or freezing in place during proximity interactions for example, the unmanned vehicles may be further configured with common safety features found on unmanned vehicles such as standard plastic or foam prop guards (not shown) that surround the propellers 1102. In other configurations, standard plastic or foam prop guards may instead be comprised of other materials or protective covering configurations such as a tight mesh netting for example. Additionally, the mission control system 506 may throttle the speeds of the unmanned vehicles down if operating while occupied, and down further still if occupant proximity events are triggered, compared with an empty and unoccupied home. Other speed limits (not shown) may be set by the owner in safety preferences 204, or determined by the mission control program instructions 2614 in relation to the clearances afforded in the home environment 2500 along the navigation path 2720.

Once an unmanned aerial vehicle 1100 has reached the destination waypoint location of an object, in this example waypoint #2 (12,10,6), the unmanned vehicle control system 1124 may then command the object control system 1118 to signal the tether controller 2704 to operate the tether winch 1116, and extend the tether 1120 down to reach and grasp the pillow object 1602-1 between a dresser 1606 and a bed 1608, as illustrated in 1600 for example. Once the tethered grasper 614 has grasped the pillow object 1602-1, an unmanned aerial vehicle 1100 may attempt to weigh the object 1602-1 before picking it up 3022 or transporting it 3026, 3038. In one implementation, this may include a weight sensor 2724 where the first end of the tether 1120 inside the unmanned aerial vehicle 1100 may be connected to a digital weight measurement sensor 2724, that when the second, lowered end of the tether 1120 is attached to the object 1602-1 by way of the tethered grasper 614, the weight sensor 2724 provides a weight measurement of the object 1602-1 to the unmanned vehicle control system 1124 and/or mission control system 506. In another implementation, the approximate weight value may be determined by requesting reference data of the identified object against a local or remote data store 2900 of known/previously measured weights. The unmanned vehicle control system 1124 and/or mission control system 506 may then evaluate whether the current unmanned aerial vehicle 1100 has the operational ability to fully lift 3022 and transport 3026, 3038 the object 1602-1 on its own, based on its measured weight and other object properties, or whether more than one unmanned aerial vehicle 1100 may be required to lift 3022 and transport 3026, 3038 the object 1602-1 together as illustrated in 2000, or whether another configuration of unmanned aerial vehicle 1100 may be required to lift 3022 the payload. If a different unmanned vehicle configuration is needed, the mission control system 506 may reassign the current vehicle to another object, and reassign one or more of the plurality of vehicles as needed to the current object, by updating the mission plan 3012. Once the appropriate unmanned vehicle(s) have been determined to have the operational ability to lift 3022 the object 1602-1, the same systems used to extend the tether 1120, may then retract the tether 1120 with the payload up in attitude, as to clear the top of the bed 1608 in this example, and/or increase the speeds of the propellers 1102 to lift the unmanned aerial vehicle 1100 with the payload higher in altitude to pick up 3022 the task object.

After an unmanned vehicle has lifted 3022 a payload, the next destination in the mission plan 3012 may be based on whether or not the object is to be cleaned 3024. If the object is not to be cleaned 3024, but merely moved 3026 to another location in an object rearrangement task, the next destination may be the designated drop location as provided by the mission plan 3012. As described above in 1400, designated drop locations for Object rearrangement tasks in the mission plan 3012 may be configured manually by the owner using the website 100 or app 200 on their mobile device, and/or automatically by the system using imagery analysis that references data stores 2900. In one example, the unmanned aerial vehicle 1100 may navigate to the next waypoint coordinates in the mission plan 3012 of the designated drop location 1604 along the next navigation path 2720. The unmanned aerial vehicle 1100 may then release 3028 the object 1602-1 onto the designated location 1604. After the vehicle has released 3028 the object 1602-1, the next step in the mission plan 3012 may be to find the next task object 3022 if there are more task objects 3030 for the object rearrangement task 3000. If there are no more task objects 3030, the unmanned vehicle may return to the recharge housing 3040 for the next cleaning task 3000.

Also as described above in 1400, owners may use an app 200 on their mobile device to capture their ideal room arrangement states, and/or the system may identify ideal arrangements automatically by referencing data stores 2900 with analysis based on common patterns, groupings, and object arrangements considered to be ideal arrangement states. Owners may choose to share 226 their own ideal object arrangements with friends or family within the context of a social network to display their home's features or interior decorating designs, or with an internet connected network of other owners of the autonomous cleaning system to provide inspiration for arranging objects and designs within their home. If all or similar objects are available within the home, the owner may select imagery of a favorite ideal object arrangement state from their own library, or from a favorite in a shared library provided by other owners, for more than the purpose of cleaning a room in the sense of rearranging objects, but re-purposing the feature for the pleasure of decorating their home with the ease of selecting a photo and scheduling an autonomous room arrangement, provided the owner's current system has the operational ability to lift and/or move the objects, and the necessary objects are available in the home to achieve the desired room arrangement. The autonomous cleaning server system 2900 may also identify needed objects in the desired ideal room arrangement state, and provide the user a link or interface to purchase the objects in the imagery using the app 200 or website 100.

If the next object is to be cleaned 3024 in the cleaning task 3000, the next destination in the mission plan 3012 may be a cleaning machine 1300, where the mission control system 506 has determined whether or not the cleaning machine 1300 appropriate for the cleaning task 3000 is an automated cleaning machine 3032. The mission control system 506 may determine whether or not a cleaning machine 1300 is an automated machine 3032 and appropriate for the cleaning task 3000 by referencing the current hardware configuration 108 in the local mission control data store 2904. The local mission control data store 2904 may also manage the current availability and operational statuses of automated cleaning machine systems 1304 in the autonomous cleaning server system 2900, which may be updated regularly by the mission control system 506 executing its program instructions 2614 to request the current statuses of automated cleaning machine systems 1304, or by receiving status change events pushed out over the network 2506 from the automated cleaning machine systems 1304. The mission control system 506 may further identify and/or confirm automated or non-automated cleaning machine 1300 statuses, locations, and other attributes by visual inspection from imagery analysis as provided by scouting assessments 3010 and processed through the mission control system's program instructions 2614 or remote computing resources 2510. If for example, when building the mission plan 3012, a cleaning machine 1300 required for a scheduled 206 cleaning task 3000 is not found connected to autonomous cleaning server system 2900, or has an operational error status, or is not found visually during the scouting assessment 3010, the mission control system 506 may notify the owner in the app 200 of the error status event 300 requiring their attention.

If the cleaning machine 1300 is found, but the cleaning machine 1300 is not automated 3032, the unmanned vehicles 1100, 1200 may first pick up any necessary poking or grasping attachments 3020 as described in 600, that may then be used to pull, press, grasp, or turn dials, knobs, doors, drawers, trays, and/or lids of a non-automated cleaning machine 1300. The unmanned vehicles may then navigate to the non-automated cleaning machine 1300, and as illustrated in 2100, use the appropriate attachment 602 to operate the cleaning machine's buttons or door for example. For the unmanned vehicles to accurately navigate to and operate the buttons, dials, door, etc. on a non-automated cleaning machine 1300, the autonomous cleaning system may first identify what each operational feature is for, and its corresponding navigation waypoint coordinates. To accomplish this, the mission control system 506 may first attempt to identify the make and model of the non-automated cleaning machine 1300. In one configuration, the autonomous cleaning server system 2900 may receive the make and model information from the owner manually entering the data through the website 100 or app 200. In another configuration, the autonomous cleaning server system 2900 may attempt to identify the make and model automatically by referencing scouting assessment 3010 imagery with data stores 2900 of identified imagery for known makes and models of non-automated cleaning machines 1300. With a known make and model reference, the mission control system 506 may then provide navigation waypoint coordinates for each feature on the cleaning machine 1300 from supporting reference data. If the make and model is unknown, or if the reference data is insufficient, the mission control system 506 may send scouts 3008 to capture imagery of the text labeling and identify shapes for each feature on the cleaning machine 1300, that the mission control system 506 may then process through optical character recognition (OCR) programs to recognize the text or computer vision programs to recognize the shapes, and identify the function/ setting of the feature along with its geolocation to determine the navigation waypoint coordinates. The navigation waypoints of the buttons, dials, door handles, etc., and cleaning machine 1300 itself may then be used by the unmanned vehicles in the navigation path 2720 for orienting and directing the vehicle and secondary attachments 602 when operating the non-automated cleaning machine 1300.

In one example manual operation, opening a front-opening door, an unmanned aerial vehicle 1100 may follow the navigation waypoints in the navigation path 2720 to position itself and the attachment within reach of the door handle 2106, then extend the grasping secondary pole attachment 602-2 along the feature waypoint navigation path 2720 to reach the door handle 2106, where the unmanned vehicle's object control system 1118 may signal the grasping end 610 of the pole attachment 602 to move the grasper's fingers 612 together in a grasping formation and grasp 2108 the door handle 2106. Finally, the unmanned vehicle's object control system 1118 may signal the attachment 602 to retract if the pole attachment is extensible, and/or the unmanned vehicle control system 1124 may signal the propulsion motor controller 2702 to reposition the vehicle to pitch the vehicle backwards as needed pull the door open. In practice, the unmanned vehicle control system 1124 may then re-stabilize itself as needed and detected by the vehicle's gyros and other sensors 2724 to compensate for the forces exerted on the vehicle from any release of energy from the opening of a door. Likewise, in another example, pushing a button, an unmanned aerial vehicle 1100 may follow the navigation waypoints in the navigation path 2720 to position itself and the attachment within reach of the button 2102, then extend the poking secondary pole attachment 602-1 along the feature waypoint navigation path 2720 to reach the button 2102 with a round ball end 608, where the unmanned vehicle control system 1124 may signal the propulsion motor controller 2702 to move the vehicle forward with sufficient force as to push the attachment's round ball end 608 into the button 2102, and then re-stabilize itself from the contact forces exerted on the vehicle as detected by the vehicle's gyros and other sensors 2724. In another example, multiple unmanned vehicles may work together cooperatively, in synchronous swarming behaviors, to perform operations. After a manual operation 3034 is performed, the vehicle may then send imagery from the vehicle's cameras 2726 to the mission control system 506 for confirmation the manual operation 3034 of opening a door or pushing a button for example, was successful before moving to the next assigned action in the mission plan 3012. Similar to transporting objects to be cleaned 3038 to a non-automated cleaning machine 1300, after the cleaning machine 1300 is open, an unmanned vehicle may also retrieve from a designated or identified storage location and release a soap pod or packet for example into the cleaning machine 1300 performing a washing cycle, or a dryer sheet for a drying cycle.

If the cleaning machine 1300 is found, and the cleaning machine 1300 is automated 3032, the cleaning machine 1300 may operate automatically following commands in the mission plan 3012, in concert with the unmanned vehicles 1100, 1200 to complete the cleaning task 3000. In one example, loading an automated clothes-washing-only cleaning machine 1300, the unmanned vehicles 1100, 1200 may have been sent to find and pick up the identified task objects 3022 for the cleaning task 3000. While the unmanned vehicles perform 3022, the mission control system 506 may send operational commands 3036 from the mission plan 3012 through its network interface 2628, over the home's local network 2506, to the automated cleaning machine's 1300 network interface 2826, which is received by the automated cleaning machine system's 1304 operational unit controller 2802 to perform the cleaning machine's 1300 operational functions automatically such as, for example; opening its own top-opening lid, starting its own water, and dispensing its own soap from integrated soap reservoirs 1310. In another example, for loading an automated dishwashing/drying cleaning machine 1300, the mission plan 3012 may also include which identified objects are top-tray objects or bottom-tray objects based on the size, shape, and/or type of dish object and the amount of space available in each tray, an optimal placement organization for each dish/utensil in the tray(s), as well as the order of loading each object in the cleaning machine 1300. Similarly, the mission control system 506 may send operational commands 3036 from the mission plan 3012 over the home's local network 2506, where the automated cleaning machine system's 1304 operational unit controller 2802 may signal for the cleaning machine 1300 to open its door, and then slide out its top tray. Then unmanned vehicles may load the top-tray objects per the placement plan. Next, the mission control system 506 may send the operational command 3036 for the cleaning machine 1300 to slide in its top tray and slide out its bottom tray. Then the unmanned vehicles may load the bottom-tray objects per the placement plan, and then load the utensils. Finally, the mission control system 506 may send the next operational command 3036 in the mission plan 3012 for the cleaning machine to slide in its bottom tray and close its door.

When the unmanned vehicles 1100, 1200 have found and picked up 3022 their task objects, and transported 3038 the objects to the cleaning machine 1300 as illustrated in 1900, 2000, they may release the object(s) into the cleaning machine 1300. In one example, if the cleaning machine 1300 is top loading and the cleaning task is laundry, an unmanned aerial vehicle 1100 may position itself above the cleaning machine 1300 and over the cavity opening of the cleaning machine 1300, where the unmanned vehicle control system 1124 may then command the Object control system 1118 to send a signal to the attachment 602-4 for the grasper end 610 to move the attachment's grasper fingers 612 apart, opening the grasp, and releasing the object where it may then be extracted by gravity into the body cavity of the cleaning machine 1300. In another example, if the cleaning task is dishes, an unmanned aerial vehicle 1100 may position the attached object just above the placement plan location in the extended tray to safely release the object into place. In another example still, if the cleaning machine 1300 uses a front-loading door, such as a clothes-drying only cleaning machine, an unmanned aerial vehicle 1100 may release an object at the end of the tether 1120 using inertia through a jerking motion aerial maneuver to release the object swinging at the end of the tether 1120 while opening the grasper fingers 612 on the object, and re-stabilizing the vehicle after the object is released. After an unmanned aerial vehicle 1100 has released 3038 its object into the cleaning machine 1300, the next step in the mission plan 3012 may be to find the next task object 3022 if there are more task objects 3030 for the cleaning task 3000 and the unmanned vehicle has sufficient power to transport it. If there are no more task objects 3030 or if any of the unmanned vehicles 1100, 1200 need to recharge, the unmanned vehicles 1100, 1200 may return to their recharge housing 3040.

Next, the mission plan 3012 may be executed in one or more phases (not shown), depending on how much of the load is calculated to be successfully transported in the current phase. This calculation may vary depending on operational factors such as, for example; how many unmanned vehicles 1100, 1200 are available to participate in the current cleaning task 3000, how much power is required for each leg of transport by the unmanned vehicles 1100, 1200, what is the total power capacity and current battery 1122, 1210 level for each unmanned vehicle 1100, 1200 respectively, and how many objects in the mission plan 3012 are to be transported for the current load of the cleaning task 3000. The mission control system 506 may continually evaluate the mission plan 3012 progress and update the mission plan 3012 as needed while executing the cleaning task 3000. If it is determined more than one phase is needed to transport all of the objects to the cleaning machine 1300 for example, the unmanned vehicles 1100, 1200 may return to recharge 3040 as needed or commanded, normally after releasing their last object 3028, 3038 for that phase, and resuming the mission plan 3012 where they left off with their next object 3030 in the next phase of the mission plan 3012 after they have recharged. The owner may access operational status 300 in the app 200 of the mission plan progress 3012. The system may provide performance reporting on the efficiency of their current hardware configuration 108, and estimate efficiency projections based on recommended hardware configurations 118 if the owner were to add (N) more unmanned vehicles or reposition an unmanned vehicle housing to another location in the home for example.

After a cleaning machine 1300 has been loaded, the next step in the mission plan 3012 may be to commence a cleaning cycle, to start washing or drying the objects in the cleaning machine 1300. The mission control system 506 may send an unmanned aerial vehicle 1100 with a poking pole attachment 602 to push a start button on a non-automated cleaning machine 1300 for example, or send an operational command signal over the network to an automated cleaning machine system's 1304 automated cleaning cycle system 2806 to start its cleaning cycle. The unmanned vehicles 1100, 1200 may return to their recharge housings 3040 while a cleaning machine's 1300 cleaning cycle runs, unless there are sufficient vehicles to perform another cleaning task 3000 in parallel. When a cleaning cycle for an automated cleaning machine 1300 is finished, its automated cleaning cycle system 2806 may send a cycle completion status 300 event notification to the mission control system 506 over the home's local network 2506, which may then provide completion status 300 to the owner in an app 200.

For a non-automated cleaning machine 1300, the mission control system 506 may reference data stores 2900 for cycle timings to wait for of the identified make and model of a non-automated cleaning machine 1300. The mission control system 506 may also send scouts 3008 to further assess the cleaning machine 1300 and confirm completion status 300 through visual and/or auditory analysis of imagery or audio within proximity of the cleaning machine 1300. The mission control system 506 may further add an additional margin of safety time extension to confirm the cycle completion for a non-automated cleaning machine 1300, to ensure a tether 1120 or attachment 602 doesn't catch on any moving parts or moving objects inside the cleaning machine 1300 when retrieving the cleaned objects for the task 3000.

After a wash cleaning cycle has completed, some cleaning machines 1300 may be equipped to then commence a drying cycle automatically as well in the same cleaning machine 1300. If the laundry cleaning machines 1300 for washing and drying cleaning cycles are separate cleaning machines 1300, the mission plan 3012 may then proceed with object transfers between the cleaning machines 1300. In one configuration, separate cleaning machines 1300 may be used for washing and drying laundry in a vertically stacked configuration (not shown), where the mission control system 506 may send operational commands 3036 from the mission plan 30112 through its network interface 2628, over the home's local network 2506, to the automated cleaning machine's 1300 network interface 2826, which is received by both of the automated cleaning machine system's 1304 operational unit controllers 2802 to slide open the bottom floor of the washing cleaning machine (top) and the top lid of the drying cleaning machine (bottom), where the laundry is extracted by gravity from washing machine (top) down into drying machine (bottom). In another configuration, where separate cleaning machines 1300 may be used for washing and drying laundry in a standard side-by-side configuration, the mission control system 506 may similarly signal both cleaning machines 1300 to open their own lids and/or doors over the home's local network 2506 if they are automated, or send unmanned vehicles 1100, 11200 to open the lids and/or doors manually with secondary attachments 602 in a similar manner as when they were initially loaded. Once both cleaning machines 1300 are open, the unmanned vehicles 1100, 1200 may use their grasping tethers 1120 and/or grasping secondary pole attachments 602 to reach into the cavity of the cleaning machine 1300 and retrieve the clothing objects from the washing cleaning machine 1300-1 and transfer the objects into the drying cleaning machine 1300-2. Finally, after any objects have been transferred between washing 1300-1 and drying 1300-2 cleaning machines, or if the cleaning machine 1300 is capable of both washing and drying cleaning cycles in the same cleaning machine 1300, the drying cleaning cycle may commence in a similar manner as was used to commence the washing cleaning cycle.

After a drying cleaning cycle has completed, the unmanned vehicles 1100, 1200 may retrieve the objects from the cleaning machine 1300, and return them to designated drop locations. As described above, drop locations may be determined manually by the owner's inputs, and/or automatically based on scouting assessments identifying common drop locations such as, fir example; cabinets, countertops, tops of beds, tops of dressers, etc. If the designated drop location is inside an enclosure, such as a shelf inside a cabinet for example; an unmanned vehicle may first open the enclosure with their secondary attachments 602 similarly used to manually operate features on cleaning machines 1300. After the destination surface or enclosure is accessible, the unmanned vehicles 1100, 1200 may transport the cleaned objects to the designated drop locations.

The retrieval process for retrieving cleaned objects for final location drops may vary depending on the owner's current hardware configuration 108 and cleaning task type. In one example, if the cleaning task type is dishes, wherein the object(s) cleaned are on trays, the system may perform part of the loading operation in reverse, to unload the objects. In this example, if the cleaning machine 1300 is automated, the mission control system 506 may send operational commands 3036 from the mission plan 3012 over the home's local network 2506, where the automated cleaning machine system's 1304 operational unit controller 2802 may signal for the cleaning machine 1300 to open its door, and slide out its top tray. Next, an unmanned aerial vehicle 1100 may position itself above the object and lower a grasping tether 1120 or grasping pole attachment 602-4 just above the placement plan object location resting in the opened tray to safely grasp the object and pick it up from the tray. An unmanned aerial vehicle 1100 may then signal its propellers to increase in speed lifting the vehicle and the attached object in altitude, and then following navigation waypoints along the navigation path 2720 to transport the object to the navigation waypoint for the designated drop location, carefully releasing the object in its final resting location. In addition to real time imagery from the unmanned vehicle itself while transporting an object, scouts may also provide additional support during transports with real time imagery of an area from one or more points of view that are processed through the mission control system 506 to fine tune the navigation waypoint for an object's final resting location. In practice, the navigation waypoint for the object's final resting location may be fine tuned with each transport as objects are stacked on top of or adjacent to each other. The retrieval process may repeat for each object, closing/opening trays as needed, until the cleaning machine 1300 is unloaded.

In another example, if the cleaning task type is laundry, unmanned vehicles 1100, 1200 may retrieve clothing objects from a drying cleaning machine. If the drying cleaning machine 1300 is top loading, after the lid is opened, an unmanned aerial vehicle 1100 may lower its grasping tether 1120 to retrieve the clothing object, rise in altitude, and follow the navigation waypoints along the navigation path 2720 to transport the object to the designated drop location. If the drying cleaning machine is front loading, and non-automated, an unmanned aerial vehicle may use a grasping pole attachment 602-4 to reach into the body cavity of the cleaning machine and grasp the laundry. Similarly, this retrieval may be assisted by real time imagery of the unmanned vehicle performing the retrieval operation, or supported by real time imagery of additional scouts, fed through the mission control system 506 for analysis of imagery to determine navigation waypoints for the unmanned vehicle and the secondary pole attachment 602. The mission control system 506 may further define an additional navigation waypoint specifically for the secondary attachment's grasper end 610 at a different orientation than the attachment pole's 602 body, wherein unmanned vehicle control system 1124 may signal its object control system 1118 to then control the rotation joint 606 to rotate inside the cleaning machine's 1300 body cavity to reach the clothing object, and close the grasper fingers 612 together in a grasping formation to grasp the object for retrieval. The mission control system 506 then provides the navigation waypoints for the unmanned aerial vehicle 1100 to follow along the navigation path 2720 to pull the pole attachment 602 out of the cleaning machine's 1300 body cavity, and transport the object to its designated drop location.

If the drying cleaning machine 1300 is front loading, and is automated, the drying cleaning machine 1300 may perform automated actions in concert with unmanned vehicles 1100, 1200 to support the retrieval of the clothing objects for the cleaning task 3000. In one configuration, the mission control system 506 may send operational commands to the automated cleaning machine system 1304, which may command the operational unit controller 2802, which may then command the floor controller 2820 to extend the extensible struts 2208 causing the coupled inner floor 2210 to rise to an inclined plane position as illustrated in 2200, and the clothing objects 1702 to travel down to the front of the cleaning machine 1300. Next, the mission control system 506 may similarly send commands to open the front door 2306, either down to a flat horizontal plane position where the clothing objects 1702 may travel down onto the top of the door 2306 for aerial pickups by unmanned aerial vehicles 1100 as illustrated in 2300, or command the door 2306 to lower down further to an inclined plane position where the clothing objects 1702 may continue to travel down into a clothes basket 1802 positioned underneath the end of the door 2306, and that may rest on the awaiting unmanned ground vehicle 1200 as illustrated in 2400. The unmanned ground vehicle 1200 may then transport the group of clothing objects 1702 in the clothes basket 1802 to the designated room staging location, where the unmanned aerial vehicles 1100 may use their tethered graspers to unload the clothing objects 1702 to the final designated drop location such as the top of a bed or dresser for example.

For cleaning tasks 3000 that are more specialized, beyond cleaning objects or rearranging objects such as dusting for example, additional tertiary attachments may be used. In this example, the mission plan 3012 for this type of cleaning task 3000 may have an unmanned vehicle use its primary grasper(s) 614 to pick up tertiary attachments such as a feather duster, where unmanned aerial vehicles 1100 may position and move the vehicle 1100 side-to-side to achieve dusting motions while grasping the duster to dust HVAC vents or chandeliers. Some owners may wish to repurpose this function for more specialized tasks such as painting, where the autonomous cleaning system may then require more specialized aerial maneuvers to accomplish complex vehicle motions for specialized tasks. The mission control system 506 may then support building extensible mission plans 3012 and importing more complex unmanned vehicle maneuvers from $3^{rd}$ party libraries to support specialized tasks.

The autonomous cleaning server system 2900 may also support over-the-air programming updates (OTA) where a remote computing resource 2510 may push out updates to all the mission control systems 506, unmanned vehicle control systems 1124/1208, and/or automated cleaning machine systems 1304 with updates of for example; new software updates, configuration settings, APIs, system default changes, database updates, and other software libraries to improve the stability, efficiency, security, performance, reliability, and/or features for the autonomous cleaning system.

The invention claimed is:

1. A system for completing indoor cleaning tasks autonomously, comprising: a plurality of unmanned vehicles, each of the plurality of unmanned vehicles configured to complete one or more steps of the cleaning task; one or more cleaning machines for when the cleaning task includes steps for cleaning objects inside the cleaning machine; a mission control system, comprising: a processor; and a memory coupled to the processor and storing program instructions that when executed by the processor cause the processor to at least: receive parameters for the cleaning task; determine and provide one or more steps and status for the cleaning task; command one or more of the plurality of unmanned vehicles to complete one or more steps of the cleaning task; and command one or more cleaning machines to complete one or more steps of the cleaning task if the cleaning machine is automated and the cleaning task includes steps for cleaning objects inside the cleaning machine; wherein the unmanned vehicle, in response to receiving commands and steps for the cleaning task, are further configured to at least: perform the commands and complete one or more of the steps of the cleaning task; wherein any automated cleaning machine, in response to receiving commands and steps for the cleaning task, are further configured to at least: perform the commands and complete one or more steps of the cleaning task.

2. The system of claim 1, further comprising extensible pole attachments for the unmanned vehicles to interact with objects or control surfaces while performing one or more steps of the cleaning task, comprising: an extensible pole; a rotation joint; and variously ending with a shape or control mechanism designed for the desired interaction.

3. The system of claim 1, further comprising remote computing resources for processing computing requests for the system; or for supporting requests by one or more system users.

4. The system of claim 1, wherein the plurality of the unmanned vehicles are further comprised of unmanned aerial vehicles and optionally unmanned ground vehicles; wherein the unmanned vehicles are further comprising: a network interface; a plurality of sensors; a processor; and a memory coupled to the processor and storing program instructions that when executed by the processor cause the processor to at least: receive commands from the mission control system and respond by performing the commands and completing one or more steps of the cleaning task; wherein one or more of the unmanned vehicles are further comprised of an object control system coupled to a vehicle housing body, wherein the object control system is further comprised of an extensible/retractable tether and/or object control arms, each ending with a pivotally coupled primary grasper mechanism comprising: a rotation joint; and a plurality of mechanical fingers for forming a grasping formation around objects, attachments, or control surfaces while performing one or more steps of the cleaning task.

5. The system of claim 1, wherein the mission control system is further comprised of a network interface coupled to an enclosed computing system that provides the structural base of a larger housing enclosure for unmanned aerial vehicles; upon which is coupled a plurality of stackable vehicle bays; wherein each stackable vehicle bay is stacked upon and coupled to the vehicle bay or housing base below it; wherein each vehicle bay comprises: a front door that opens down; an inner tray that slides out of the vehicle bay as to provide sufficient clearances for aerial launches/landings for the aerial vehicle being housed, and provides a resting floor surface for the aerial vehicle being housed; wherein the resting floor surface of the inner tray is further comprised of a power recharging transmitter for providing power recharging transmission upon connection with the feet of a resting aerial vehicle; and a manual ejection toggle button that opens/closes the door and ejects/retracts the inner tray; wherein the larger housing enclosure is further comprised of a removable top lid coupled to the top of the uppermost vehicle bay, wherein the top lid may be removed to expand the vehicle capacity of the housing enclosure with additional stackable vehicle bays; wherein attachment points, for connecting extensible pole attachments, are coupled to the rear side of the top lid.

6. The system of claim 1, further comprising system support sensors; wherein each of the plurality of unmanned vehicles are further configured to capture sensory input and provide the sensory input to the mission control system; wherein sensors placed in one or more rooms within a home are configured to capture and provide sensory input to the mission control system.

7. The system of claim 1, wherein one or more of the cleaning machines, if the cleaning machines are automated, are further comprising: a network interface; a processor; and a memory coupled to the processor and storing program instructions that when executed by the processor cause the processor to at least: receive commands from the mission control system and respond by performing the commands and completing one or more steps of the cleaning task with automation systems and/or automated machine control mechanisms; wherein the automated machine control mechanisms provide mechanical means for the automated cleaning machine to mechanically control a cleaning cycle feature in response to the commands from the mission control system; wherein the automated cleaning machine is further comprised of integrated soap reservoirs and automated soap dispensers for dispensing soap automatically if the cleaning machine performs washing cleaning cycles.

8. The system of claim 1, wherein the program instructions for the mission control system, that when executed by the processor further cause the processor to at least: determine, based at least in part on the sensory input, at least one property of one or more objects, obstacles, or other features of the home environment; and further determine, based at least in part on this information, steps of the cleaning task; wherein the steps of the cleaning task further comprises: navigation paths for one or more of the unmanned vehicles; commands for performing one or more steps of the cleaning task; and any attachments or cleaning machine needed to perform one or more of the commands.

9. The system of claim 1, wherein the unmanned vehicles are further configured to load or unload the cleaning machine as one or more steps of the object cleaning task, comprising: navigating along a navigation path to the next object or loading area; extending an appropriate grasper to the object; grasping the object; capturing weight sensory data of the attached object; fully lifting the object if within payload parameters; navigating along the navigation path with the object to a designated drop location; and releasing the object into a cavity opening of the cleaning machine or onto the designated drop location; then continuing to next step or command.

10. The system of claim 1, wherein the unmanned vehicles are further configured to operate control surfaces of a non-automated cleaning machine by controlling one or more extensible pole attachments to press buttons, turn dials, pull open or push close lids, trays, or doors; and transport cleaning supplies from a supply location to the cavity opening of the cleaning machine.

11. The system of claim 1, wherein the unmanned vehicles are further configured to perform an object rearrangement cleaning task, comprising: navigating along a navigation path to the next assigned object; extending an appropriate grasper to the object; grasping the object; capturing weight sensory data of the attached object; fully lifting the object if within payload parameters; navigating along the navigation path with the object to a designated drop location; and releasing the object at the designated drop location; then continuing to next step or command.

12. A computer-implemented method, comprising: under control of one or more computing systems configured with executable instructions, receiving an event trigger to perform the indoor cleaning task for the system of claim 1; determining a status of the system; determining steps of the cleaning task; commanding one or more of the plurality of unmanned vehicles, and any automated cleaning machines, to perform one or more steps of the cleaning task or status check.

13. The computer-implemented method of claim 12, wherein one or more unmanned vehicles have requested an identification or other property of an object to plan or to perform one or more steps of the cleaning task; to at least provide the identification of the object; and whether the object is appropriate for the cleaning task.

14. The computer-implemented method of claim 12, wherein each of the plurality of the unmanned vehicles, while capturing sensory input for the status check or while performing one or more steps of the cleaning task, maps the home environment as the unmanned vehicle travels; identifies the position of the unmanned vehicle within 3D space as the unmanned vehicle travels; and adjusts the navigation path of the unmanned vehicle around obstacles if detected by the vehicle's sensory input, or by another sensor connected to the autonomous cleaning system.

15. The computer-implemented method of claim 12, wherein the mission control system adjusts one or more steps of the cleaning task, or operational parameters for the autonomous cleaning system, based on one or more user preferences.

16. A computer-implemented method, comprising: under control of one or more computing systems configured with executable instructions, receiving a request from a user or another system in the mission control system of claim 1; determining or delegating a determination of a result for the request from the mission control system, and responding to the requestor with the result.

17. The computer-implemented method of claim 16, wherein the mission control system integrates with other systems through application programming interfaces (APIs).

18. The computer-implemented method of claim 16, wherein the mission control system provides digital content to an app; wherein the mission control system receives configuration parameters from the app for a cleaning task.

19. The computer-implemented method of claim 18, wherein users use the app on a mobile device to capture configuration parameters for the cleaning task; or capture ideal object arrangement states within a home; wherein users use the app to share captured ideal object arrangement states within a social network, or with other owners of the system; wherein shared ideal object arrangement states from other system owners are imported into the owner's system to provide configuration parameters for the cleaning task.

20. The computer-implemented method of claim 19, wherein the objects captured in imagery of the shared ideal object arrangement state are identified, and if not found within the home, linked for purchase through the app to complete the ideal object arrangement state.

* * * * *